US012493437B2

(12) United States Patent
Hong et al.

(10) Patent No.: US 12,493,437 B2
(45) Date of Patent: Dec. 9, 2025

(54) ELECTRONIC DEVICE AND METHOD FOR CHANGING SCREEN THROUGH EXTERNAL OBJECT

(71) Applicant: Samsung Electronics Co., Ltd., Suwon-si (KR)

(72) Inventors: Junseok Hong, Suwon-si (KR); Banghyun Kwon, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/622,262

(22) Filed: Mar. 29, 2024

(65) Prior Publication Data

US 2024/0427544 A1 Dec. 26, 2024

Related U.S. Application Data

(63) Continuation of application No. PCT/KR2024/003045, filed on Mar. 8, 2024.

(30) Foreign Application Priority Data

Jun. 20, 2023 (KR) .......................... 10-2023-0079221
Jul. 20, 2023 (KR) .......................... 10-2023-0094934

(51) Int. Cl.
  *G06F 3/14* (2006.01)
  *G06F 1/16* (2006.01)
  (Continued)

(52) U.S. Cl.
  CPC .......... *G06F 3/1423* (2013.01); *G06F 1/1616* (2013.01); *G06F 1/1652* (2013.01); *H04M 1/0268* (2013.01); *H04M 1/724* (2021.01)

(58) Field of Classification Search
  CPC ... H04M 1/724; H04M 1/0268; G06F 1/1616; G06F 3/1423; G06F 1/1652
  See application file for complete search history.

(56) References Cited

U.S. PATENT DOCUMENTS 8,433,302 B2    4/2013  Hunter et al.
9,761,017 B2 *  9/2017  Sip .................... G06T 11/001
(Continued)

FOREIGN PATENT DOCUMENTS

JP    2008-048071      2/2008
JP    2014517407 A     7/2014
(Continued)

OTHER PUBLICATIONS

Search Report and Written Opinion dated Jun. 19, 2024 issued in International Patent Application No. PCT/ KR2024/003045.

*Primary Examiner* — Doon Y Chow
*Assistant Examiner* — Dennis Chow
(74) *Attorney, Agent, or Firm* — Nixon & Vanderhye P.C.

(57) ABSTRACT

According to an embodiment, an electronic device includes a cover display, one or more communication circuits, memory, at least one sensor, and at least one processor operably coupled to the cover display, a flexible display, the one or more communication circuits, the memory, and the at least one sensor. The at least one processor is configured to obtain first data and second data. The at least one processor is configured to, based on the first data, display a first screen. The at least one processor is configured to, while the first screen is displayed through the cover display, obtain information on a second screen based on the second data. The at least one processor is configured to change a screen displayed through the cover display from the first screen to the second screen based on the information on the second screen.

20 Claims, 37 Drawing Sheets

(51) Int. Cl.
*H04M 1/02* (2006.01)
*H04M 1/724* (2021.01)

(56) References Cited

U.S. PATENT DOCUMENTS

| | | |
|---|---|---|
| 11,178,522 B2 | 11/2021 | Kim et al. |
| 12,039,149 B2* | 7/2024 | Toudji .................... G06F 9/451 |
| 2011/0159924 A1* | 6/2011 | Gonzalez ............ H04M 1/7246 |
| | | 715/764 |
| 2014/0143766 A1 | 5/2014 | Li et al. |
| 2014/0267383 A1 | 9/2014 | Javidan |
| 2023/0026952 A1 | 1/2023 | Han et al. |

FOREIGN PATENT DOCUMENTS

| | | |
|---|---|---|
| KR | 20060009629 A | 2/2006 |
| KR | 100661544 B1 | 12/2006 |
| KR | 20070102162 A | 10/2007 |
| KR | 100958248 B1 | 5/2010 |
| KR | 10-2013-0067720 | 6/2013 |
| KR | 101375082 B1 | 3/2014 |
| KR | 10-2018-0072389 | 6/2018 |
| KR | 10-2021-0120386 | 10/2021 |
| WO | 2007015118 A1 | 2/2007 |

\* cited by examiner

ELECTRONIC DEVICE AND METHOD FOR CHANGING SCREEN THROUGH EXTERNAL OBJECT

CROSS-REFERENCE TO RELATED APPLICATIONS

This application is a continuation of International Application No. PCT/KR2024/003045 designating the United States, filed on Mar. 8, 2024, in the Korean Intellectual Property Receiving Office and claiming priority to Korean Patent Application Nos. 10-2023-0079221, filed on Jun. 20, 2023, and 10-2023-0094934, filed on Jul. 20, 2023, in the Korean Intellectual Property Office, the disclosures of each of which are incorporated by reference herein in their entireties.

BACKGROUND

Field

The disclosure relates to an electronic device and a method for changing a screen through an external object.

Description of Related Art

An electronic device may provide a function of displaying a wallpaper. For example, a user may select a preferred image and use it as a wallpaper displayed on a background of the electrical device. The image used as a wallpaper may include an image captured by the user through a camera mounted on the electronic device or an image obtained from an external electronic device.

The above-described information may be provided as background art for the purpose of aiding understanding of the present disclosure. No claim or determination is made as to whether any of the foregoing can be applied as prior art to the present disclosure.

SUMMARY

According to an embodiment, an electronic device may comprise: a first housing comprising a first surface and a second surface opposite to the first surface, a second housing comprising a third surface and a fourth surface opposite to the third surface, a folding housing connecting the first housing and the second housing pivotably, a cover display disposed on the second surface, a flexible display disposed on the first surface and the third surface, one or more communication circuits, a memory, at least one sensor, and at least one processor, comprising processing circuitry, operably coupled to the cover display, the flexible display, the one or more communication circuits, the memory, and the at least one sensor. The at least one processor, individually and/or collectively, may be configured to: obtain first data and second data based on an external object located within a designated distance from the electronic device. The at least one processor, individually and/or collectively, may be configured to display a first screen through the cover display, based on the first data. The at least one processor, individually and/or collectively, may be configured to, based on the first screen being displayed through the cover display, obtain information on a second screen based on the second data. The at least one processor, individually and/or collectively, may be configured to change a screen displayed through the cover display from the first screen to the second screen, based on the information on the second screen. The at least one processor, individually and/or collectively, may be configured to maintain display of the second screen based on a distance between the external object and the electronic device being maintained within the designated distance.

According to an embodiment, a method of operating an electronic device may comprise: obtaining first data and second data based on an external object located within a designated distance from the electronic device. The method may comprise, based on the first data, displaying a first screen through a cover display disposed on a surface of a first housing of the electronic device. The method may comprise, based on the first screen being displayed through the cover display, obtaining information on the second screen based on the second data. The method may comprise, based on the information on the second screen, changing a screen displayed through the cover display from the first screen to the second screen. The method may comprise maintaining display of the second screen based on a distance between the external object and the electronic device being maintained within the designated distance.

According to an example embodiment, the electronic device may comprise: a display, one or more communication circuits, a memory, at least one sensor, and at least one processor, comprising processing circuitry, operably coupled with the display, the one or more communication circuits, the memory, and the at least one sensor. The at least one processor, individually and/or collectively, may be configured to: obtain first data and second data based on an external object located within a designated distance from the electronic device. The at least one processor, individually and/or collectively, may be configured to display a first screen through the display, based on the first data. The at least one processor, individually and/or collectively, may be configured to, based on the first screen being displayed through the display, obtain information on a second screen based on the second data. The at least one processor, individually and/or collectively, may be configured to change a screen displayed through the display from the first screen to the second screen, based on the information on the second screen. The at least one processor, individually and/or collectively, may be configured to maintain display of the second screen based on a distance between the external object and the electronic device being maintained within the designated distance.

According to an embodiment, A method of operating an electronic device may comprise: obtaining first data and second data based on an external object located within a designated distance from the electronic device. The method may comprise, based on the first data, displaying a first screen through the display. The method may comprise, while; based on the first screen being displayed through the display, obtaining information on a second screen based on the second data. The method may comprise, based on the information on the second screen, changing a screen displayed through the display from the first screen to the second screen. The method may comprise maintaining display of the second screen based on a distance between the external object and the electronic device being maintained within the designated distance.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
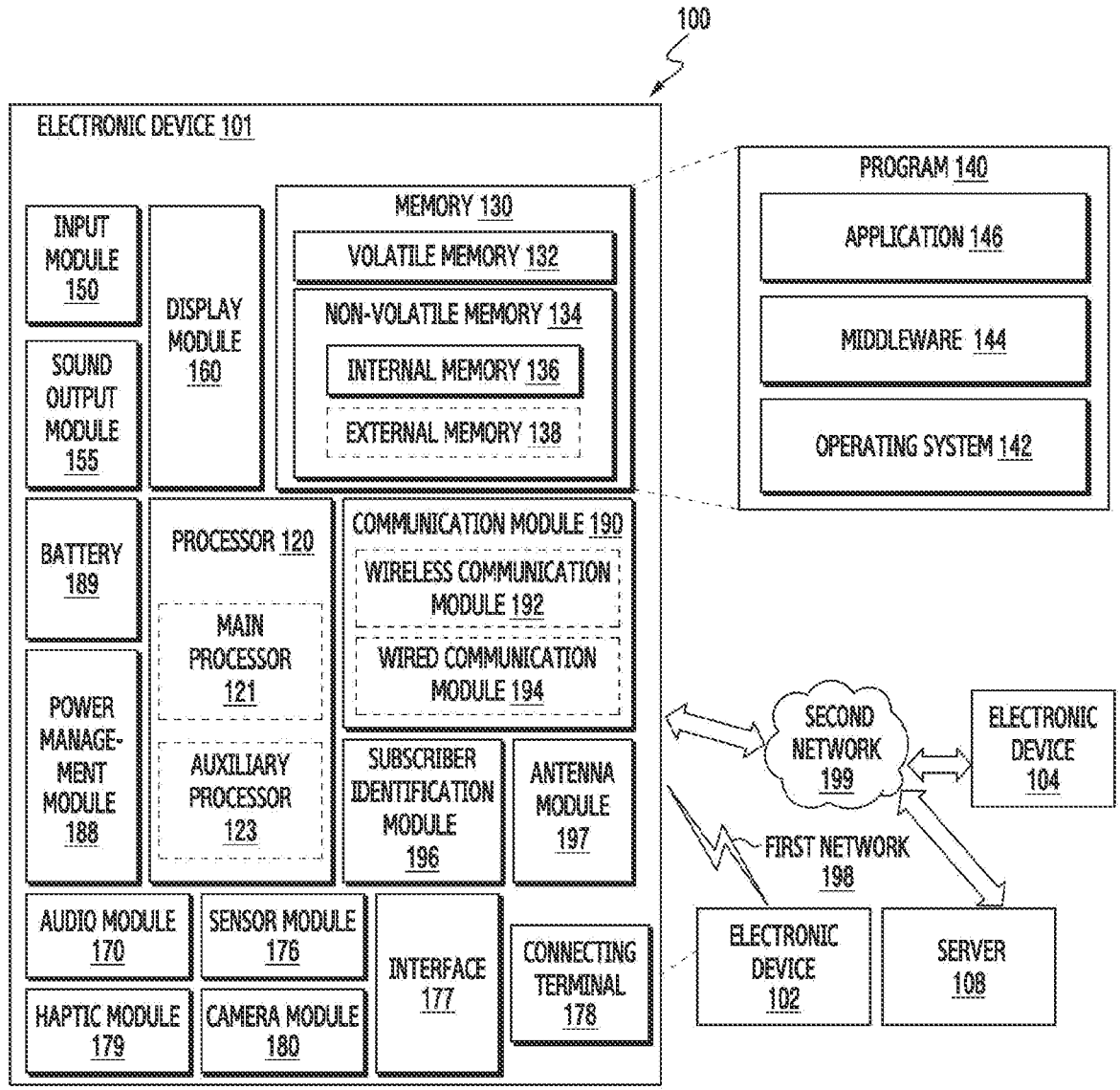
FIG. 1 is a block diagram of an electronic device in a network environment, according to various embodiments.

Hereinafter, with reference to the drawings, embodiments of the present disclosure will be described in detail so that those skilled in the art can easily practice them. However, the present disclosure may be implemented in many different forms and is not limited to the embodiments described herein. In relation to the description of the drawings, identical or similar reference numerals may be used for identical or similar components. Additionally, in the drawings and related descriptions, descriptions of well-known functions and configurations may be omitted for clarity and brevity.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (cMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing cMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101.

The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, an electronic device (e.g., the electronic device 101 of FIG. 1) may change a screen (or a theme of the screen) of the electronic device through an external object. For example, the electronic device may change the screen (or the theme of the screen) of the electronic device, based on data obtained through the external object. The electronic device may display another screen while obtaining information on a screen to be displayed. The electronic device may provide continuous screen change by displaying the other screen while obtaining the information on the screen to be displayed. In the following, the configuration and operation of the electronic device described above will be described in greater detail with reference to the drawings.

Figure 2:
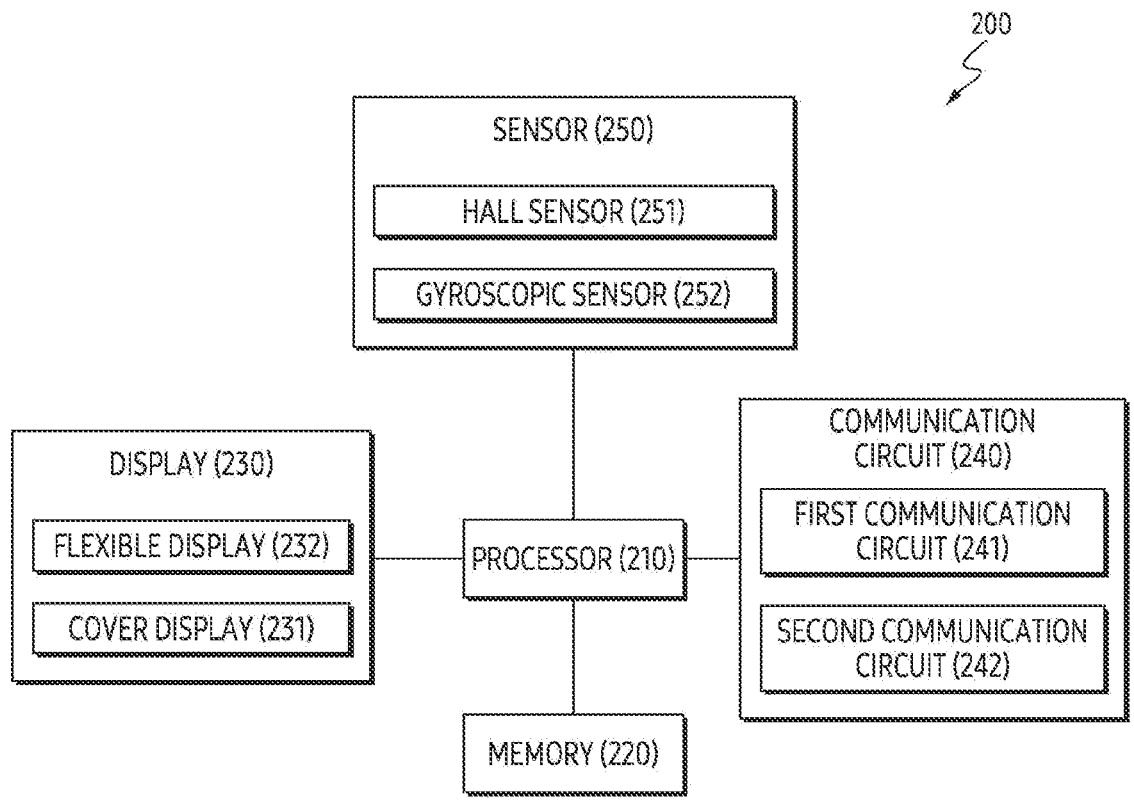
FIG. 2 illustrates an example of a simplified block diagram of an electronic device, according to various embodiments.

FIG. 2 illustrates an example of a simplified block diagram of an electronic device, according to various embodiments.

Referring to FIG. 2, an electronic device 200 may include some or all of the components of the electronic device 101 illustrated in FIG. 1. For example, the electronic device 200 may correspond to the electronic device 101 of FIG. 1.

According to an embodiment, the electronic device 200 may include a processor (e.g., including processing circuitry) 210, a memory 220, a display 230, a communication circuit 240, and/or a sensor 250. According to an embodiment, the electronic device 200 may include at least one of the processor 210, the memory 220, the display 230, the communication circuit 240, or the sensor 250. For example, at least part of the processor 210, the memory 220, the display 230, the communication circuit 240, or the sensor 250 may be omitted according to an embodiment. Although not illustrated, the electronic device 200 may include various components in addition to the processor 210, the memory 220, the display 230, the communication circuit 240, and the sensor 250.

According to an embodiment, the electronic device 200 may include a processor 210. The processor 210 may be operably coupled with or connected with the memory 220, the display 230, the communication circuit 240, and the sensor 250. The processor 210 being operably coupled or connected with the memory 220, the display 230, the communication circuit 240, and the sensor 250 may refer, for example, to the processor 210 controlling the memory 220, the display 230, the communication circuit 240, and the sensor 250.

For example, the processor 210 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 210 may control the memory 220, the display 230, the communication circuit 240, and the sensor 250. The memory 220, the display 230, the communication circuit 240, and the sensor 250 are controlled by the processor 210. For example, the processor 210 may be configured with at least one processor. For example, the processor 210 may include at least one processor. For example, the processor 210 may correspond to the processor 120 of FIG. 1.

According to an embodiment, the processor 210 may include a hardware component for processing data based on one or more instructions. For example, the hardware component for processing data may include an arithmetic and logic unit (ALU), a field programmable gate array (FPGA), and/or a central processing unit (CPU).

According to an embodiment, the electronic device 200 may include the memory 220. For example, the memory 220 may correspond to the memory 130 of FIG. 1. For example, the memory 220 may be a volatile memory unit or units. For example, the memory 220 may be a nonvolatile memory unit or units. For example, the memory 220 may be another type of computer-readable medium such as a magnetic or optical disk. For example, the memory 220 may store data obtained based on an operation (e.g., an algorithm execution operation) performed by the processor 210.

For example, the memory 220 may be used to store one or more programs. The one or more programs may include instructions that, when executed by the processor 210 of the electronic device 200, cause the electronic device 200 to perform a defined operation.

For example, in the memory 220, one or more instructions indicating calculation and/or operation to be performed by the processor 210 on data may be stored. A set of one or more instructions may be referred to as firmware, operating system, process, routine, sub-routine and/or application. For example, the electronic device 200 and/or the processor 210 may perform at least one of operations of the electronic device 200 described below when a set of plurality of instructions distributed in a form of operating system, firmware, driver, and/or application is executed. Hereinafter, an application being installed in the electronic device 200 may refer, for example, to one or more instructions provided in a form of the application are stored in the memory 220 of the electronic device 200, and that the one or more applications are stored in a format (e.g., a file with an extension specified by the operating system of the electronic device 200) executable by the processor 210 of the electronic device 200.

According to an embodiment, the electronic device 200 may include the display 230. For example, the display 230 may correspond to the display module 160 of FIG. 1.

For example, the display 230 of the electronic device 200 may output visualized information to the user. The display 230 may include, for example, and without limitation, a liquid crystal display (LCD), a plasma display panel (PDP), one or more Light Emitting Diode (LED), and/or one or more OLEDs. According to an embodiment, the display 230 may include a sensor (e.g., a touch sensor panel (TSP)) for detecting an external object (e.g., a user's finger) on the display 230. For example, based on the TSP, the electronic device 200 may detect an external object (e.g., the user's finger) contacting with the display 230 or floating on the display 230. In response to detecting the external object, the electronic device 200 may execute a function related to a specific visual object corresponding to a part of the display 230 in which the external object is contacted, among visual objects (e.g., a plurality of icons for photographing) being displayed in the display 230.

For example, the display 230 may include a cover display 231 (refer to FIG. 4) and a flexible display 232. The flexible display 232 may be deformable by an external force applied to the flexible display 232. An example of the cover display 231 and the flexible display 232 disposed in the electronic device 200 will be described in greater detail below with reference to FIGS. 3A and 3B.

According to an embodiment, the electronic device 200 may include the communication circuit 240. For example, the communication circuit 240 may correspond to at least a part of the communication module 190 of FIG. 1. For example, the communication circuit 240 may be used for a direct (e.g., wired) communication. For example, the communication circuit 240 may be used for various radio access technologies (RATs). For example, the communication circuit 240 may be used to perform a cellular communication. For example, the communication circuit 240 may be used to perform a Bluetooth communication, a wireless local area network (WLAN) communication, a near field communication (NFC), or an ultra-wideband (UWB) communication.

For example, the communication circuit 240 may include a first communication circuit 241 and a second communication circuit 242. The first communication circuit 241 may be used to perform a near field communication (NFC). The second communication circuit 242 may be used to transmit and/or receive information from an external electronic device. For example, the second communication circuit 242 may be used to perform at least one of a cellular communication, a wireless LAN communication, and/or a wired communication with the external electronic device.

According to an embodiment, the electronic device 200 may include the sensor 250. The sensor 250 of the electronic device 200 may include various sensors and generate electronic information processable by the processor 210 and/or the memory 220 from non-electronic information related to the electronic device 200. The electronic information generated by the sensor 250 may be stored in the memory 220, processed by the processor 210, or transmitted to another electronic device distinct from the electronic device 200. The sensors 250 may be one or more.

The sensor 250 may include a hall sensor 251 for identifying an angle between housings included in the electronic device 200. The hall sensor 251 may include one or more magnets and/or one or more magnetic sensors. At least one of the one or more magnets 251 or the one or more magnetic sensors, which are included in the hall sensor, may be disposed at different locations in the electronic device 200. A location relationship in the electronic device 200 of the one or more magnets and/or the one or more magnetic sensors may be changed according to a shape of the electronic device 200. The electronic device 200 may measure a change in the location relationship through the one or more magnetic sensors. The change in the location relationship may cause a change in a magnetic field formed by the one or more magnets. The electronic device 200 may obtain a power signal indicating the change in the magnetic field, using the hall sensor 251. For example, the electronic device 200 may distinguish a posture or a state (e.g., a folding state or an unfolding state) using the power signal obtained from the hall sensor 251. For example, the electronic device 200 may receive data indicating a state of the electronic device 200 from the hall sensor 251. For example, the hall sensor 251 may output data indicating a shape of the flexible display 230. The shape of the flexible display 230 may be changed by being folded or unfolded by a folding axis (e.g., a folding axis 337 to be described later in FIG. 3A). For example, the hall sensor 251 may output different data indicating the shape of the flexible display 230. Embodiments are not limited thereto, and according to an embodiment, the processor 210 may identify the angle using an inertia measurement unit (IMU) sensor.

For example, the sensor 250 may include a gyroscopic sensor 252 for measuring a physical motion of the electronic device 200. The gyroscopic sensor 252 may output electrical information indicating the magnitude of the angular velocity measured in each of a plurality of designated axes (e.g., x-axis, y-axis, and z-axis) perpendicular to each other. According to an embodiment, the processor 210 of the electronic device 200 may measure a posture of the electronic device 200 in a physical space, based on the electrical information outputted from the gyroscopic sensor 252. The posture measured by the electronic device 200 may indicate orientation of the electronic device 200 measured by the gyroscopic sensor 252 and/or a shape of the electronic device 200 measured by the hall sensor 251. The electronic device 200 may change a screen displayed on the display 230 (e.g., the cover display 231) of the electronic device 200 based on the measured posture.

Figure 3A:
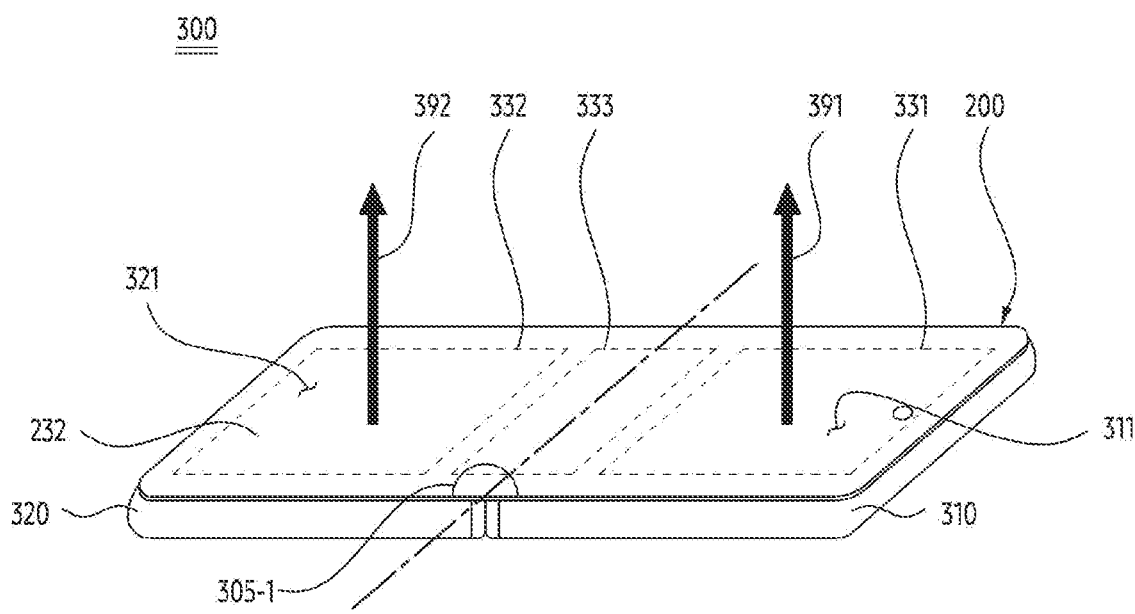
FIGS. 3A and 3B illustrate an example of a location relationship between a first housing and a second housing in an unfolding state and a folding state of an electronic device, according to various embodiments.
Figure 3B:
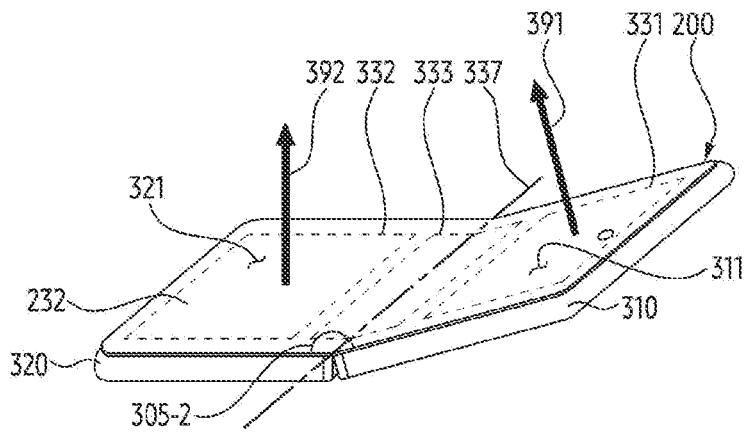
Figure 3B:
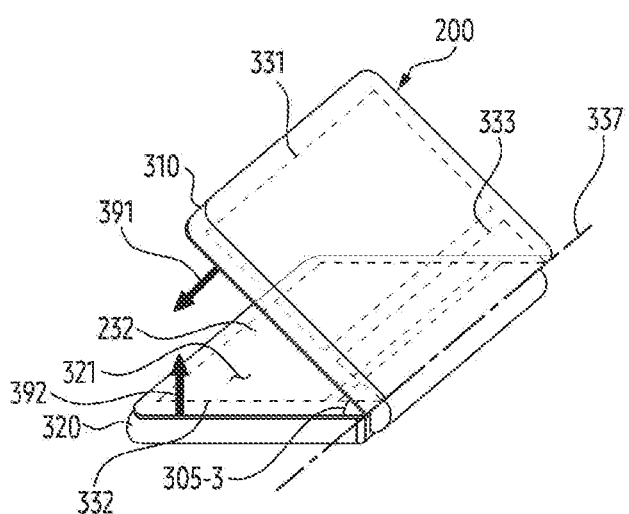
Figure 3B:
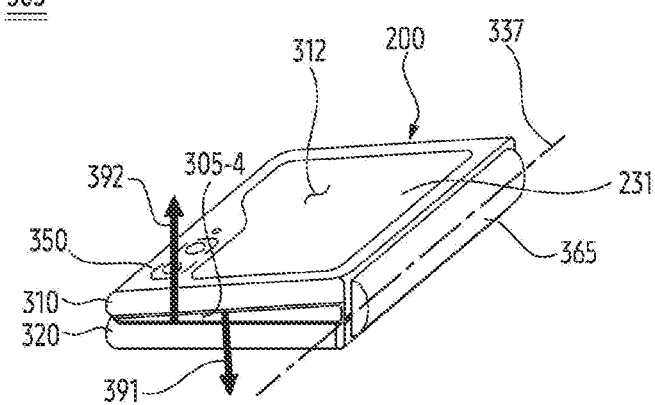

FIGS. 3A and 3B illustrate an example of a location relationship between a first housing and a second housing in an unfolding state and a folding state of an electronic device, according to various embodiments.

Referring to FIGS. 3A and 3B, an electronic device 200 may be an example of the electronic device 101 of FIG. 1. A first housing 310, a second housing 320, and a folding housing 365 may be included in the electronic device 200. The electronic device 200 may include a first housing including a first surface 311 and a second surface 312 opposite to the first surface. The electronic device 200 may include a second housing 320 including a third surface 321 and a fourth surface (not shown) opposite to the third surface. The electronic device 200 may include a folding housing 365 connecting the first housing 310 and the second housing 320 pivotably (e.g., rotatably). At least a part of a flexible display 232 may be disposed on a surface (e.g., the first surface 311) of the first housing 310 and a surface (e.g., the third surface 321) of the second housing 320. For example, at least a part of the flexible display 232 may be disposed on the first surface 311 and the third surface 321 across the folding housing 365. A first display area 331, a second display area 332, and a third display area 333 may be included in the flexible display 232. The folding housing 365 may include a hinge structure. A cover display 231 (refer to FIG. 4) may be disposed on the second surface 312. The electronic device 200 may include a camera facing a direction in which the second surface 312 faces. The camera may be disposed in a partial area 350 of the second surface 312.

According to an embodiment, the electronic device 200 may provide an unfolding state in which the first housing 310 and the second housing 320 are fully folded out by the folding housing 365. For example, referring to FIG. 3A, the electronic device 200 may be in a state 300, which is the unfolding state. For example, the state 300 may refer, for example, to a state in which a first direction 391 facing the first surface 311 corresponds to a second direction 392 facing the third surface 321. For example, in the state 300, the first direction 391 may be parallel to the second direction 392. For example, in the state 300, the first direction 391 may be the same as the second direction 392.

According to an embodiment, the first surface 311 and the third surface 321 in the state 300 may form substantially one plane. For example, an angle 305-1 between the first surface 311 and the third surface 321 in the state 300 may be 180 degrees. The state 300 may refer, for example, to a state capable of providing substantially all of the entire display area of the flexible display 232 on one plane. The state 300 may refer, for example, to a state capable of providing all of the first display area 331, the second display area 332, and the third display area 333 on one plane. For example, in the state 300, the third display area 333 may not include a curved surface. For example, the unfolding state may be referred to as an outspread state (or an outspreading state). Hereinafter, different states of the electronic device 200 based on angles 305-2, 205-3, and 205-4 will be described in greater detail below.

Referring to FIG. 3B, according to an embodiment, the electronic device 200 may provide a folding state in which the first housing 310 and the second housing 320 are folded in by the folding housing 365. For example, the electronic device 200 may be in the folding state including a state 301, a state 302, and a state 303. For example, the folding state including the state 301, the state 302, and the state 303 may refer, for example, to a state in which the first direction 391 facing the first surface 311 is distinguished from the second direction 392 facing the third surface 321. For example, in the state 301, an angle between the first direction 391 and the second direction 392 is 45 degrees, and the first direction 391 and the second direction 392 may be distinguished from each other. For example, in the state 302, the angle between the first direction 391 and the second direction 392 is 150 degrees, and the first direction 391 and the second direction 392 may be distinguished from each other. For example, in the state 303, the angle between the first direction 391 and the second direction 392 is substantially 180 degrees, and the first direction 391 and the second direction 392 may be distinguished from each other.

According to an embodiment, an angle between the first surface 311 and the third surface 321 in the folding state may be greater than or equal to 0 degrees and less than 180 degrees. For example, in the state 301, an angle 305-2 between the first surface 311 and the third surface 321 may be 135 degrees. In the state 302, an angle 305-3 between the first surface 311 and the third surface 321 may be 30 degrees. In the state 303, an angle 305-4 between the first surface 311 and the third surface 321 may be substantially 0 degrees. For example, the folding state may be referred to as a folded state.

In an embodiment, the folding state may include a plurality of sub-folding states. For example, referring to FIG. 3B, the folding state may include the state 303, which is a fully folding state in which the first surface 311 substantially overlaps on the third surface 321 by a rotation provided through the folding housing 365, and the plurality of sub-folding states including the state 301 and state 302, which are intermediate folding states between the state 303 and the unfolding state (e.g., the state 300 in FIG. 3A). For example, as the first surface 311 and the third surface 321 face each other by the folding housing 365, the electronic device 200 may provide the state 303 in which the entire area of the first display area 331 substantially fully overlaps the entire area of the second display area 332. For example, the electronic device 200 may provide the state 303 in which the first direction 391 is substantially opposite to the second direction 392. For example, the state 303 may refer, for example, to a state in which the flexible display 232 is covered within the user's field of view looking at the electronic device 200. However, it is not limited thereto.

According to an embodiment, the flexible display 232 may be curved by a rotation provided through the folding housing 365. For example, in the flexible display 232, the third display area 333 may be curved according to a folding operation. For example, the third display area 333 may be within a curved state to prevent and/or reduce damage to the flexible display 232 within the fully folding state. Unlike the third display area 333 being curved, in the fully folding state, the entire first display area 331 may fully overlap on the entire second display area 332.

Referring to FIGS. 3A and 3B, although an example in which the flexible display 232 of the electronic device 200 includes one folding display area (e.g., the third display area 333) or the electronic device 200 includes one folding housing (e.g., the folding housing 365), this is for the convenience of explanation. According to an embodiment, the flexible display 232 of the electronic device 200 may include a plurality of folding display areas. For example, the flexible display 232 of the electronic device 200 may include two or more folding display areas, and the electronic device 200 may include two or more folding housings to provide each of the two or more folding areas.

According to an embodiment, in the state 303, the electronic device 200 may display a screen through the cover display 231. The electronic device 200 may display a screen using the cover display 231, based on an external object located within a designated distance from the electronic device 200. For example, the external object may be fixed through a case coupled to the electronic device 200. Hereinafter, an example of a case for fixing the external object will be described.

Figure 4:
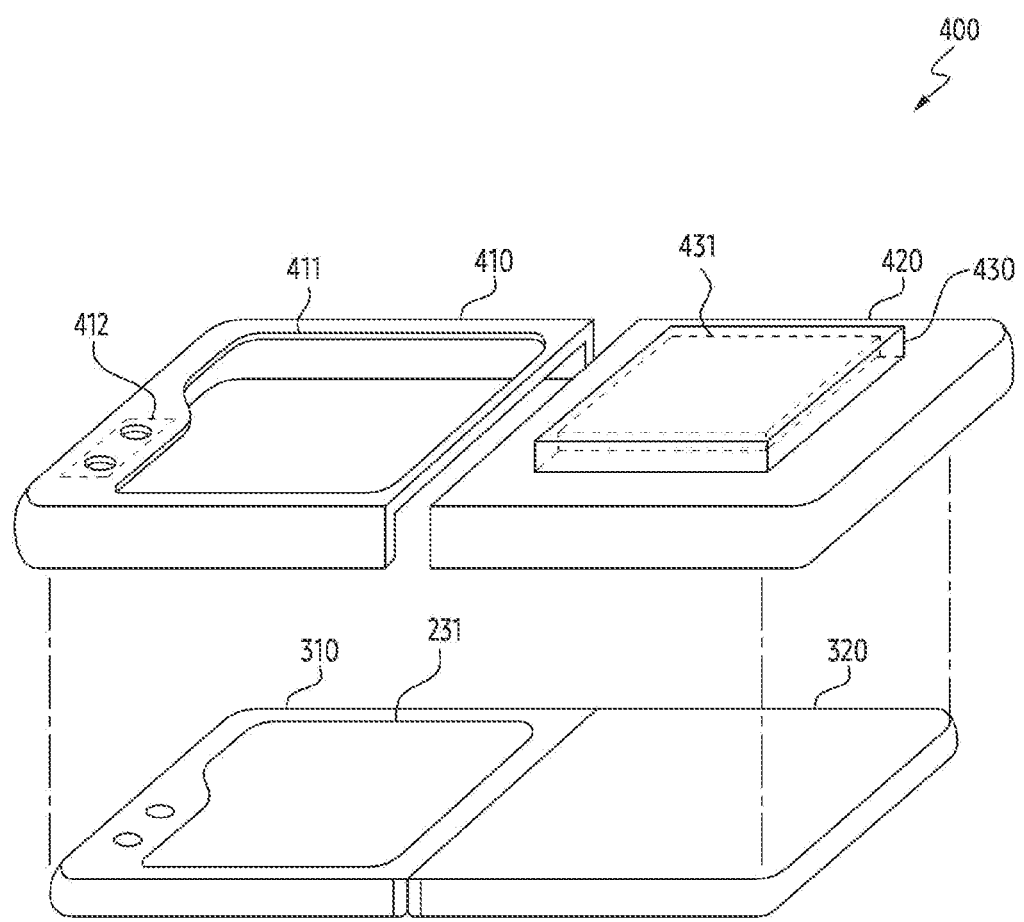
FIG. 4 illustrates an example of a case coupled to an electronic device, according to various embodiments.

FIG. 4 illustrates an example of a case coupled to an electronic device, according to various embodiments.

Referring to FIG. 4, a case 400 may be formed to protect a housing (or exterior) of an electronic device 200. For example, the case 400 may include a first frame 410 and a second frame 420.

For example, the first frame 410 may be coupled to a first housing 310 of the electronic device 200. For example, the first frame 410 may be formed so that the first housing 310 of the electronic device 200 is inserted into and coupled. For example, when the case 400 and the electronic device 200 are coupled to each other, the first frame 410 may surround at least a part of an outer surface (e.g., an outer surface of the first housing 310) of the electronic device 200. For example, when the case 400 and the electronic device 200 are coupled to each other, the first frame 410 may be in contact with the outer surface (e.g., the outer surface of the first housing 310) of the electronic device 200. According to an embodiment, a size of the first frame 410 may correspond to a size of the first housing 310 of the electronic device 200. For example, the first frame 410 may be made of a non-conductive material. The first frame 410 may be manufactured through an injection process using a resin including a non-conductive material. However, it is not limited thereto. According to embodiments, at least a part of the first frame 410 may be made of a conductive material.

For example, the first frame 410 may include a first display hole 411 for the cover display 231 and/or at least one camera hole 412 for a camera.

As an example, when the case 400 and the electronic device 200 are coupled to each other, the first display hole 411 may overlap the cover display 231 of the electronic device 200. The first display hole 411 may penetrate the first frame 410. The cover display 231 may be exposed through the first display hole 411.

As an example, when the case 400 and the electronic device 200 are combined, the at least one camera hole 412 may overlap at least one camera of the electronic device 200. The at least one camera hole 412 may penetrate the first frame 410. At least one camera may be exposed through the at least one camera hole 412.

For example, the second frame 420 may be coupled to the second housing 320 of the electronic device 200. For example, the second frame 420 may be formed so that the second housing 320 of the electronic device 200 is inserted into and coupled. For example, when the case 400 and the electronic device 200 are coupled, the second frame 420 may surround at least a part of an outer surface (e.g., an outer surface of the second housing 320) of the electronic device 200. For example, when the case 400 and the electronic device 200 are coupled, the second frame 420 may contact to the outer surface (e.g., the outer surface of the second housing 320) of the electronic device 200. According to an embodiment, a size of the second frame 420 may correspond to a size of the second housing 320 of the electronic device 200. For example, the second frame 420 may be made of a non-conductive material. For example, the second frame 420 may be manufactured through an injection process using a resin including a non-conductive material. However, it is not limited thereto. According to embodiments, at least a part of the second frame 420 may be made of a conductive material.

For example, the second frame 420 may include a rear member 430. The rear member 430 may form a slot 431 for inserting an external object (e.g., a card or a palette). The external object may be inserted into the slot 431 to be coupled thereto. For example, in a state in which an external object is inserted into the slot 431, the electronic device 200 may identify that a distance between the external object and the electronic device 200 is within a designated distance.

Figure 5:
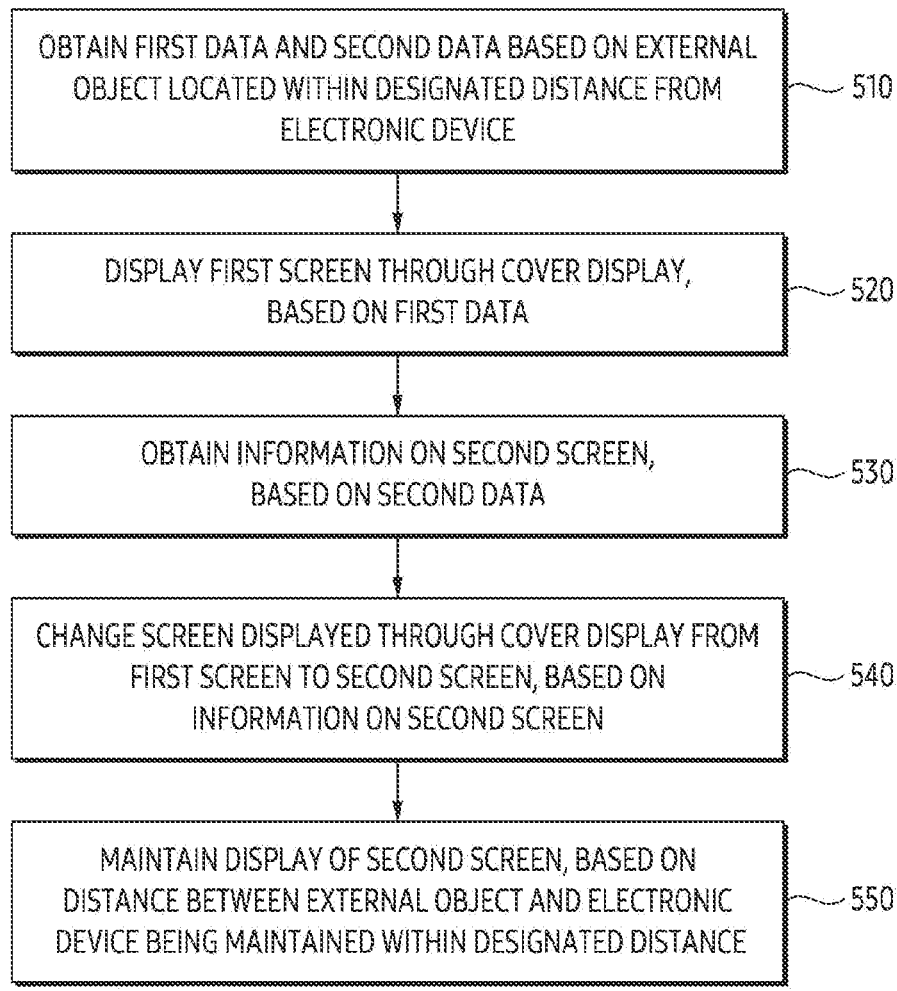
FIG. 5 is a flowchart illustrating an operation of an electronic device, according to various embodiments.

FIG. 5 is a flowchart illustrating an operation of an electronic device, according to various embodiments. An electronic device 200 may perform operations illustrated in FIG. 5. Hereinafter, the operations illustrated in FIG. 5 will be described as being performed by, for example, a processor 210.

Referring to FIG. 5, in operation 510, the processor 210 may obtain first data and second data based on an external object located within a designated distance from the electronic device 200. For example, the external object may include a card, a case, and/or an accessory. For example, the processor 210 may identify that the external object is located within a designated distance from the electronic device 200, based on an external object being coupled to the case 400 coupled to the electronic device 200.

According to an embodiment, the processor 210 may obtain data using a first communication circuit 241. For example, the first communication circuit 241 may be used to perform a near field communication (hereinafter, NFC). The processor 210 may obtain data from an external object using the NFC. As an example, the external object may include a chip for performing the NFC. The processor 210 may obtain data from the chip.

For example, the processor 210 may obtain the first data and the second data using the first communication circuit 241. For example, the processor 210 may obtain the first data and the second data from the external object using the NFC.

The first data may be related to a first screen. The second data may be related to a second screen. The first data may be used to display the first screen. The second data may be used to display the second screen.

According to an embodiment, based on obtaining the first data and the second data, the processor 210 may display an object (e.g., a pop-up window, a notification message) for receiving an input on whether to obtain (e.g., download) information on the second screen to a user through a cover display 231 (or a flexible display 232). For example, the processor 210 may perform operation 520 based on receiving an input requesting the user to obtain information on the second screen.

In operation 520, the processor 210 may display the first screen through the cover display 231, based on the first data. For example, the first data may be configured with an alpha red green blue (ARGB) value. The processor 210 may display the first screen having a color according to the ARGB value, based on the first data. For example, the first data may include information on an image. The processor 210 may display the image, based on the first data.

In operation 530, while the first screen is displayed through the cover display 231, the processor 210 may obtain information on the second screen based on the second data.

According to an embodiment, the processor 210 may obtain information on the second screen, based on the second data in response to obtaining the first data and the second data. The processor 210 may display the first screen through the cover display 231 while obtaining information on the second screen.

According to an embodiment, the processor 210 may display a screen related to the first screen through the flexible display 232. For example, in the state in which the flexible display 232 is activated, the processor 210 may display a screen related to the first screen on the flexible display 232, based on obtaining the first data and the second data. For example, the screen related to the first screen may correspond to the first screen. According to an embodiment, while the first screen is displayed on the cover display 231, the screen related to the first screen may be displayed on the flexible display 232.

According to an embodiment, the processor 210 may obtain information on the second screen from a memory 220 of the electronic device 200. The processor 210 may obtain information on the second screen stored in the memory 220. For example, when the second screen is outputted through the cover display 231, the processor 210 may store information on the second screen. The processor 210 may obtain information on the second screen from the memory 220 while the first screen is displayed through the cover display 231.

According to an embodiment, the processor 210 may obtain information on the second screen from an external electronic device (e.g., a server). For example, a second communication circuit 242 may be used to communicate with an external electronic device. The processor 210 may communicate with an external electronic device using the second communication circuit 242. The processor 210 may obtain information on the second screen from an external electronic device (e.g., a server) using the second communication circuit 242. For example, the processor 210 may request information on the second screen from the external electronic device using the second communication circuit 242. The processor 210 may receive information on the second screen from the external electronic device using the second communication circuit 242. For example, the second data may include information on an address for downloading the information on the second screen. The processor 210 may download the information on the second screen, based on the second data.

For example, the information on the second screen may include not only data on the second screen, but also multimedia data related to the second screen and data related to vibration output related to the second screen. The multimedia data related to the second screen may include a ringtone, a system sound, and a notification sound. The data related to the vibration output related to the second screen may include data on a vibration pattern outputted according to a user input and/or a posture of the electronic device 200.

In operation 540, the processor 210 may change a screen displayed through the cover display 231 from the first screen to the second screen, based on the information on the second screen. For example, the processor 210 may display the first screen while the information on the second screen is obtained, and display the second screen based on completion of obtaining the information on the second screen. For example, the first screen may be a standby screen for displaying the second screen. For example, the second screen may be a screen in which a theme of the screen displayed through the cover display 231 is changed.

According to an embodiment, the first screen may be related to the second screen.

For example, the first screen may have a representative color for the second screen. The representative color for the second screen may be displayed on the first screen. The processor 210 may first display the representative color for the second screen through the first screen, and then display the second screen.

For example, on the first screen, an image of a first image quality may be displayed. On the second screen, an image of a second image quality may be displayed. The second image quality may be higher than the first image quality. The processor 210 may first display an image of low image quality, and then display an image of high image quality, based on completion of obtaining the image of high image quality.

For example, on the first screen, an image (e.g., a representative image or thumbnail) for a designated video may be displayed. On the second screen, the designated video may be displayed. While obtaining the designated video, the processor 210 may first display the image for the designated video, and display the designated video based on completion of obtaining the designated video.

For example, a designated image (e.g., an image including a stripe and a character) may be displayed on the second screen. A simplified image (e.g., a stripe image) related to the designated image may be displayed on the first screen. The processor 210 may first display the simplified image related to the designated image, and display the designated image based on the completion of obtaining the designated image.

For example, the first data may include first instructions. The processor 210 may display the first screen identified based on the first instructions. The second data may include second instructions. The processor 210 may display the second screen identified based on the second instructions. The first instructions may have lower complexity of algorithms than the second instructions.

In operation 550, the processor 210 may maintain display of the second screen based on a distance between an external object and the electronic device 200 being maintained within a designated distance. For example, the processor 210 may maintain the display of the second screen based on a state in which the external object is coupled to the case 400 (or inserted into the slot 431) being maintained.

According to an embodiment, the processor 210 may identify a state of the electronic device 200 as one of a first state (e.g., a folding state) and a second state (e.g., an unfolding state) based on an angle between the first housing 310 and the second housing 320. For example, the first state may include a state in which the angle between the first housing 310 and the second housing 320 is within a designated angle range (e.g., 10 degrees). The second state may include a state in which the angle between the first housing 310 and the second housing 320 is out of the designated angle range (e.g., 10 degrees). For example, the processor 210 may perform operations 510 to 550 while a state of the electronic device 200 is the first state.

For example, the processor 210 may obtain third data together with the first data and the second data from the external object. For example, when the third data is set to the first value, the processor 210 may change a display direction of the second screen, based on a change in the state of the electronic device 200 from the first state to the second state. For example, when the third data is set to the second value, the processor 210 may maintain the display direction of the second screen even when a state of the electronic device 200 is changed from the first state to the second state.

Figure 6:
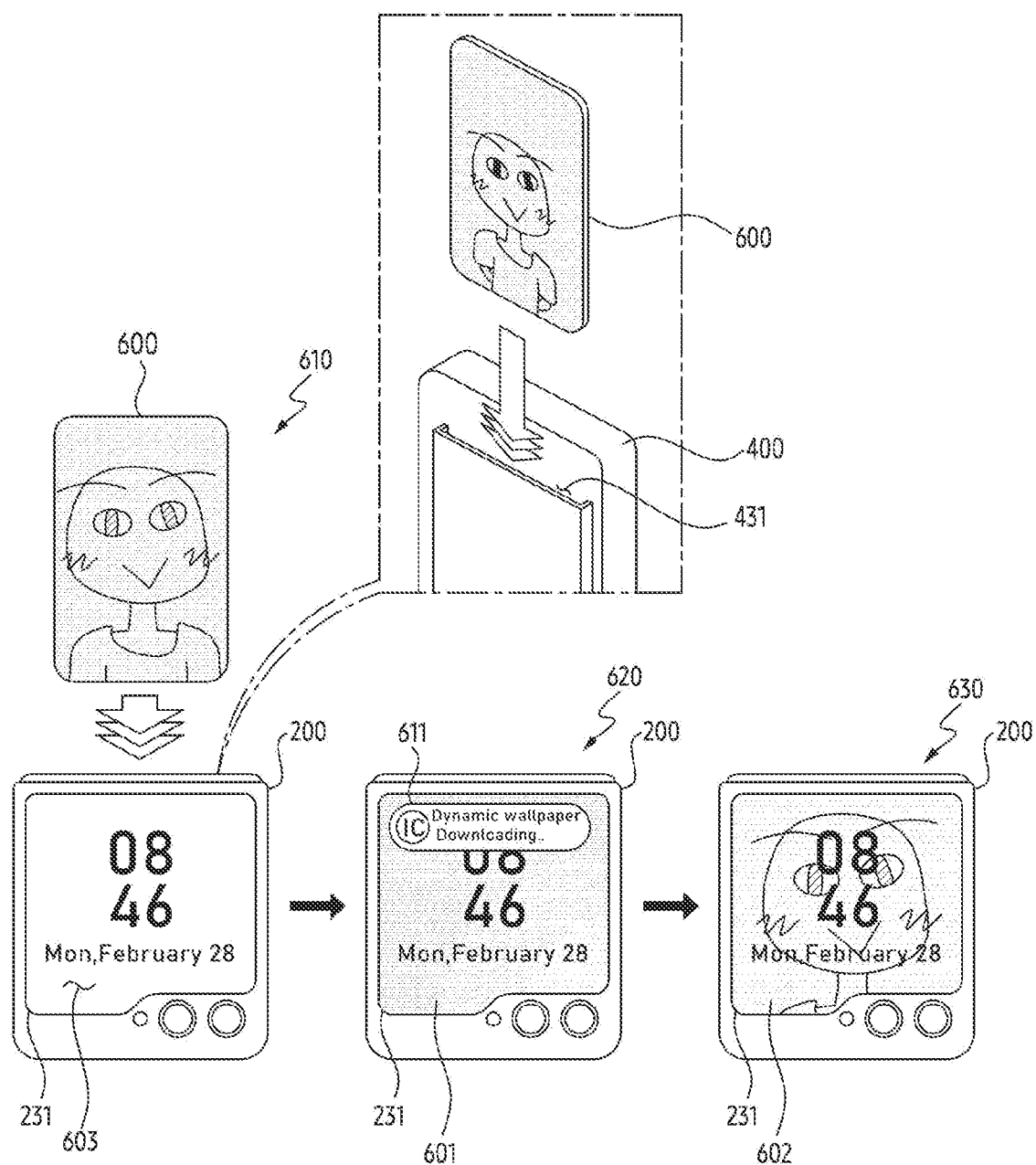
FIG. 6 illustrates an example of an operation of an electronic device for changing a screen, according to various embodiments.

FIG. 6 illustrates an example of an operation of an electronic device for changing a screen, according to various embodiments.

Referring to FIG. 6, in a state 610, an electronic device 200 may be a state coupled with a case 400. The processor 210 may identify that the external object 600 is inserted into a slot 431. The processor 210 may identify that an external object 600 is inserted into the slot 431, based on identifying that a distance between the electronic device 200 and the external object 600 is within a designated distance. According to an embodiment, the case 400 may include a component for identifying whether the external object 600 is inserted (or coupled). The processor 210 may obtain information from the case 400. The processor 210 may identify that the external object 600 is inserted into the slot 431 based on the information obtained from the case 400.

In the state 610, when the distance between the electronic device 200 and the external object 600 is out of the designated distance, the processor 210 may display a basic screen 603 through the cover display 231. For example, the basic screen 603 may refer, for example, to a screen basically provided by the electronic device 200. For example, the basic screen 603 may refer, for example, to a screen that is not changed through the external object.

In a state 620, the processor 210 may identify that the distance between the electronic device 200 and the external object is within the designated distance. The processor 210 may obtain first data and second data from the external object. For example, the processor 210 may obtain the first data and the second data through NFC using a first communication circuit 241.

The processor 210 may display a first screen 601 through the cover display 231 based on the first data. While the first screen 601 is displayed through the cover display 231, the processor 210 may obtain information on a second screen 602. The processor 210 may display an object 611 indicating that information on the second screen 602 is being obtained, superimposed on the first screen 601.

In a state 630, the processor 210 may complete obtaining information on the second screen. The processor 210 may change a screen displayed through the cover display 231 from the first screen 601 to the second screen 602 based on the information on the second screen. The processor 210 may maintain displaying the second screen 602, based on the distance between the external object 600 and the electronic device 200 being maintained within the designated distance.

For example, the second screen 602 may be related to the first screen 601. For example, the first screen 601 may have a representative color for the second screen 602. The first data may include an ARGB value for the representative color for the second screen 602.

The processor 210 may obtain first data including information on the representative color for the second screen 602 from the external object 600. While the information on the second screen 602 is obtained, the processor 210 may display the first screen 601 based on the first data. The processor 210 may display the first screen 601 within a time interval for displaying the second screen 602. The processor 210 may provide an improved user experience by displaying the first screen 601 within the time interval for displaying the second screen 602.

According to an embodiment, the second screen 602 may be a screen in which a theme of the screen displayed through the cover display 231 is changed. The processor 210 may display a user interface through the second screen 602. For example, the user interface may include an icon, a widget, a lock screen, a font, a font color, a home screen, and/or a wallpaper.

The processor 210 may display a second screen 602 including a user interface changed through the external object 600. The processor 210 may display the second screen 602 including a user interface changed based on data (e.g., the first data and the second data) stored in the external object 600. Hereinafter, a configuration of a system for changing a theme of the screen of the electronic device 200 will be described in greater detail with reference to FIG. 7.

Figure 7:
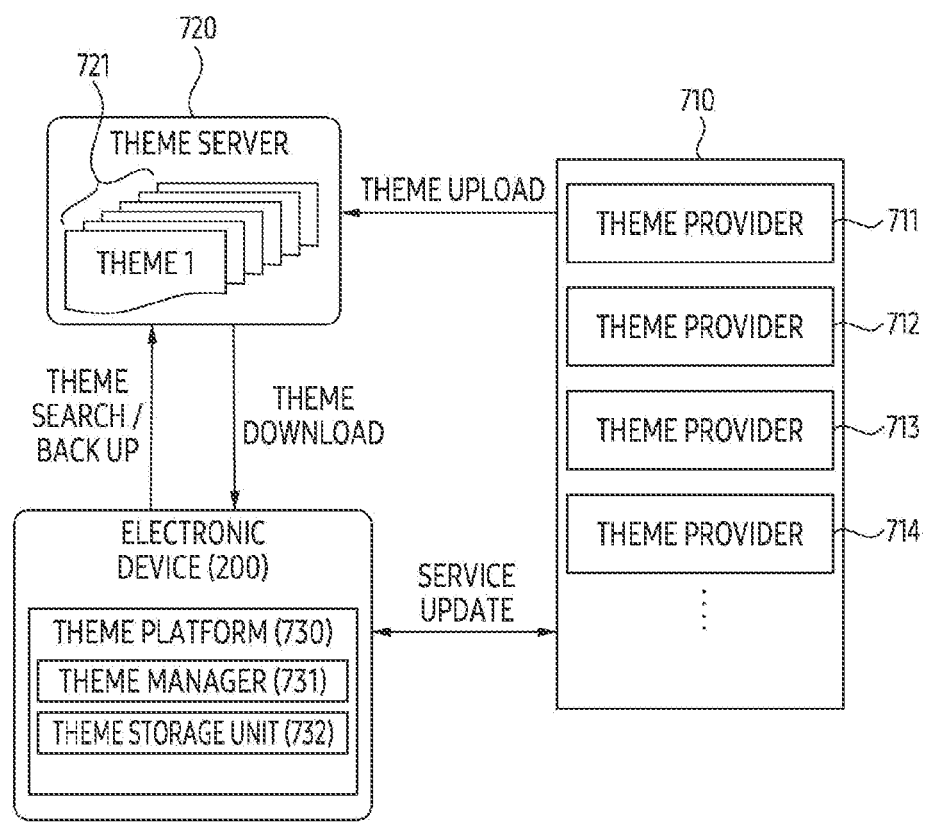
FIG. 7 illustrates an example of an environment for providing a service for changing a screen according to various embodiments.

FIG. 7 illustrates an example of an environment for providing a service for changing a screen according to various embodiments.

Referring to FIG. 7, a theme server 720 may be set to store a plurality of themes. For example, the theme server 720 may be an example of the external electronic device of FIG. 5.

According to an embodiment, a plurality of theme providers 710 may include, for example, a theme provider 711, theme provide 712, theme provider 713 and theme provider 714. Each of the plurality of theme providers 710 may create (or product) a theme using a theme authorizing tool. For example, the theme authorizing tool may be distributed from an administrator of the theme server 720. Each of the plurality of theme providers 710 may upload a created theme to the theme server 720. The theme server 720 may store the theme uploaded from each of the plurality of theme providers 710. Each of the plurality of theme providers 710 may update a theme. Each of theme providers 710 may upload the updated theme to the theme server 720. The theme server 720 may store the updated theme from each of the plurality of theme providers 710.

According to an embodiment, the processor 210 may change a user interface using an application (e.g., a theme application) for changing a theme of the user interface. For example, the processor 210 of the electronic device 200 may change the theme of the user interface by changing at least one of an icon, widget, lock screen, font, font color, home screen, and/or wallpaper within a screen (e.g., a screen displayed through the cover display 231). For example, the processor 210 may set a framework of the electronic device 200 as a framework set based on a designated theme. The processor 210 may display a user interface based on the framework set based on the designated theme.

For example, the processor 210 may perform an operation related to the theme of the user interface using a theme platform 730. The processor 210 may perform an operation for managing the theme of the user interface using programs set in the theme platform 730.

For example, the theme platform 730 may include a theme manager 731 and a theme storage unit 732. The theme manager 731 may search for a plurality of themes 721 stored in the theme server 720 or back up themes stored in the theme storage unit 732. The theme manager 731 may obtain (e.g., download) at least one theme from the theme server 720, and store at least one obtained theme in the theme storage unit 732.

Figure 8:
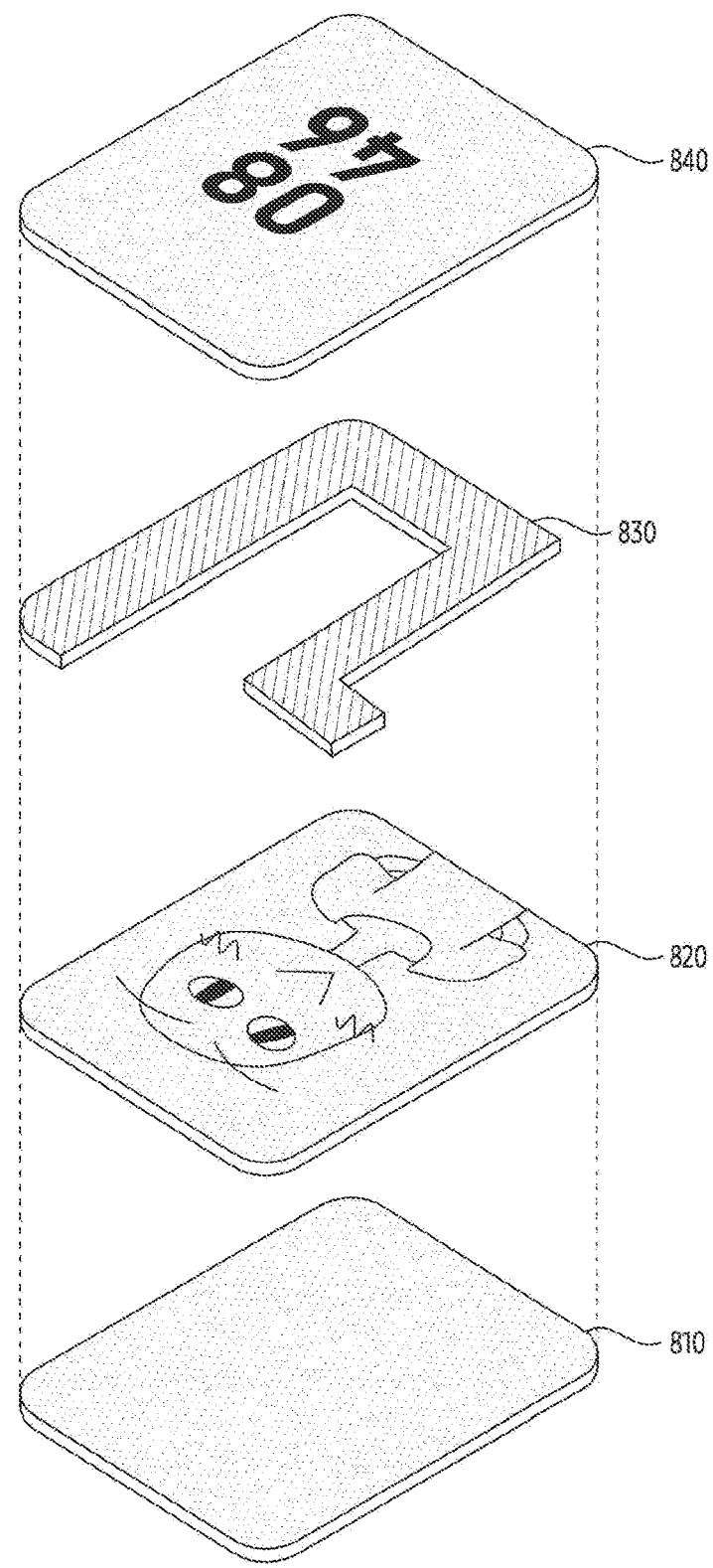
FIG. 8 illustrates an example layers for configuring a screen of an electronic device, according to various embodiments.

FIG. 8 illustrates an example of layers for configuring a screen of an electronic device, according to various embodiments.

Referring to FIG. 8, a processor 210 may configure a screen displayed on a display 230 (e.g., the cover display 231) of the electronic device 200 based on a plurality of layers.

According to an embodiment, the plurality of layers may include at least one of a background layer 810, a user image layer 820, a decoration layer 830, and/or an information layer 840. For example, the background layer 810, the user image layer 820, the decoration layer 830, and the information layer 840 may be sequentially displayed. The processor 210 may display a screen based on sequentially displaying the background layer 810, the user image layer 820, the decoration layer 830, and the information layer 840.

For example, the user image layer 820 may be displayed, superimposed on the background layer 810. The decoration layer 830 may be displayed, superimposed on the user image layer 820. The information layer 840 may be displayed, superimposed on the decoration layer 830. The above-described sequence is merely an example, and a sequence in which a plurality of layers are displayed may be changed. According to an embodiment, the background layer 810 and the information layer 840 may be essentially displayed. The user image layer 820 and the decoration layer 830 may be omitted according to a type of screen (or cover).

For example, the background layer 810 may be used to display a color of a background and/or a graphic for the background. The processor 210 may set a color and/or a graphic of the entire screen through the background layer 810.

For example, the user image layer 820 may be used to display an image set by the user. The processor 210 may display an image stored in a gallery on a screen through the user image layer 820.

For example, the decoration layer 830 may be used to display a frame, an initial frame, and/or a widget for an image set through the user image layer 820. The processor 210 may display an additional image superimposed on the image set through the user image layer 820, using the decoration layer 830. According to an embodiment, the decoration layer 830 may be disposed on a lower end of the background layer 810. For example, a clock screen to which the lasso effect is applied may be disposed on a lower end of the background layer 810. For example, the decoration layer 830 for displaying the clock screen may be disposed on a lower end of the background layer 810. According to an embodiment, the decoration layer 830 may be edited within the cover display 231. The processor 210 may display an interface for changing a type and/or color of the decoration layer 830 through the cover display 231. A user may change the type and/or color of the decoration layer 830 through the cover display 231.

For example, the information layer 840 may be used to display at least one of a clock, a date, a notification, and/or battery information. The processor 210 may display an object indicating information changed over time through the information layer 840.

Figure 9:
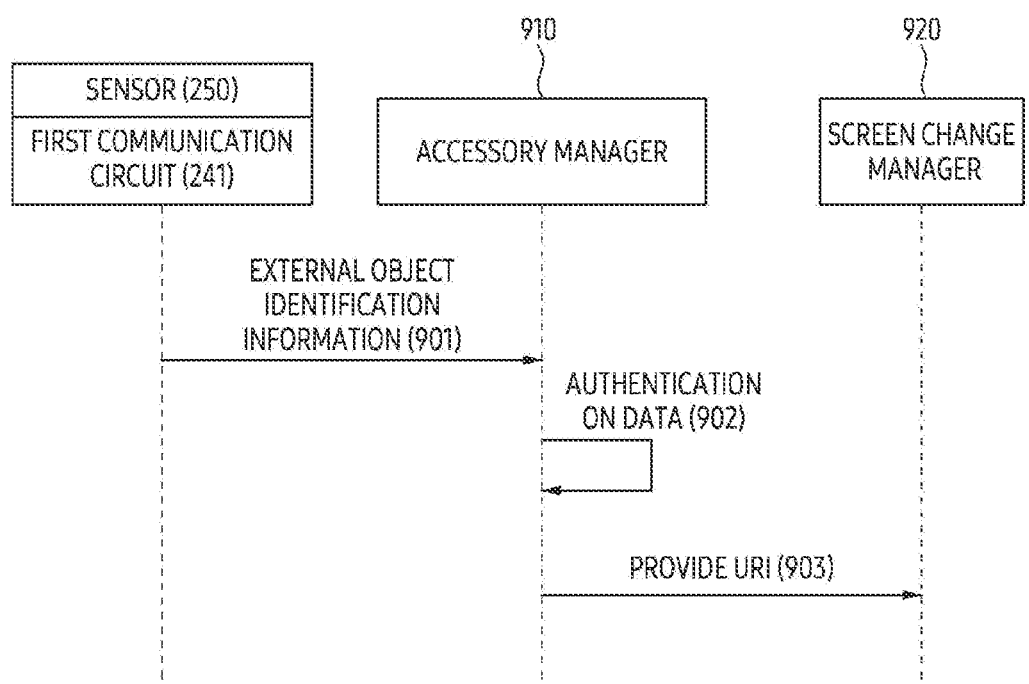
FIG. 9 illustrates an example of an operation of an electronic device when an external object approaches, according to various embodiments.

FIG. 9 illustrates an example of an operation of an electronic device when an external object approaches, according to various embodiments.

Referring to FIG. 9, a memory 220 of an electronic device 200 may store programs (e.g., an accessory manager 910 and a screen change manager 920) designed to change a screen of a display 230 (e.g., the cover display 231) of the electronic device 200. The processor 210 may perform an operation for changing a screen according to the approach of an external object, using the programs (e.g., an accessory manager 910 and a screen change manager 920) designed to change the screen of the display 230. According to an embodiment, the accessory manager 910 and/or the screen change manager 920 may be configured as a module included in the processor 210.

In operation 901, the processor 210 may provide external object identification information to the accessory manager 910 through a sensor 250 or a first communication circuit 241. For example, the external object identification information may include data (e.g., the first data, the second data, and the third data) obtained from an external object. According to an embodiment, the external object identification information may include information on detachment and/or attachment of the external object.

For example, the processor 210 may identify that a location of the external object is within a designated distance from the electronic device 200 using the sensor 250. The processor 210 may provide the external object identification information to the accessory manager 910 through the sensor 250. For example, the processor 210 may identify that the location of the external object is out of the designated distance from the electronic device 200 using the sensor 250. The processor 210 may provide the external object identification information to the accessory manager 910 through the sensor 250.

For example, the processor 210 may use the first communication circuit 241 to identify that the location of the external object is within the designated distance from the electronic device 200 through NFC. The processor 210 may provide the external object identification information to the accessory manager 910 through the first communication circuit 241. For example, the processor 210 may identify that the location of the external object is out of the designated distance from the electronic device 200 through the NFC, using the first communication circuit 241. The processor 210 may provide the external object identification information to the accessory manager 910 through the first communication circuit 241.

In operation 902, the processor 210 may perform authentication on data (e.g., the external object identification information) obtained from the external object through the accessory manager 910. For example, the processor 210 may identify whether the data obtained from the external object is data configured to change a screen displayed through the display 230. For example, the processor 210 may identify whether the data obtained from the external object is secured data.

In operation 903, the processor 210 may provide (e.g., broadcast) a uniform resource identifier (URI) to the screen change manager 920 through the accessory manager 910, based on authentication of data obtained from the external object. The processor 210 may change a screen of the display 230 through the screen change manager 920 based on the URI. For example, the screen change manager 920 may change the screen based on calling a wallpaper API. For example, the screen change manager 920 may include the theme platform 730 of FIG. 7.

Figure 10:
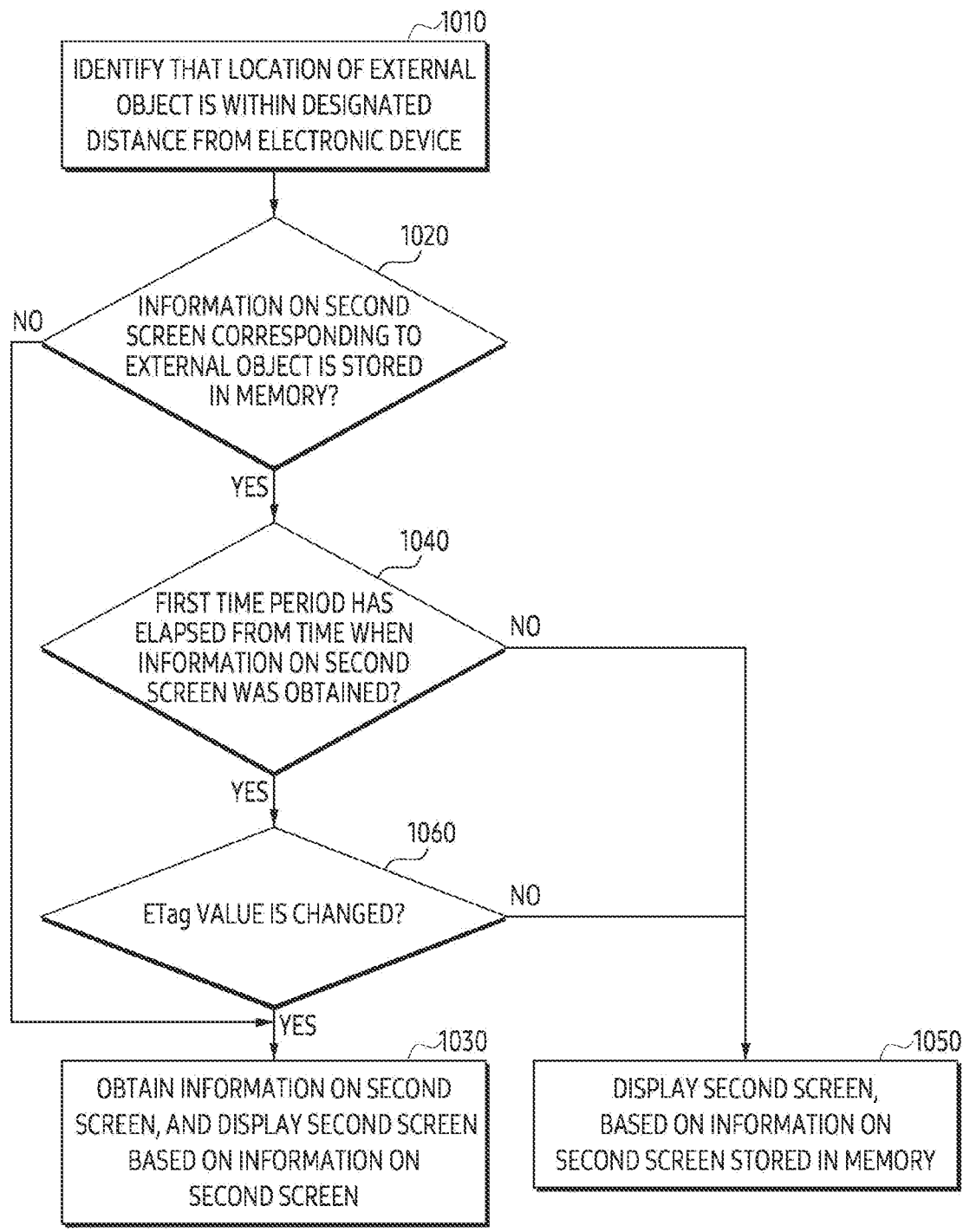
FIG. 10 illustrates an example of a flowchart of an operation of an electronic device, according to various embodiments.

FIG. 10 illustrates an example of a flowchart of an operation of an electronic device, according to various embodiments. Operations 1010 to 1050 illustrated in FIG. 10 may be related to the operations 510 to 540 of FIG. 5.

Referring to FIG. 10, in operation 1010, a processor 210 may identify that a location of an external object is within a designated distance from an electronic device 200. For example, the processor 210 may use a first communication circuit 241 to identify that the location of the external object is within the designated distance from the electronic device 200 through NFC. For example, the processor 210 may identify that the external object is inserted into a slot 431 of a case 400, based on identifying that the location of the external object is within the designated distance from the electronic device 200.

According to an embodiment, the external object may include a magnet and/or an authentication chip. The processor 210 may receive data from the magnet and/or the authentication chip included in the external object through the NFC.

For example, the processor 210 may obtain first data, second data, and third data from the external object located within the designated distance from the electronic device 200. For example, the processor 210 may obtain data of 23 bytes from the external object. The data of 23 bytes may include the first data, the second data, and the third data.

For example, the processor 210 may obtain (or receive) URI data of 23 bytes from the external object. A format of the URI data may be set as illustrated in the following table. For example, the processor 210 may provide the URI data to a screen change manager 920 through an accessory manager 910.

TABLE 1

| | | | | | Data (Max 126 bytes) Palette ID (21 bytes) | | |
| --- | --- | --- | --- | --- | --- | --- | --- |
| | | Length | Type | Version | Service Type | Service ID | Serial No. |
| Allocated Byte size | | 1 byte | 1 byte | 1 byte | 2 bytes | 4 bytes | 14 bytes |
| Value | | 0x16 (fixed value) | Data Processing Module | 0x01 (fixed value) | By Contents Repository | Unique ID by Card Type | Custom data by card |
| Written example (Hex) | | 16 | 01 | 01 | 00 00 | 00 00 00 01 | 02 00 00 00 . . . 00 01 |

Referring to Table 1, the URI data of 23 bytes may include a length field, a type field, a version field, a service type field, a service ID field, and a serial number field.

For example, the URI data length field may be set to a fixed value (e.g., 0x16).

For example, the type field may be set as illustrated in Table 2.

TABLE 2

| Data Content | 0x01 Wallpaper | 0x02 Clock | 0x04 Theme | 0xFF All In One |
|---|---|---|---|---|

Referring to Table 2, the type field may be set to indicate which application (or module) to process data obtained from an external object.

For example, the version field may be set as illustrated in Table 3.

TABLE 3

| Data Content | 0(0x01) Fixed value |
|---|---|

Referring to Table 3, the version field may be set to a fixed value.

For example, the service type field may be set as illustrated in Table 4.

TABLE 4

| Data Content | 0(0x0000) preloaded | 1(0x0001) Download from hidden server | 2(0x0002) Link to Theme store (TBD) |
|---|---|---|---|

Referring to Table 4, the service type field may be used to indicate an area (or device) in which information (e.g., content) on the second screen is stored. When an external object is a genuine product provided by a manufacturer, a value of the service type field may be set to '0'. When the external object is the genuine product provided by the manufacturer, information on the second screen may be a state stored in the electronic device 200. According to an embodiment, even when the external object is the genuine product provided by the manufacturer, a value of the service type field may be set to '2'. Even when the external object is the genuine product provided by the manufacturer, the information on the second screen may be a state stored in an external electronic device.

For example, the service ID field may be set as illustrated in Table 5.

TABLE 5

| Data Content | 0x00000000~0x00FFFFFF Genuine ID | 0x01000000~ Non-Genuine ID |
|---|---|---|

Referring to Table 5, the service ID field may be used to distinguish service ID according to a type of external object. For example, when a type of the external object is a first type (e.g., genuine), the service ID may be set from '0x00000000' to '0x00FFFFFF'. For example, when the type of the external object is a second type (e.g., non-genuine), the service ID may be set to one of values exceeding '0x01000000'. For example, data included in the service ID field may be an example of the above-described second data.

For example, when the external object is manufactured by a manufacturer of the electronic device 200, the type of the external object may be set to the first type (e.g., genuine). Although the external object is not manufactured by the manufacturer, when a quality of the external object is authenticated according to the designated standard provided by the manufacturer, the type of the external object may be set to the second type (e.g., non-genuine).

For example, the serial number field may be set as illustrated in Table 6.

TABLE 6

| Data Content | 0x00~0xFF Wallpaper (1 byte) 0x01: jpg 0x02: png 0x10: gif 0x11: mp4 (TBD) | 0X00~0xFF Clock Type (1 byte) 0x00: No Change 0x01~0xEF: clock Index 0xFF: Hide clock | 0x00000000~0xFFFFFFFF Clock Color (4 bytes) ARGB Color Value | 0x0000000000000000 Reserved (8 bytes) Fixed value |
|---|---|---|---|---|

Referring to Table 6, the serial number field may be used to transmit user data.

For example, when a value of the wallpaper field is '0x01' to '0x0F', the wallpaper field may indicate a still image type. When the value of the wallpaper field is '0x10' to '0x11', the wallpaper field may indicate a video type (or a movie type). When the value of the wallpaper field is greater than or equal to '0x20', the wallpaper field may indicate a type other than the still image and the video.

For example, when a value of a clock type field is '0x00', it may indicate that a clock style of the electronic device 200 is maintained. When the value of the clock field is '0x01' to '0xEF', the clock type field may indicate a designated clock style according to the field value. When the value of the clock field is '0xF0' to '0xFF', the clock type field may be used for clock control.

For example, a clock color field may indicate an ARGB value of the clock.

According to an embodiment, 4 bytes among 8 bytes of a reserved field of a serial number field may be set for first data for displaying a first screen. The processor 210 may obtain the first data through 4 bytes of the 8 bytes of the reserved field. The processor 210 may display the first screen based on the first data. For example, the first data may include the ARGB value. The processor 210 may display the first screen having the color of the ARGB value, based on the first data.

According to an embodiment, 1 byte among 8 bytes of the reserved field of the serial number field may be set for third data for indicating whether the second screen is changed according to a state of the electronic device 200. The processor 210 may obtain the third data through 1 byte among 8 bytes of the reserved field. Based on the third data, the processor 210 may identify whether to rotate the second screen according to a state (e.g., the first state and the second state) of the electronic device 200.

In operation 1020, the processor 210 may identify whether information on the second screen corresponding to the external object is stored in the memory 220. For example, the processor 210 may identify whether the information on the second screen corresponding to the external object is stored in the memory 220, based on identifying that a location of the external object is within a designated distance from the electronic device 200. For example, the processor 210 may identify at least one of the first data, the second data, and/or the third data from the external object. The second data may be used to obtain information on the second screen. The processor 210 may identify whether the information on the second screen is stored in the memory 220, based on the second data. For example, the processor 210 may identify that information on the second screen is stored in the memory 220, based on identifying that the second screen has a history of being displayed through the cover display 231.

In operation 1030, when information on the second screen corresponding to the external object is not stored in the memory 220, the processor 210 may obtain information on the second screen and display the second screen through the cover display 231 based on the information on the second screen. For example, the processor 210 may obtain information on the second screen based on identifying that the information on the second screen corresponding to the external object is not stored in the memory 220. The processor 210 may display the second screen through the cover display 231, based on the obtained information on the second screen. For example, the processor 210 may obtain the information on the second screen from the external electronic device using the first communication circuit 241.

For example, while obtaining information on the second screen, the processor 210 may display the first screen based on the first data. The processor 210 may change a screen displayed through the cover display 231 from the first screen to the second screen, based on a completion of obtaining the information on the second screen.

In operation 1040, when the information on the second screen corresponding to the external object is stored in the memory 220, the processor 210 may identify whether a first time period (e.g., 24 hours) has elapsed from a time when the information on the second screen was obtained. For example, the processor 210 may identify whether the first time has elapsed from the time when the information on the second screen was obtained, based on identifying that the information on the second screen corresponding to the external object is stored in the memory 220.

For example, in order to identify whether a version of the second screen (or a theme about the second screen) is the latest version, the processor 210 may identify whether the first time has elapsed from the time when the information on the second screen was obtained. For example, a theme provider (e.g., the plurality of theme providers 710 of FIG. 7) may update information on the second screen. The processor 210 may identify whether the version of the second screen is the latest version.

In operation 1050, when the first time period has not elapsed from the time when the information on the second screen was obtained, the processor 210 may display the second screen based on the information on the second screen stored in the memory 220. The processor 210 may identify that the first time period has not elapsed from the time when the information on the second screen was obtained. The processor 210 may display the second screen based on the information on the second screen stored in the memory 220.

For example, when the information on the second screen is stored in the memory 220 and the first time has not elapsed from the time when the information on the second screen was obtained, the processor 210 may display the second screen without displaying the first screen. The processor 210 may bypass displaying the first screen and display the second screen through the cover display 231 based on the information on the second screen stored in the memory 220.

In operation 1060, when the first time has elapsed from the time when the information on the second screen was obtained, the processor 210 may identify whether an entity tag (ETAG) value is changed. The ETAG value may be used to verify validity of web cache. A unique value for the version of the second screen may be set as the ETAG value. When the version of the second screen is changed, the ETAG value may be changed.

For example, in order to identify whether the information on the second screen is changed, the processor 210 may identify whether the ETAG value is changed. For example, the processor 210 may obtain the ETAG value for the second screen from an external electronic device (e.g., the theme server 720 of FIG. 7). The processor 210 may compare the ETAG value for the second screen stored in the memory 220 with the ETAG value for the second screen obtained from the external electronic device. The processor 210 may identify whether the ETAG value for the second screen is changed, based on comparing the ETAG value for the second screen stored in the memory 220 with the ETAG value for the second screen obtained from the external electronic device. Although not shown, even after the second screen is displayed, the processor 210 may identify whether the ETAG value for the second screen is changed based on the first time. For example, the processor 210 may obtain information on the updated second screen (or third screen) from the external electronic device, based on identifying that the ETAG value for the second screen is changed. The processor 210 may display the updated second screen (or third screen) based on the updated information on the second screen (or third screen).

According to an embodiment, the processor 210 may perform operation 1030 when the ETAG value is changed. The processor 210 may obtain information on the second screen (or the updated second screen), based on identifying that the ETAG value is changed. For example, the processor 210 may obtain information on the second screen (or the updated second screen), from the external electronic device, through the first communication circuit 241, based on identifying that the ETAG value is changed. The processor 210 may display the second screen (or the updated second screen) through the cover display 231, based on the obtained information on the second screen (or the updated second screen).

For example, the processor 210 may identify that the second screen (or information on the second screen) is changed, based on identifying that the ETAG value is changed. The processor 210 may obtain information on the second screen from an external electronic device, in order to display the changed second screen.

According to an embodiment, the processor 210 may perform operation 1050 when the ETAG value is not changed. The processor 210 may obtain (or identify) information on the second screen stored in the memory 220, based on identifying that the ETAG value is not changed. The processor 210 may display the second screen through the cover display 231, based on the information on the second screen stored in the memory 220.

Figure 11:
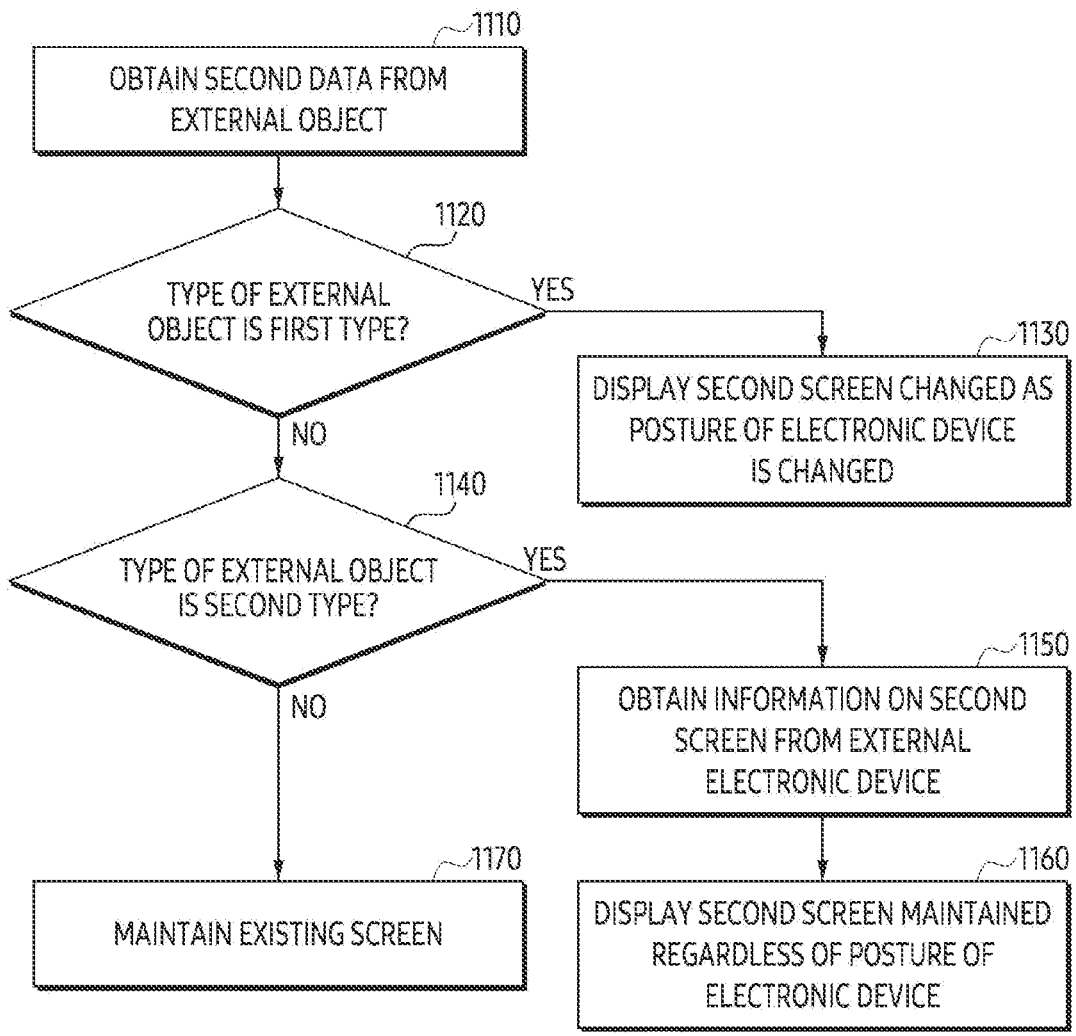
FIG. 11 illustrates an example of a flowchart of an operation of an electronic device, according to various embodiments.

FIG. 11 illustrates an example of a flowchart of an operation of an electronic device, according to various embodiments. Operations 1110 to 1170 illustrated in FIG. 11 may be related to the operations 510 to 540 of FIG. 5.

Referring to FIG. 11, in operation 1110, the processor 210 may obtain second data from an external object. For example, the second data may include information for obtaining information on a second screen. For example, the processor 210 may obtain the second data through the service ID field described with reference to FIG. 10.

In operation 1120, the processor 210 may identify whether a type of an external object is a first type. For example, the processor 210 may identify whether the type of the external object is the first type, based on the second data. For example, the processor 210 may identify whether the type of the external object is the first type, based on identifying whether a value of the service ID field is within a designated range (e.g., '0x00000000' to '0x00FFFFFF').

For example, when the external object is manufactured by a manufacturer of the electronic device 200, the type of the external object may be set to the first type (e.g., genuine). Although the external object is not manufactured by the manufacturer, when a quality of the external object is authenticated according to a designated standard provided by the manufacturer, the type of the external object may be set as the second type (e.g., non-genuine).

In operation 1130, when the type of the external object is the first type, the processor 210 may display a second screen, which is changed as a posture of the electronic device 200 is changed. For example, the processor 210 may display the second screen, which is changed as the posture of the electronic device 200 is changed, through the cover display 231, based on identifying the type of the external object as the first type.

For example, the processor 210 may identify a posture (or orientation) of the electronic device 200 through a gyroscopic sensor 252. The processor 210 may display the second screen, which is changed based on the posture of the electronic device 200. According to an embodiment, the processor 210 may further include a haptic sensor. The processor 210 may output vibration based on a touch input on the second screen.

For example, when the type of the external object is the first type, information on the second screen may be a state stored in the memory 220. The processor 210 may display the second screen based on the information on the second screen stored in the memory 220 without obtaining information on the second screen from the external electronic device. The processor 210 may bypass displaying the first screen based on the first data, and display the second screen based on the information on the second screen stored in the memory 220. However, it is not limited thereto. According to an embodiment, even when the external object type is the first type, the processor 210 may obtain information on the second screen from the external electronic device. While the information on the second screen is obtained, the processor 210 may display the first screen based on the first data through the cover display 231.

In operation 1140, when the type of the external object is not the first type, the processor 210 may identify whether the type of the external object is the second type. For example, the processor 210 may identify whether the type of the external object is the second type, based on identifying that the type of the external object is not the first type. For example, the processor 210 may identify whether the type of the external object is the second type, based on identifying whether a value of the service ID field is out of the designated range (e.g., '0x00000000' to '0x00FFFFFF').

In operations 1120 and 1140, an operation of identifying whether the type of the external object is the first type and identifying whether the type of the external object the second type is illustrated, but is not limited thereto. The processor 210 may identify the type of the external object as one of the first type and the second type based on the second data.

In operation 1150, when the type of the external object is the second type, the processor 210 may obtain information on the second screen from an external electronic device. The processor 210 may obtain information on the second screen from the external electronic device, based on identifying the type of the external object as the second type. The processor 210 may obtain information on the second screen from the external electronic device through the second communication circuit 242.

In operation 1160, the processor 210 may display a second screen maintained regardless of a posture of the electronic device 200, based on the information on the second screen. Although the posture of the electronic device 200 is changed, the processor 210 may maintain the second screen. Although the posture of the electronic device 200 is changed, the second screen may be maintained.

In operation 1170, when the type of the external object is not the second type, the processor 210 may maintain the existing screen. The processor 210 may maintain the existing screen based on identifying that the type of the external object is not the second type.

Figure 12A:
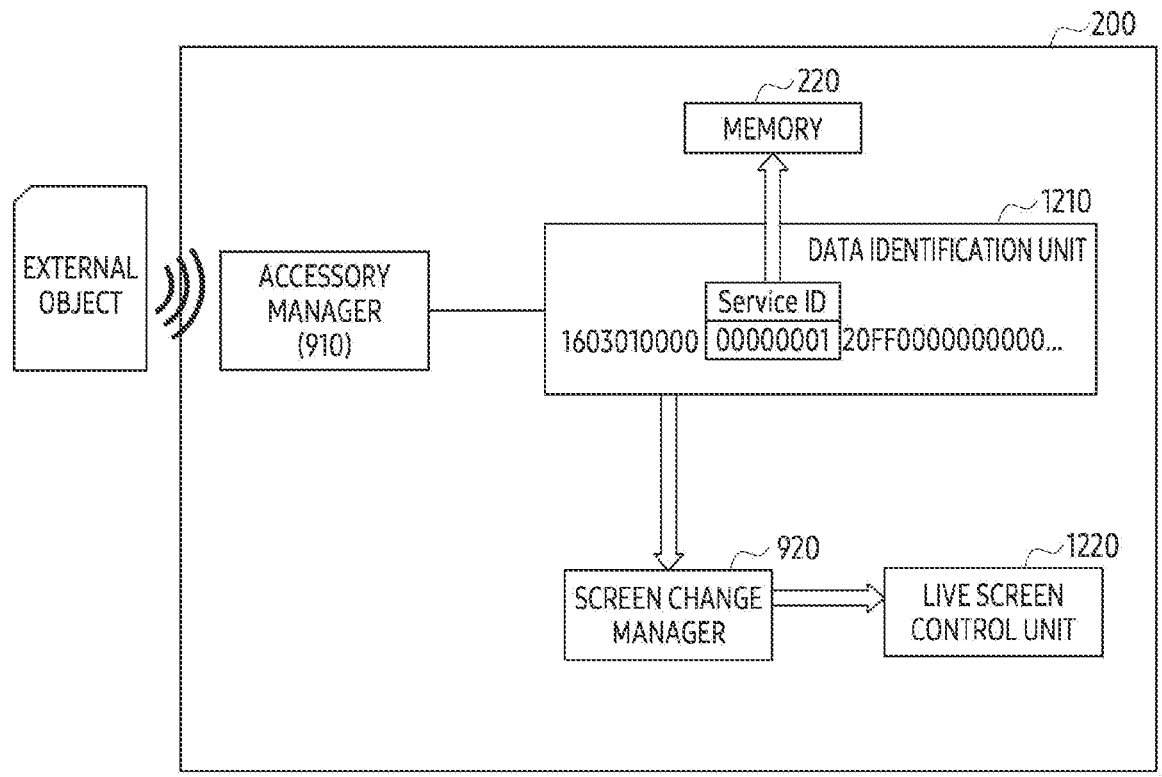
FIG. 12A illustrates an example in which information on a second screen is obtained through a first type of external object in an electronic device, according to various embodiments.

FIG. 12A illustrates an example in which information on a second screen is obtained through a first type of external object in an electronic device, according to various embodiments.

Figure 12B:
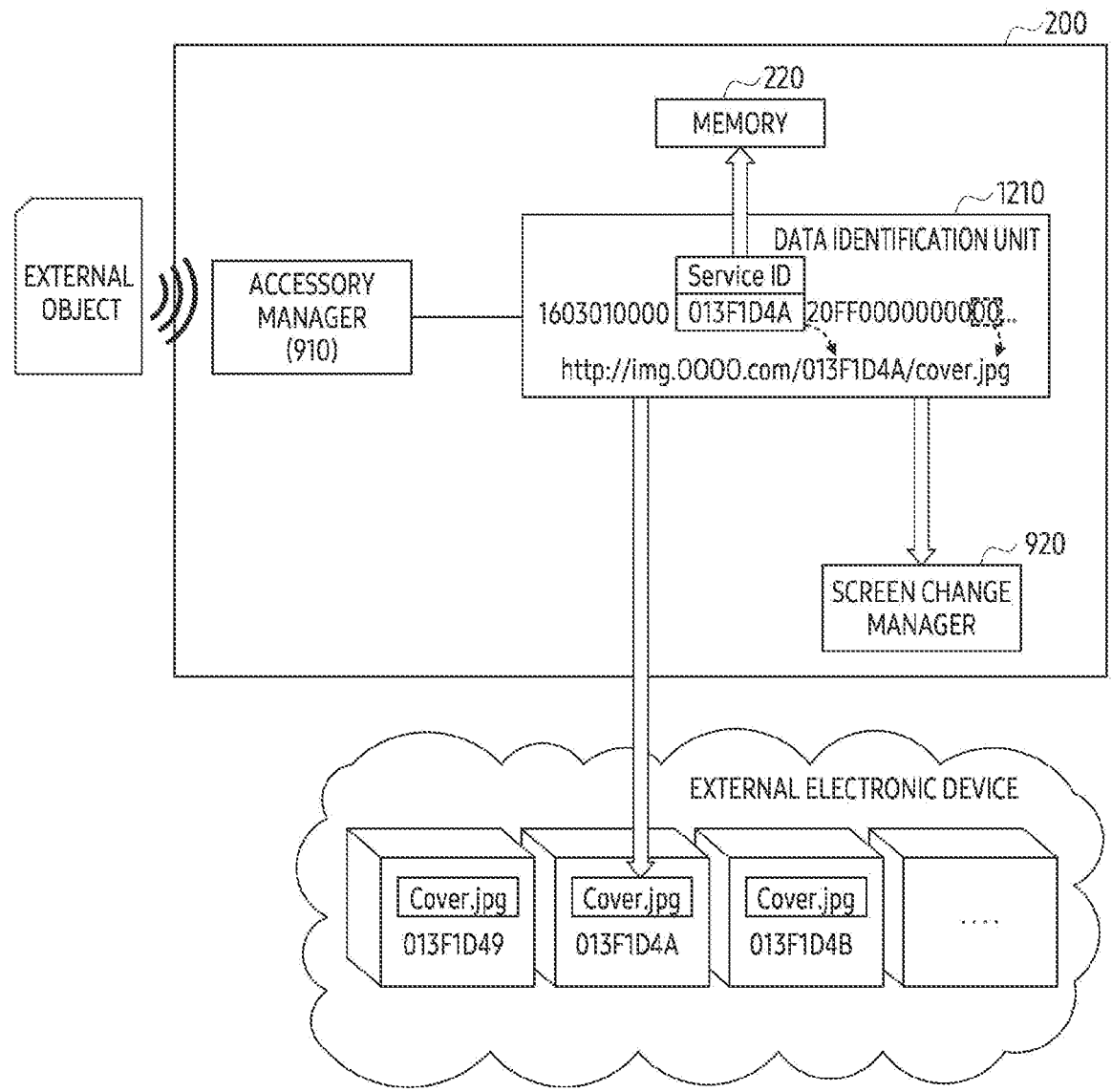
FIG. 12B illustrates an example in which information on a second screen is obtained through a second type of external object in an electronic device, according to various embodiments.

FIG. 12B illustrates an example in which information on a second screen is obtained through a second type of external object in an electronic device, according to various embodiments.

Referring to FIG. 12A, a processor 210 may obtain data from an external object through an NFC. The processor 210 may perform an authentication procedure of the obtained data using an accessory manager 910. The processor 210 may provide URI data to a data identification unit 1210 using the accessory manager 910. The processor 210 may identify a service ID field included in the URI data through the data identification unit 1210. The processor 210 may identify that a type of the external object is the first type, based on a value of the service ID field. The processor 210 may obtain information on the second screen stored in the memory 220, based on the value of the service ID field. The processor 210 may provide information on the second screen to a screen change manager 920. The processor 210 may set a screen of a cover display 231 to a second screen through the screen change manager 920. For example, the second screen may be a screen, which is changed based on a posture of the electronic device 200. The processor 210 may change the second screen based on the posture of the electronic device 200 using a live screen control unit 1220.

Referring to FIG. 12B, the processor 210 may obtain data from the external object through the NFC. The processor 210 may perform an authentication procedure of the obtained data using the accessory manager 910. The processor 210 may provide URI data to the data identification unit 1210 using the accessory manager 910. The processor 210 may identify a service ID field included in the URI data through the data identification unit 1210. The processor 210 may identify that the type of the external object is the second type, based on the value of the service ID field. The processor 210 may identify an address for downloading information on the second screen from the external electronic device, based on the value of the service ID field. For example, the processor 210 may identify the value of the service ID field as a part of the address. The processor 210 may identify a type (e.g., jpg) of information on the second screen based on a value of the wallpaper field. The processor 210 may identify the type of information on the second screen as another part of the address.

The processor 210 may obtain information on the second screen from an external electronic device. The processor 210 may provide information on the second screen to the screen change manager 920. The processor 210 may set a screen of the cover display 231 as the second screen through the screen change manager 920. For example, the second screen may be a screen maintained regardless of the posture of the electronic device 200.

According to an embodiment, the number of times that the second screen may be displayed may be designated according to the external object. For example, an external electronic device (e.g., a server) may store information on the number of times that the information on the second screen is provided. The external electronic device may provide the electronic device 200 with the number of times that the information on the second screen is provided. For example, the processor 210 of the electronic device 200 may provide the number of times that the external electronic device provides the information on the second screen to the user. The processor 210 may display a notification indicating the number of times that the external electronic device provides the information on the second screen through the cover display 231 (or the flexible display 232). For example, the processor 210 may provide the user with information on the remaining number of times for displaying the second screen through the external object. According to an embodiment, the number of times that the information on the second screen is provided may be identified based on the number of devices. For example, the information on the second screen may be provided only to a designated number of devices.

For example, the information on the second screen through the external object may be set to be provided from the external electronic device only three times. The external electronic device may identify the number of times that the information on the second screen through the external object is provided to a device (e.g., the electronic device 200 or another electronic device). The external electronic device may provide the information on the second screen to the device (e.g., the electronic device 200 or another electronic device) only three times.

Figure 13:
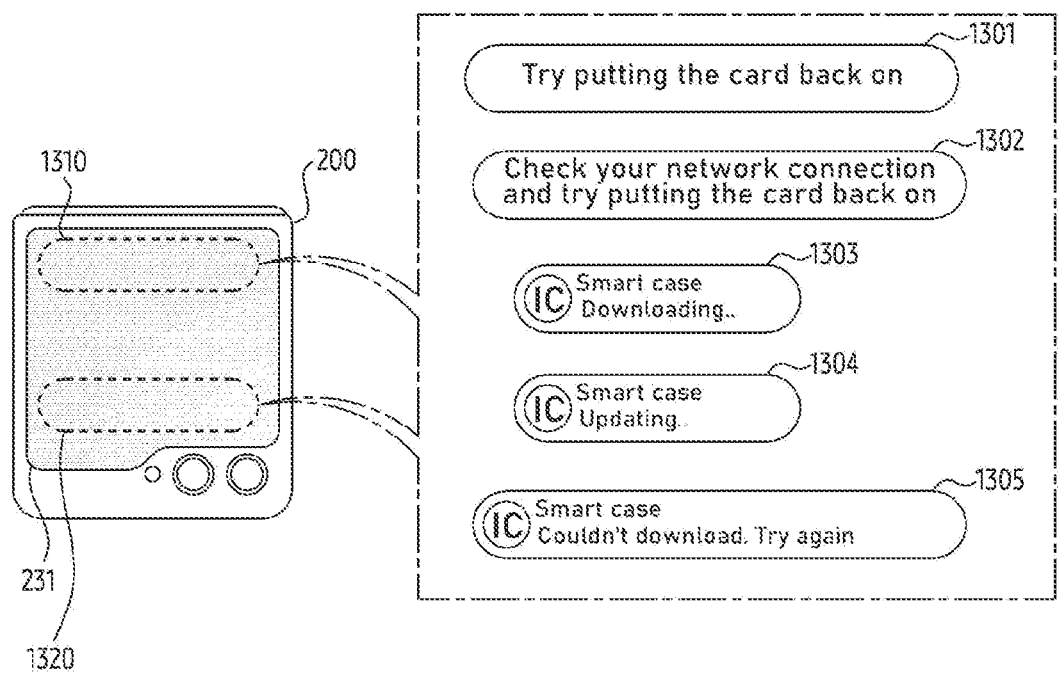
FIG. 13 illustrates an example notification displayed through a cover display according to various embodiments.

FIG. 13 illustrates an example of a notification displayed through a cover display according to various embodiments.

Referring to FIG. 13, a processor 210 may display a screen through a cover display 231. The processor 210 may display an object for notification, superimposed on the screen. For example, the processor 210 may display the object for notification in at least one of an area 1310 and/or an area 1320.

According to an embodiment, the processor 210 may check a network connection to obtain information on the second screen from an external electronic device. When a temporary error occurs while being connected to a network, the processor 210 may repeatedly request information on the second screen in a background. When a connection error occurs despite requesting the designated number of times or more, the processor 210 may display an object 1301 indicating to re-mount an external object (e.g., card) in at least one of the area 1310 and/or the area 1320.

According to an embodiment, the processor 210 may identify that a network connection is not established. Based on identifying that the network connection is established, the processor 210 may check the network connection, and display an object 1302 indicating to re-mount the external object (e.g., card) in at least one of the area 1310 and/or the area 1320.

According to an embodiment, the processor 210 may obtain information on the second screen from an external electronic device. The processor 210 may display an object 1303 indicating that information on the second screen is being obtained from the external electronic device in at least one of the area 1310 and/or the area 1320. For example, when the information on the second screen is normally obtained, the processor 210 may display the second screen without displaying an object indicating that obtaining the information on the second screen is completed. According to an embodiment, when the information on the second screen is normally obtained, the processor 210 may display the object indicating that obtaining the information on the second screen is completed, and then display the second screen.

According to an embodiment, the processor 210 may identify that an ETAG value for the second screen is changed. The processor 210 may identify that the second screen stored in the external electronic device is changed. The processor 210 may obtain information on the changed second screen from the external electronic device. The processor 210 may display an object 1304 indicating that information on the changed second screen is being obtained from the external electronic device in at least one of the area 1310 and/or the area 1320.

According to an embodiment, the processor 210 may fail to obtain the information on the second screen from the external electronic device. The processor 210 may display an object 1305 indicating that obtaining information on the second screen from the external electronic device is failed in at least one of the area 1310 and/or the area 1320.

Figure 14A:
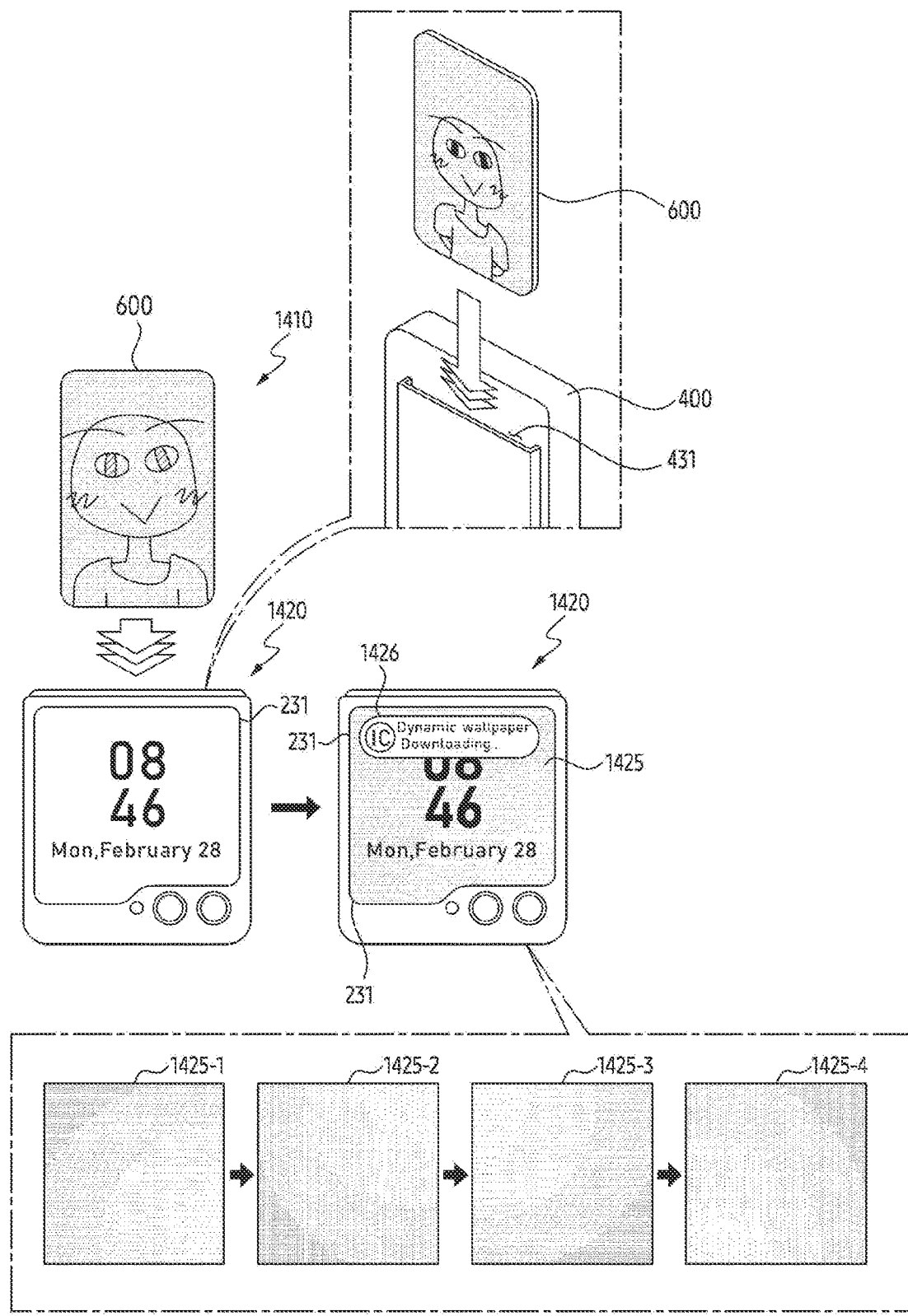
FIG. 14A illustrates an example of a first screen displayed through a cover display according to various embodiments.

FIG. 14A illustrates an example of a first screen displayed through a cover display according to various embodiments.

Figure 14B:
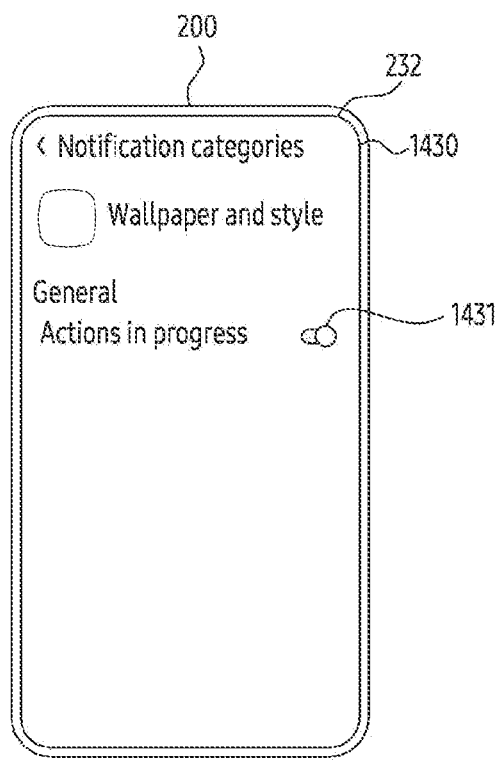
FIG. 14B illustrates an example of a screen displayed on a flexible display for setting whether to display an object indicating a notification, according to various embodiments.

FIG. 14B illustrates an example of a screen displayed on a flexible display for setting whether to display an object indicating a notification, according to various embodiments.

Referring to FIG. 14A, at a state 1410, a processor 210 may identify that a distance between an external object 600 and the electronic device 200 is within a designated distance. For example, the processor 210 may identify that the external object 600 is inserted into a slot 431 of a case 400 coupled to the electronic device 200. For example, the processor 210 may identify that the distance between the external object 600 and the electronic device 200 is within the designated distance while a state of the electronic device 200 is a first state (e.g., folding state).

According to an embodiment, the processor 210 may obtain first data and second data from the external object 600. In state 1420 processor 210 may display a first screen 1425 based on the first data. The processor 210 may obtain information on a second screen based on the second data.

For example, the first screen 1425 may have a color indicated based on the first data. The first screen 1425 may be changed according to a designated pattern. For example, the processor 210 may display the first screen 1425 on which a screen 1425-1, 1425-2, 1425-3 to 1425-4 are set to be continuously changed. For example, the processor 210 may identify a color indicated based on the first data. The processor 210 may display the first screen 1425 having the color and representing a continuous change effect over time, such as a screen 1425-1 to a screen 1425-4.

For example, while information on the second screen is obtained, the processor 210 may display the first screen 1425 through the cover display 231. The processor 210 may display an object 1426 indicating that the information on the second screen is being obtained, superimposed on the first screen 1425.

Referring to FIGS. 14A and 14B, the processor 210 may display a screen 1430 for setting whether to display the object 1426 on the flexible display 232. The processor 210 may display the screen 1430 through the flexible display 232, while a state of the electronic device 200 is in a second state (e.g., unfolding state). According to an embodiment, the screen 1430 may be provided based on identifying that the distance between the external object 600 and the electronic device 200 is within the designated distance.

For example, the processor 210 may display an object 1431 for setting whether to display the object 1426. The processor 210 may set whether to display the object 1426, based on an input (e.g., a swipe input, a tap input) to the object 1431. For example, based on a state of the object 1431 being a first state (e.g., on state), the processor 210 may display the object 1426 superimposed on the first screen 1425. For example, the processor 210 may not display the object 1426 based on the state of the object 1431 being a second state (e.g., off state). Even when information on the second screen is being obtained, the object 1426 may not be displayed on the first screen 1425.

Figure 15:
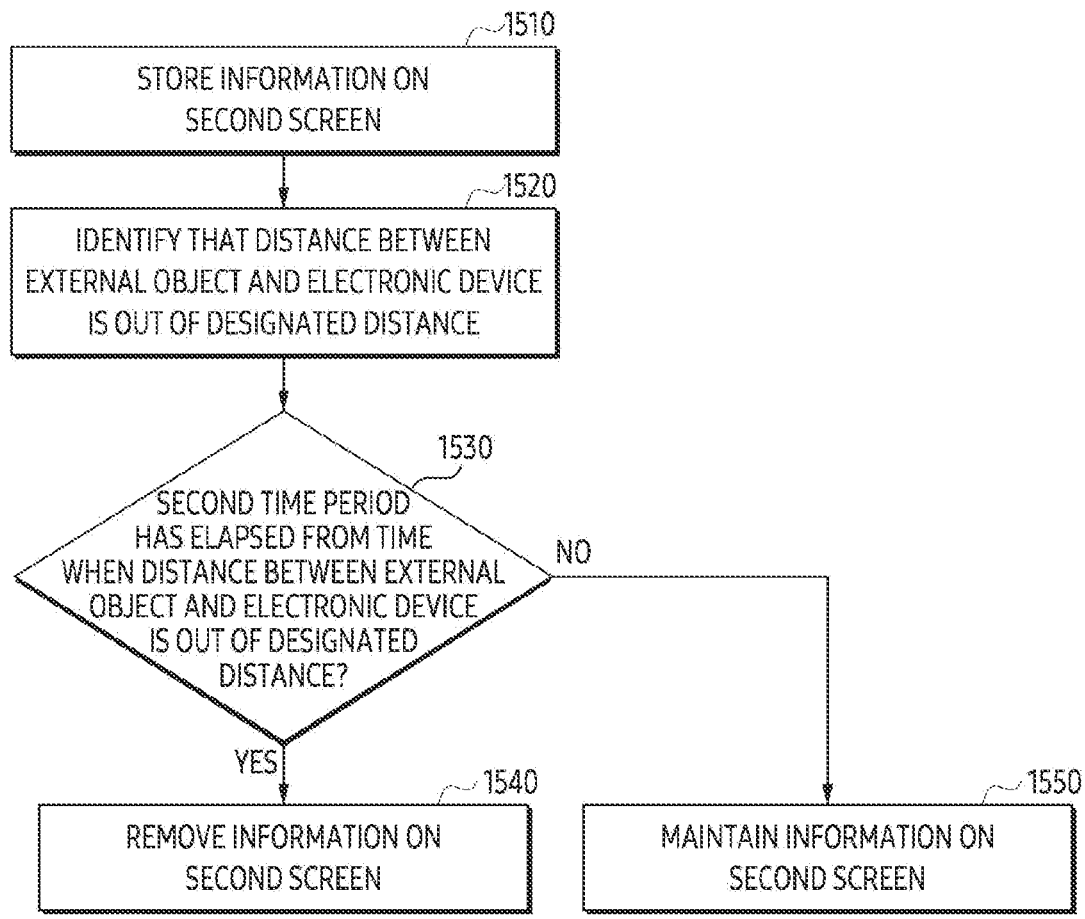
FIG. 15 is a flowchart illustrating an example operation of an electronic device, according to various embodiments.

FIG. 15 is a flowchart illustrating an operation of an electronic device, according to various embodiments.

Referring to FIG. 15, in operation 1510, a processor 210 may store information on a second screen. For example, the processor 210 may store information on the second screen in a memory 220 based on identifying that a distance between an external object and an electronic device 200 is within a designated distance.

In operation 1520, the processor 210 may identify that the distance between the external object and the electronic device 200 is out of the designated distance. For example, after information on the second screen is stored, the processor 210 may identify that the distance between the external object and the electronic device 200 is out of the designated distance. For example, the processor 210 may identify that the external object 600 has escaped from a slot 431 of a case 400 coupled to the electronic device 200. The processor 210 may cease displaying the second screen, based on identifying that the distance between the external object and the electronic device 200 is out of the designated distance. The processor 210 may change a screen displayed through a cover display 231 from the second screen to a basic screen.

In operation 1530, the processor 210 may identify whether a second time period (e.g., 1 week) has elapsed from a time when the distance between the external object and the electronic device 200 is out of the designated distance. For example, after identifying that the distance between the external object and the electronic device 200 is out of the designated distance, the processor 210 may identify whether the second time period has elapsed from the time when the distance between the external object and the electronic device 200 is out of the designated distance.

For example, the processor 210 may determine whether to store information on the second screen in order to display the second screen, in response to the distance between the external object and the electronic device 200 entering the designated distance again. The processor 210 may determine whether to store information on the second screen, based on whether a second time period (e.g., 1 week) has elapsed from the time when the distance between the external object and the electronic device 200 is out of the designated distance.

In operation 1540, when the second time has elapses from the time when the distance between the external object and the electronic device 200 is out of the designated distance, the processor 210 may remove information on the second screen. For example, based on identifying that the second time has elapsed from the time when the distance between the external object and the electronic device 200 is out of the designated distance, the processor 210 may remove the information on the second screen from the memory 220.

In operation 1550, when the second time has not elapsed from the time when the distance between the external object and the electronic device 200 is out of the designated distance, the processor 210 may maintain the information on the second screen. For example, based on identifying that the second time has not elapsed from the time when the distance between the external object and the electronic device 200 is out of the designated distance, the processor 210 may maintain the information on the second screen in the memory 220.

According to an embodiment, in a state that the second time has not elapsed from the time when the distance between the external object and the electronic device 200 is out of the designated distance, the processor 210 may identify that a location of the external object enters the designated distance from the electronic device 200. The processor 210 may obtain information on the second screen stored in the memory 220. The processor 210 may display the second screen based on the information on the second screen. The processor 210 may bypass displaying the first screen and display the second screen.

Figure 16:
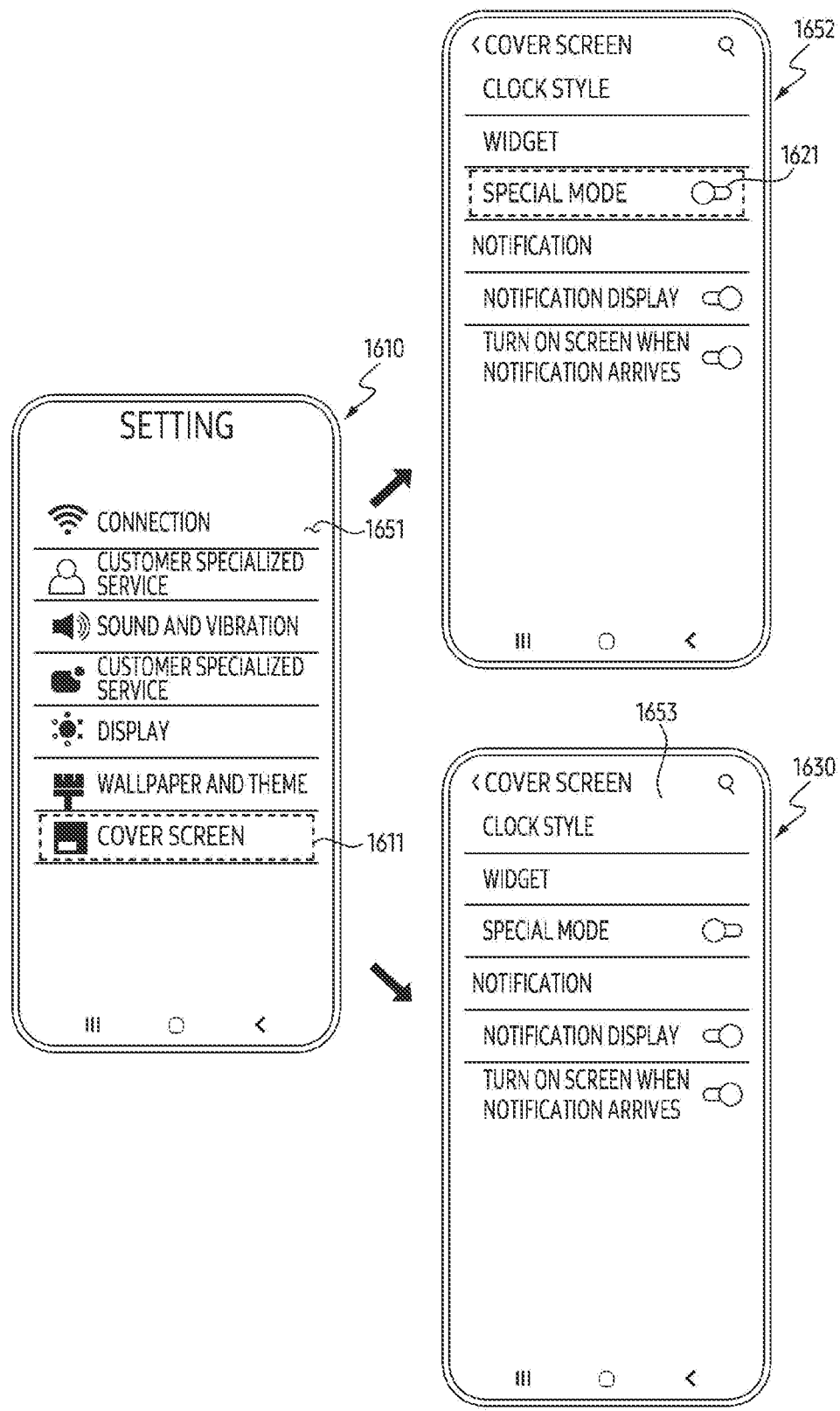
FIG. 16 illustrates an example of a screen displayed on a flexible display for setting whether to display a second screen, according various embodiments.

FIG. 16 illustrates an example of a screen displayed on a flexible display for setting whether to display a second screen, according to various embodiments.

Referring to FIG. 16, in a state 1610, a processor 210 may display a setting screen 1651 for controlling the electronic device 200 through a flexible display 232. The setting screen 1651 may include an object 1611 for controlling a screen of a cover display 231. The processor 210 may display a screen 1652 of a state 1620 and a screen 1653 of a state 1630, based on an input to the object 1611.

For example, the processor 210 may display one of the screen 1652 and the screen 1653, based on whether a distance between an external object and the electronic device 200 is within a designated distance.

In the state 1620, the distance between the external object and the electronic device 200 may be within the designated distance. When the distance between the external object and the electronic device 200 is within the designated distance, the processor 210 may display the screen 1652, based on the input to the object 1611. The processor 210 may display an object 1621 for setting whether to display the second screen, on the screen 1652. The processor 210 may set whether to display the second screen, based on an input (e.g., a swipe input, a tap input) to the object 1621.

As an example, the processor 210 may display the second screen through the cover display 231, based on a state of the object 1621 being a first state (e.g., on state). As an example, the processor 210 may not display the second screen on the cover display 231, based on a state of the object 1621 being the second state (e.g., off state). According to an embodiment, the processor 210 may display only a basic screen without displaying the second screen.

In the state 1620, the distance between the external object and the electronic device 200 may not be within the designated distance. When the distance between the external object and the electronic device 200 is out of the designated distance, the processor 210 may display the screen 1653 based on the input to the object 1611. The processor 210 may not display an object (e.g., the object 1621) for setting whether to display the second screen on the screen 1653. The screen 1653 may not include an area or an object for setting whether to display the second screen.

Figure 17:
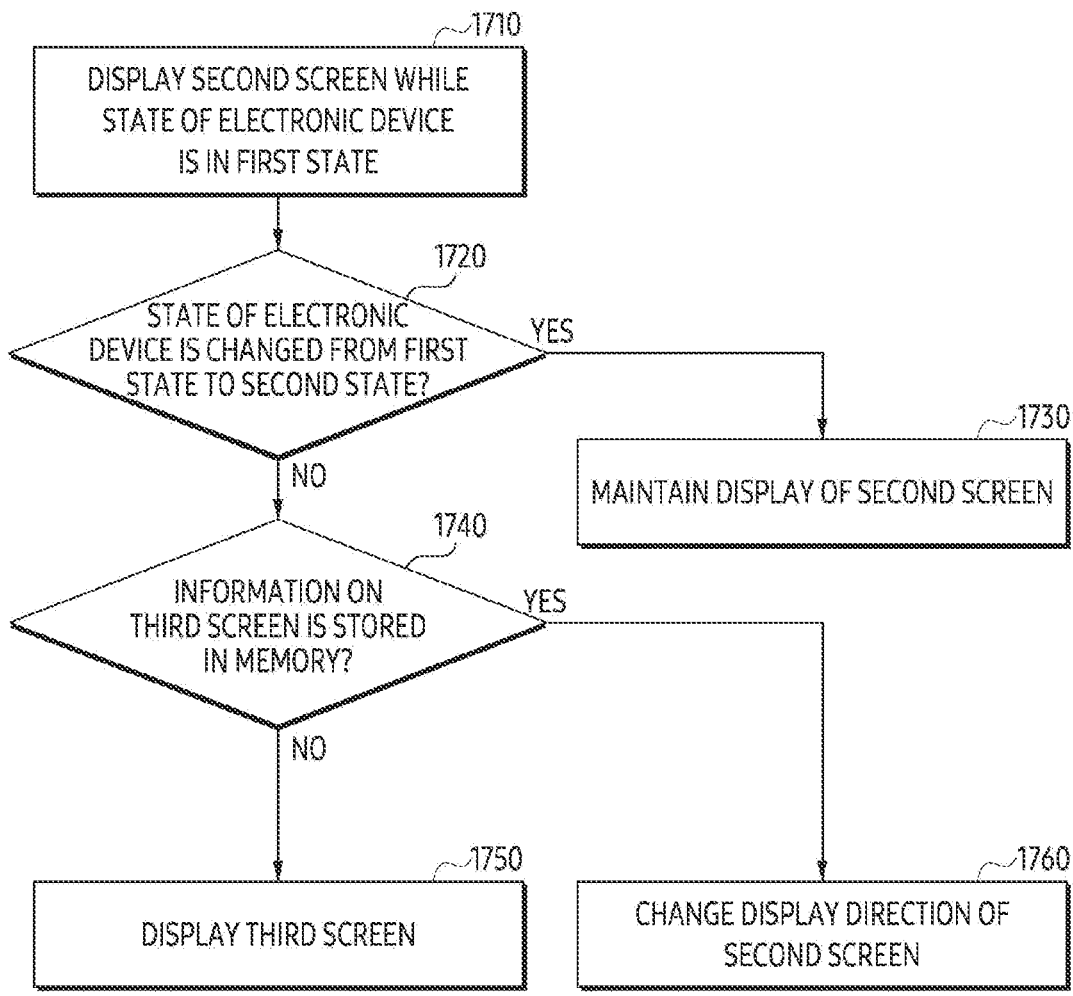
FIG. 17 is a flowchart illustrating an operation of an electronic device, according to various embodiments.

FIG. 17 is a flowchart illustrating an operation of an electronic device, according to various embodiments.

Referring to FIG. 17, in operation 1710, a processor 210 may display a second screen through a cover display 231 while a state of the electronic device 200 is a first state (e.g., folding state). For example, the state of the electronic device 200 may be set to one of the first state and a second state. For example, the first state may include a state in which an angle between a first housing 310 and a second housing 320 is within a designated angle range (e.g.,) 10°. The second state may include a state in which the angle between the first housing 310 and the second housing 320 is out of the designated angle range (e.g.,) 10°. For example, operation 1710 may be related to the operation 550 of FIG. 5.

In operation 1720, the processor 210 may identify whether the state of the electronic device 200 is changed from the first state to the second state. For example, based on that the angle between the first housing 310 and the second housing 320 is changed out of the designated range, the processor 210 may identify whether the state of the electronic device 200 is changed from the first state to the second state using a hall sensor 251.

In operation 1730, when the state of the electronic device 200 is not changed from the first state to the second state, the processor 210 may maintain display of the second screen. For example, the processor 210 may maintain the display of the second screen based on identifying that the state of the electronic device 200 is not changed from the first state to the second state. Based on the state of the electronic device 200 being maintained in the first state, the processor 210 may display the second screen through the cover display 231.

In operation 1740, when the state of the electronic device 200 is changed from the first state to the second state, the processor 210 may identify whether information on the third screen is stored in the memory 220. For example, based on identifying that the state of the electronic device 200 is changed from the first state to the second state, the processor 210 may identify whether information on the third screen is stored in the memory 220.

For example, the processor 210 may obtain information on the third screen together with the information on the second screen from the external electronic device. The processor 210 may store information on the second screen and information on the third screen in the memory 220.

In operation 1750, when information on the third screen is stored, the processor 210 may display the third screen. For example, based on identifying that information on the third screen is stored in the memory 220, the processor 210 may display the third screen through the cover display 231.

For example, the third screen may be displayed by the electronic device 200 in the second state. According to an embodiment, the processor 210 may display the third screen to be connected to an external object. For example, a case 400 may be in a transparent state. The processor 210 may display a third screen so that a surface of the external object and the third screen form a continuous image.

In operation 1760, when information on the third screen is not stored, the processor 210 may change a display direction of the second screen. For example, the processor 210 may change the display direction of the second screen, based on identifying that the information on the third screen is not stored. For example, as the state of the electronic device 200 is changed from the first state to the second state, a screen of the cover display 231 recognized by the user may be changed to opposite. Accordingly, the processor 210 may change the display direction of the second screen, based on that the state of the electronic device 200 is changed from the first state to the second state. The processor 210 may display the display direction of the second screen by rotating by 180 degrees. According to an embodiment, when a rotation of the second screen is not required, the processor 210 may perform operation 1730.

According to an embodiment, the processor 210 may determine whether to rotate the second screen based on a type of the second screen. For example, the processor 210 may obtain third data from the external object. The third data may be used to indicate whether the second screen is changed according to the state of the electronic device 200. The processor 210 may determine whether to rotate the second screen, based on the third data.

Figure 18:
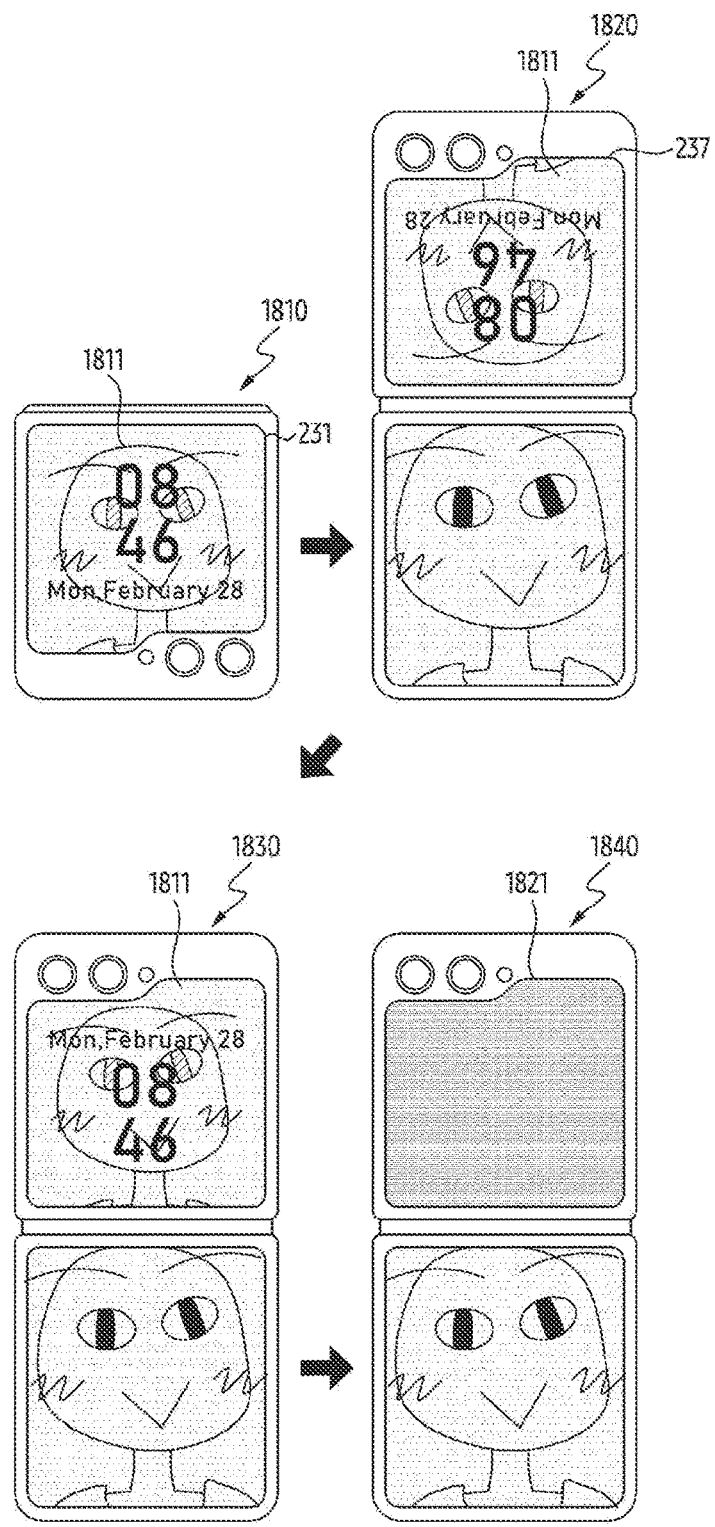
FIG. 18 illustrates an example of a screen displayed on a flexible display for setting whether to display a second screen, according to various embodiments.

FIG. 18 illustrates an example of a screen displayed on a flexible display for setting whether to display a second screen, according to various embodiments.

Referring to FIG. 18, in an example 1810, a state of an electronic device 200 may be a first state (e.g., folding state). A processor 210 may display a second screen 1811 through a cover display 231, based on identifying that a location of an external object is within a designated distance from the electronic device 200.

In an example 1820, the processor 210 may identify that the state of the electronic device 200 is changed from a first state (e.g., folding state) to a second state (e.g., unfolding state). For example, when the state of the electronic device 200 is changed from the first state to the second state according to a structure of the electronic device 200, a user may identify the second screen 1811 which displayed in reverse.

In an example 1830, the processor 210 may change a display direction of the second screen 1811, based on that the state of the electronic device 200 is changed from the first state to the second state. For example, the processor 210 may display the second screen 1811 by rotating in a designated direction. For example, the processor 210 may display the second screen 1811 by rotating by 180 degrees.

In an example 1840, the processor 210 may identify that a designated time (e.g., 5 s, 10 s, 15s) has elapsed in a state in which the second screen 1811 with the changed display direction is displayed. The processor 210 may deactivate the cover display 231. For example, the processor 210 may display a black screen 1821 through the cover display 231.

According to an embodiment, the processor 210 may identify an input (e.g., a tap input, a double tap input, or a swipe input) to the cover display 231. The processor 210 may activate the cover display 231 based on the input. For example, the processor 210 may display the second screen 1811 with the changed display direction through the cover display 231.

Figure 19A:
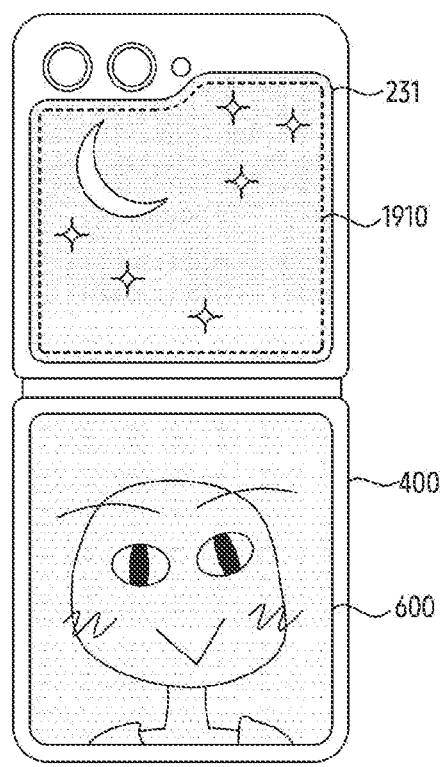
FIGS. 19A and 19B illustrate an example of a second screen displayed through a cover display according to various embodiments.
Figure 19B:
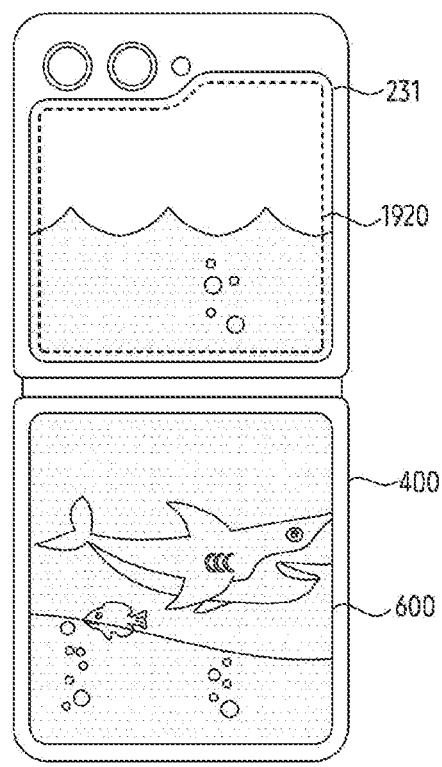

FIGS. 19A and 19B illustrate an example of a second screen displayed through a cover display according to various embodiments.

Referring to FIG. 19A, an external object 600 may be mounted within a case 400. When a state of an electronic device 200 is in a second state, the processor 210 may display a second screen 1910 through a cover display 231. The case 400 may be made of a transparent material. Accordingly, a surface of the external object 600 may be exposed to the outside. The processor 210 may display an image (or video) continuous with a surface of the external object 600 through the second screen 1910. For example, the processor 210 may display the second screen 1910 showing a background image or a background video with respect to a character displayed on the external object 600.

Referring to FIG. 19B, the external object 600 may be mounted in the case 400. The processor 210 may display a second screen 1920 through the cover display 231, when the state of the electronic device 200 is in the second state. The case 400 may be made of a transparent material. Accordingly, a surface of the external object 600 may be exposed to the outside. The processor 210 may display an image (or video) continuous with a surface of the external object 600 through the second screen 1920. For example, the surface of the external object 600 may include an image indicating the deep sea. The processor 210 may display the second screen 1920 indicating an image or video related to the sea level.

Referring to FIGS. 19A and 19B, while a fixed image is displayed through the external object 600, the processor 210 may display the second screens 1910 and 1920 connected to the fixed image through the cover display 231. The user of the electronic device 200 may feel a sense of organic unity between the fixed image and the second screens 1910 and 1920.

Although not shown, according to an embodiment, a shape of the case 400 may be associated with an image of the external object 600. The user of the electronic device 200 may feel a sense of continuity of design of the case, the fixed image, and the second screens 1910 and 1920.

FIGS. 20A, 20B, 20C, 20D and 20E illustrate an example of an operation of an electronic device for changing a setting for a screen displayed on a cover display according to various embodiments.

Figure 20A:
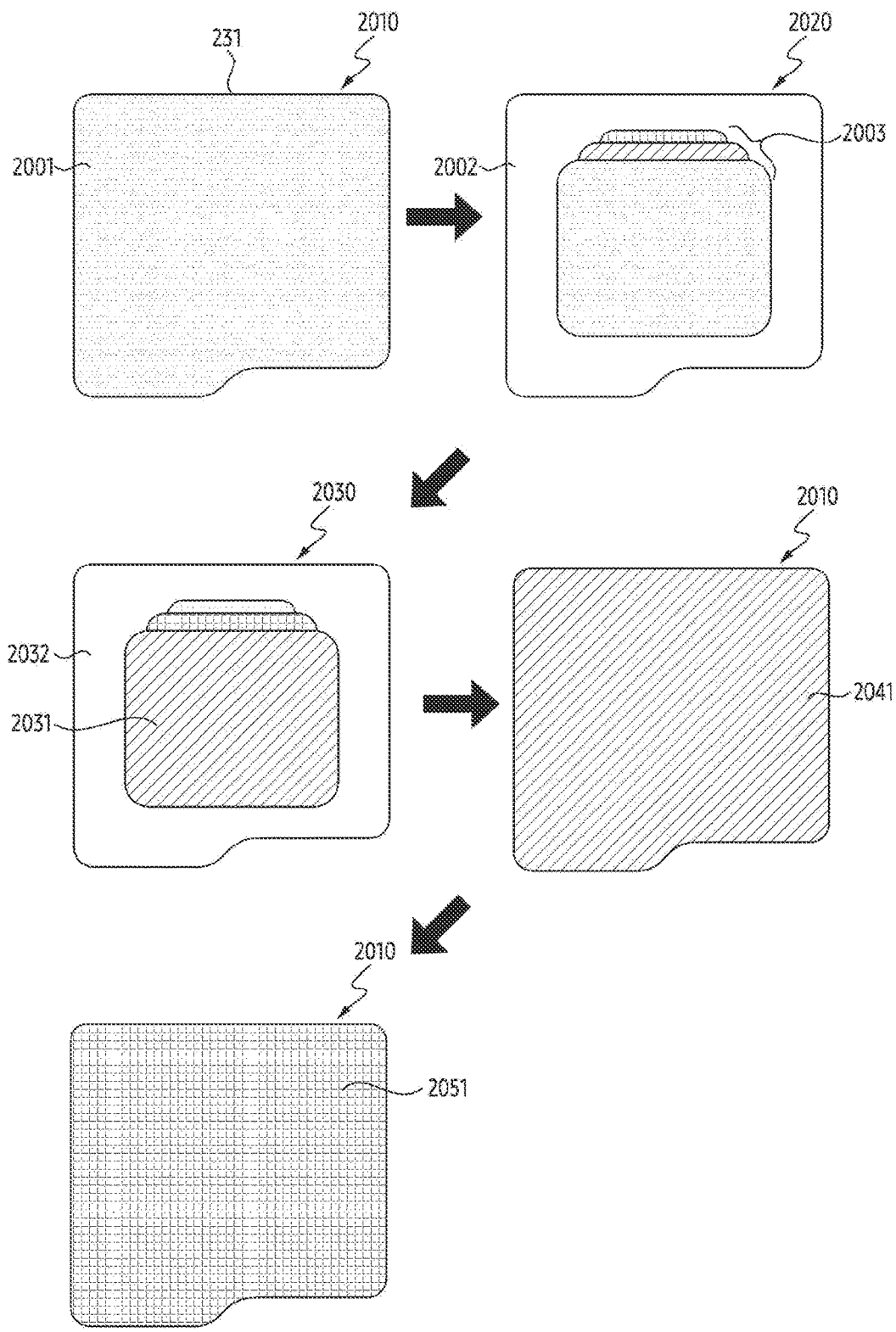
FIGS. 20A, 20B, 20C, 20D and 20E illustrate an example of an operation of an electronic device for changing a setting for a screen displayed on a cover display according to various embodiments.

Referring to FIG. 20A, in an example 2010, a processor 210 may display a screen 2001 through a cover display 231. A screen 2001 may be a screen related to an external object.

According to an embodiment, the processor 210 may identify an input (e.g., a long press input) to a cover display 231. Based on the input, the processor 210 may display a screen displayed through the cover display 231 as shown in a screen 2002 of an example 2020.

In an example 2020, the processor 210 may display a plurality of objects 2003 indicating screens displayable on the cover display 231. For example, the processor 210 may identify an input for selecting one of a plurality of objects 2003, based on a first user input (e.g., a swipe input).

In an example 2030, the processor 210 may identify that an object 2031 indicating a screen 2041 is selected from among the plurality of objects 2003. For example, the processor 210 may change a placement sequence of the plurality of objects 2003, based on the first user input (e.g., a swipe input). The processor 210 may identify a second user input (e.g., a tap input) to the object 2031, in a screen (or state) 2032 where the object 2031 among the plurality of objects 2003 is displayed at the top. The processor 210 may identify that the object 2031 indicating the screen 2041 is selected from among the plurality of objects 2003, based on the second user input.

In an example 2040, the processor 210 may display the screen 2041 selected through the cover display 231. While the selected screen 2041 is displayed through the cover display 231, the processor 210 may cease displaying the screen 2041, based on identifying that the distance between the external object and the electronic device 200 is out of the designated distance.

In an example 2050, based on identifying that the distance between the external object and the electronic device 200 is out of the designated distance, the processor 210 may display a screen 2051, which is a screen basically provided by the electronic device 200, through the cover display 231.

In FIG. 20A, for convenience of explanation, a background image of a screen displayed through the cover display 231 is illustrated, but is not limited thereto. The screen displayed through the cover display 231 may include a user interface (e.g., widget, watch, and remaining battery capacity information).

Figure 20B:
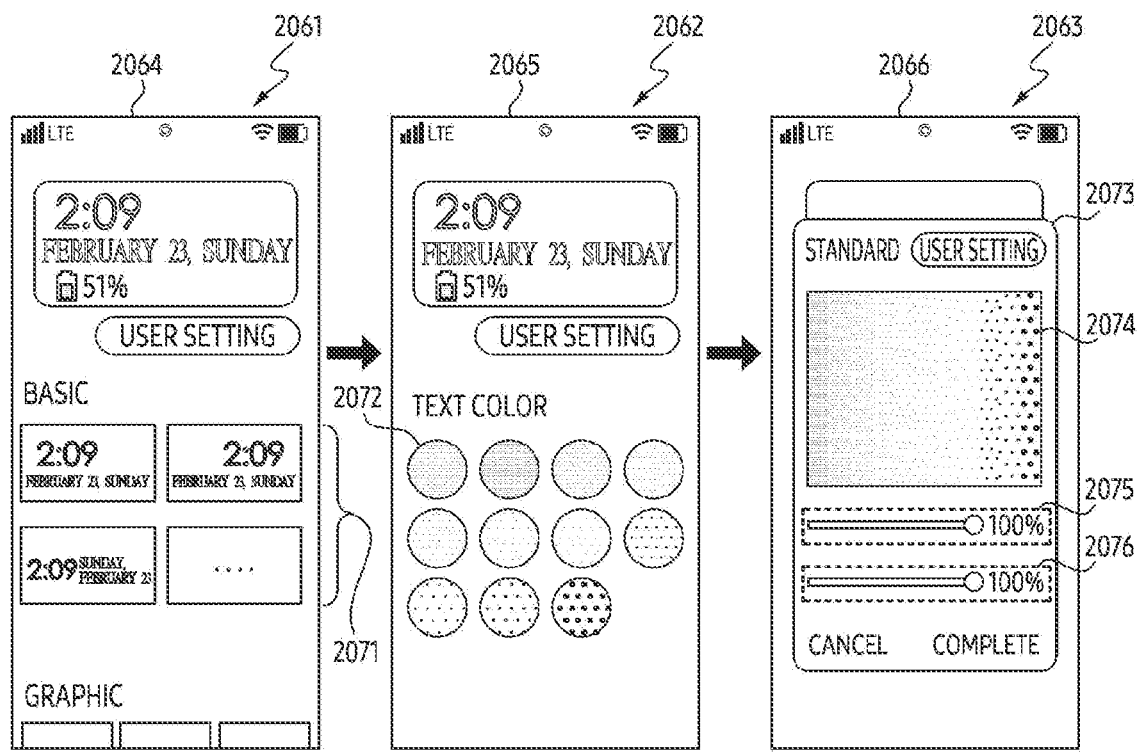

Referring to FIG. 20B, the processor 210 may edit a screen displayed through the cover display 231. For example, the processor 210 may provide screens for editing a screen displayed through the cover display 231, through the flexible display 232.

In an example 2061, the processor 210 may display a screen 2064 for providing a plurality of configurations 2071 regarding the placement between clock, date, and battery information within the cover display 231, through the flexible display 232. The processor 210 may determine the placement between the clock, date, and battery information based on a selection of one of the plurality of configurations 2071.

In an example 2062, the processor 210 may display a screen 2065 for changing a color of text displayed in the cover display 231 through the flexible display 232. For example, the processor 210 may display objects for selecting representative colors. For example, the processor 210 may display an object 2072 for selecting a custom color.

In an example 2063, based on identifying an input (e.g., a touch input) to the object 2072, the processor 210 may display an object 2073 for selecting a custom color through a screen 2066. According to an embodiment, the object 2073 may be displayed, superimposed on the screen 2065 on which the object 2072 is displayed.

For example, the object 2073 may include at least one of an object 2074 representing a color table, an object 2075 for adjusting color saturation, and/or an object 2076 for adjusting opacity.

Figure 20C:
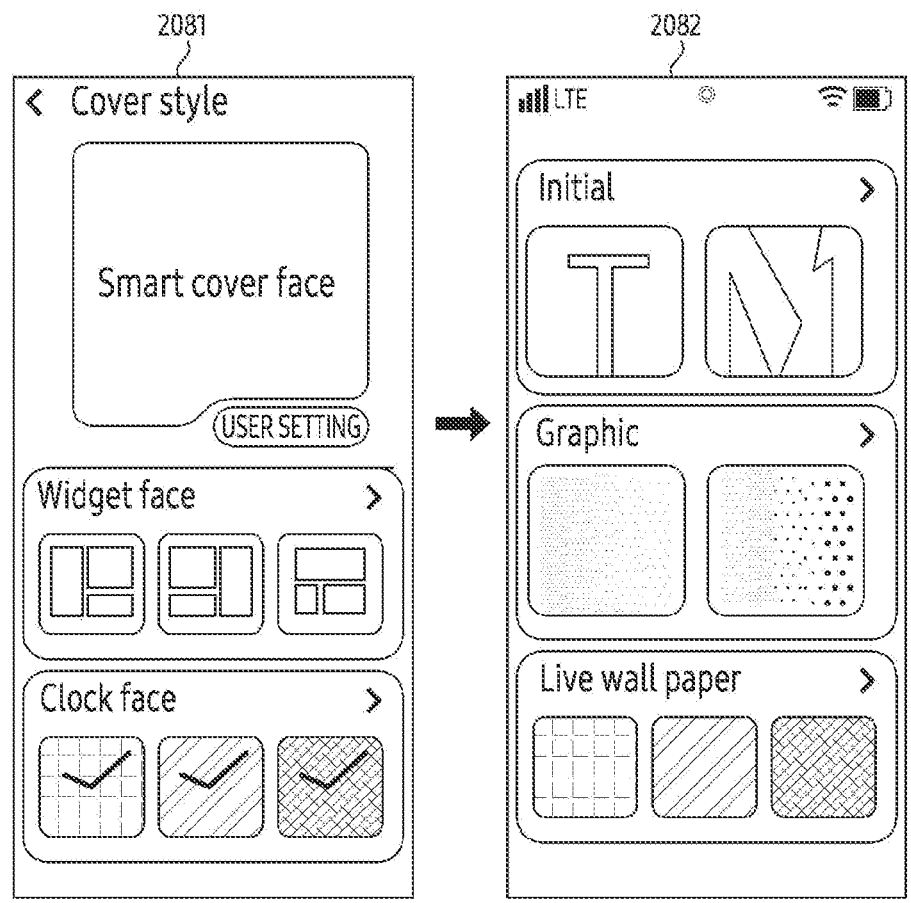

Referring to FIG. 20C, the processor 210 may change a screen displayed through the cover display 231. For example, the processor 210 may provide a list of screens stored in the memory 220 or obtainable from an external electronic device.

For example, the processor 210 may display a first list of screens stored in the memory 220 or obtainable from an external electronic device, on the screen 2081. The processor 210 may switch a screen displayed through the flexible display 232 from a screen 2081 to a screen 2082 based on a swipe input to the flexible display 232. On the screen 2082, the processor 210 may display a second list of screens stored in the memory 220 or obtainable from an external electronic device.

Figure 20D:
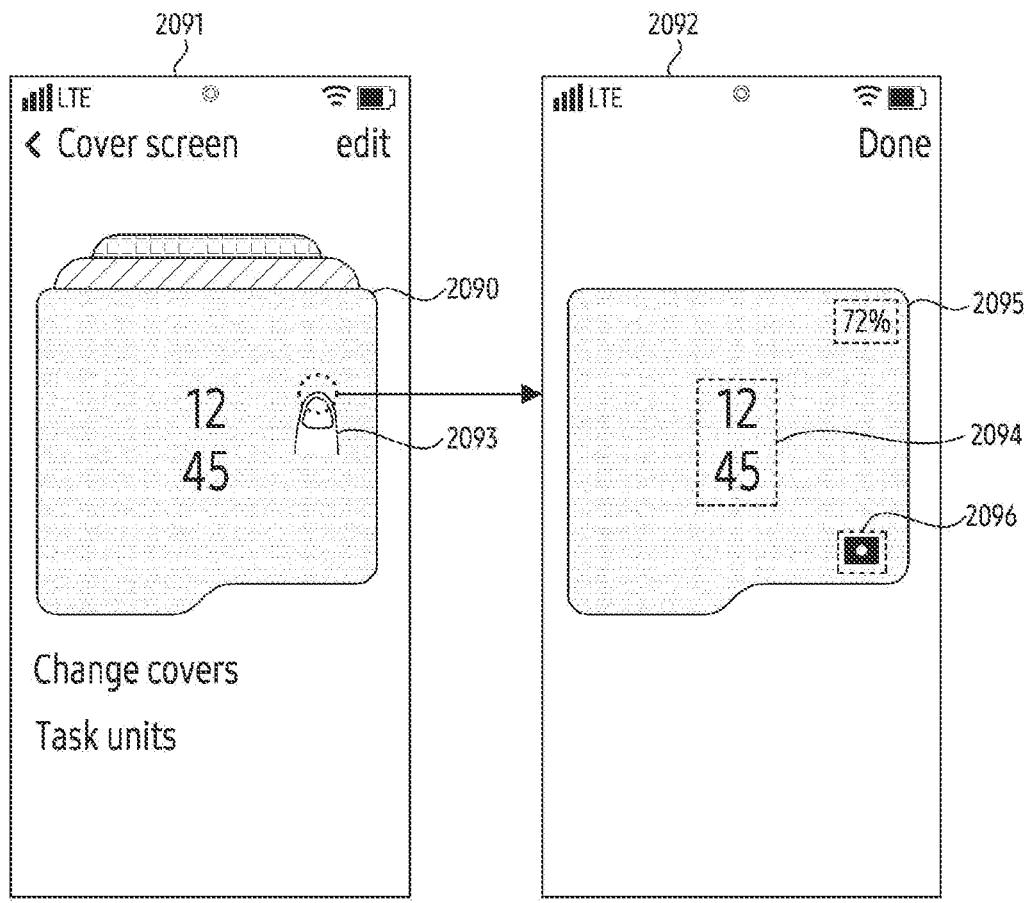

Referring to FIG. 20D, the processor 210 may provide a screen 2091 for editing the placement of information displayed on the cover display 231, through the flexible display 232. The processor 210 may identify an input 2093 to an object 2090 indicating a screen to be displayed through the cover display 231 displayed on the screen 2091.

The processor 210 may change a screen displayed through the flexible display 232 from the screen 2091 to a screen 2092, based on the input 2093. The processor 210 may provide the screen 2092 for changing the placement of an object 2094 representing a clock, an object 2095 representing remaining battery capacity information, and an object 2096 representing execution of a camera application. For example, the processor 210 may change a location on which one of the object 2094, the object 2095, or the object 2096 is displayed, based on a drag input to one of the object 2094, the object 2095, or the object 2096.

In FIG. 20D, an example of changing the placement of the object 2094, the object 2095, or the object 2096 is illustrated, but it is not limited thereto. A location of an object indicating information not illustrated in FIG. 20D may be changed based on a user input.

Figure 20E:
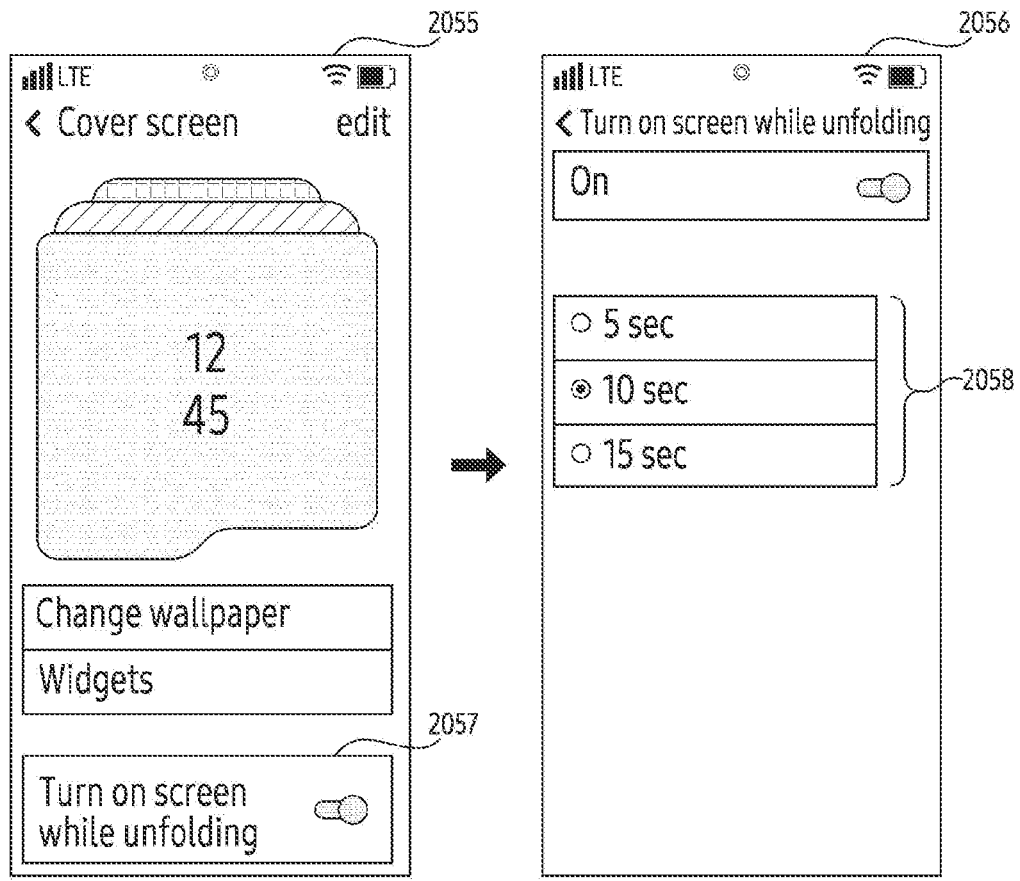

Referring to FIG. 20E, the processor 210 may display a screen 2055 to change a setting for a screen displayed through the cover display 231. While the electronic device 200 is in the second state, the processor 210 may display an object 2057 for setting whether to display a screen through the cover display 231.

For example, the processor 210 may change a screen displayed through the flexible display 232 from the screen 2055 to the screen 2056, based on an input (e.g., a touch input) to the object 2057. While the electronic device 200 is in the second state, the processor 210 may display an object 2058 for setting a time when the cover display 231 is turned on. For example, while the electronic device 200 is in the second state, the processor 210 may set a screen maintenance time of the cover display 231 to one of 5 seconds, 10 seconds, and 15 seconds.

In FIGS. 20A to 20E, a screen to change a setting for a screen displayed on the cover display 231 is displayed through the flexible display 232, but it is not limited thereto. The processor 210 may display a screen to change a setting for a screen displayed on the cover display 231 through the cover display 231.

Figure 21:
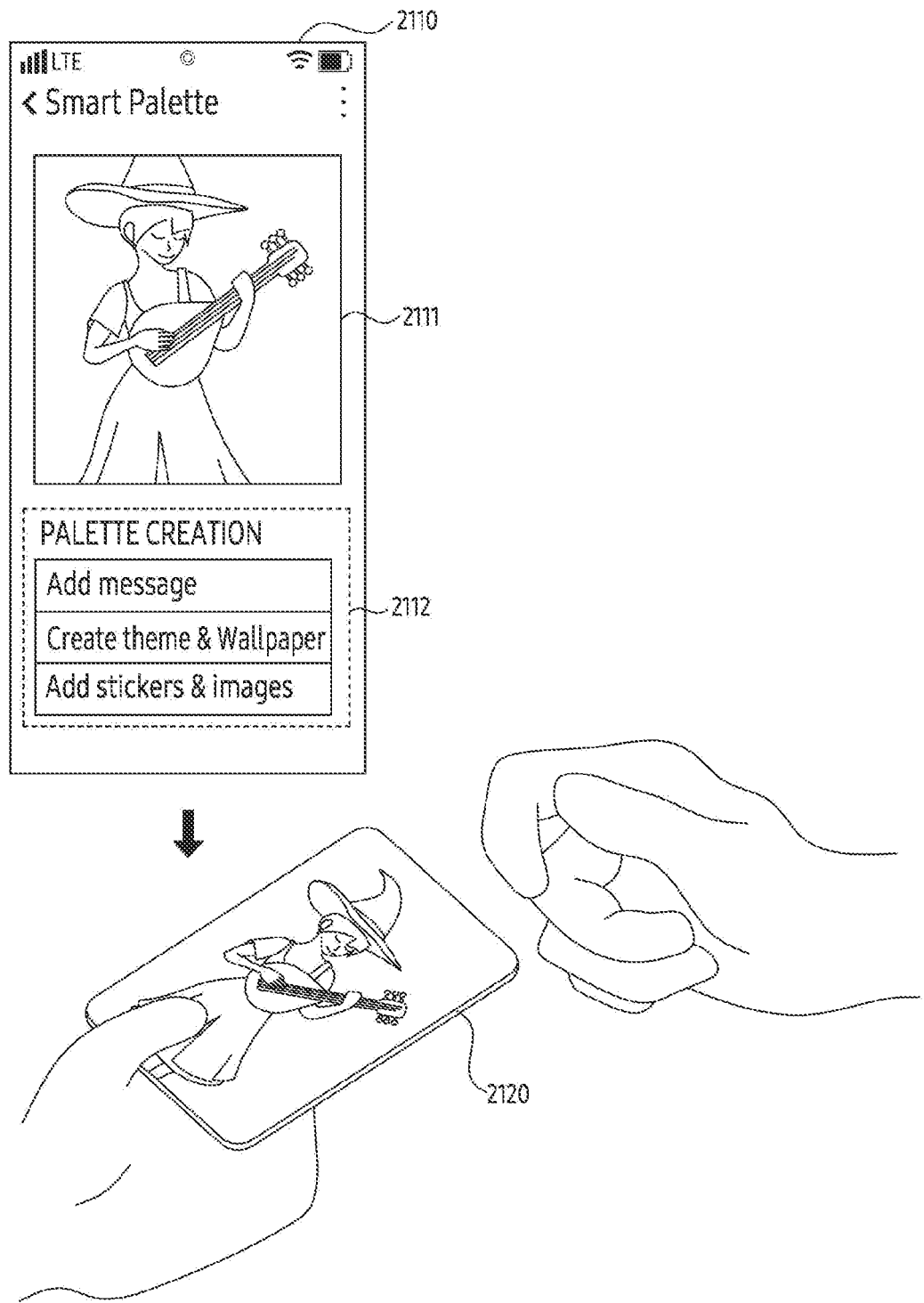
FIG. 21 illustrates an example operation of an electronic device for setting a second screen with respect to an external object according to various embodiments.

FIG. 21 illustrates an example of an operation of an electronic device for setting a second screen with respect to an external object according to various embodiments.

Referring to FIG. 21, a processor 210 may identify an external object 2120 located within a designated distance from an electronic device 200. The processor 210 may display a screen 2110 for setting a second screen regarding the external object 2120 through a flexible display 232. For example, the processor 210 may display an object 2111 indicating a screen displayed through the cover display 231 according to approaching the external object 2120. The processor 210 may display an object 2112 for creating (or editing) a screen displayed through the cover display 231 on the screen 2110.

According to an embodiment, the processor 210 may identify at least one input for creating (or editing) a screen displayed through the cover display 231. The processor 210 may set a created (or edited) screen to be displayed through the cover display 231 based on at least one input. The processor 210 may write data on a screen created (or edited) in the external object 2120 using NFC. The processor 210 may upload the edited screen to an external electronic device (e.g., the theme server 720).

A user of the electronic device 200 may provide another user with the external object 2120 including data on the created (or edited) screen. Another electronic device of the other user may display a screen created (or edited) through a cover display of the other electronic device, based on the access of the external object 2120.

Figure 22:
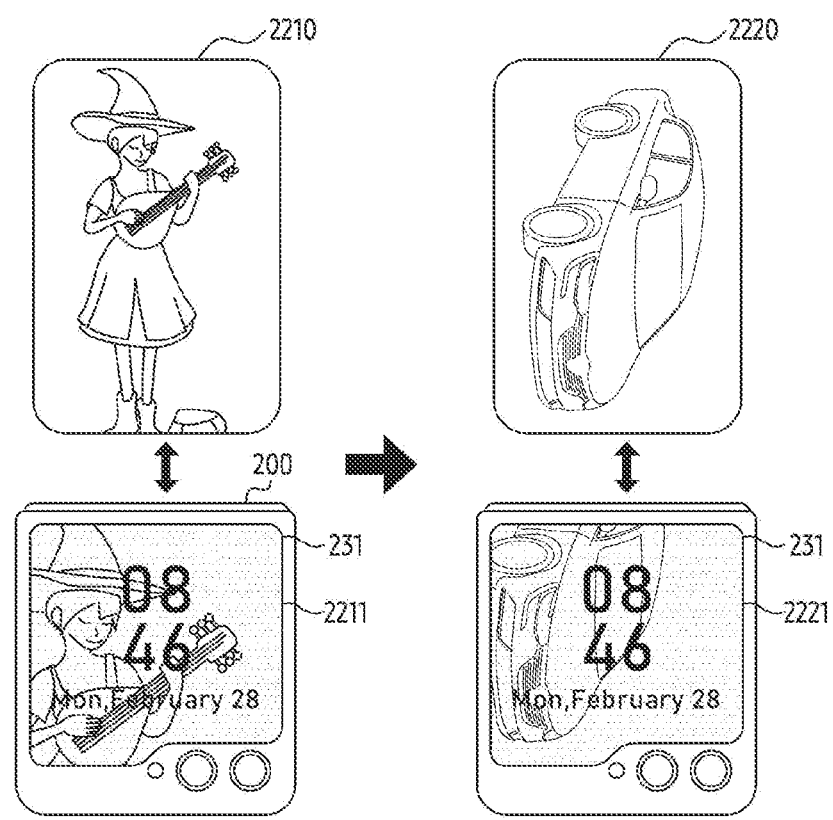
FIG. 22 illustrates an example of a screen changed according to an external object according to various embodiments.

FIG. 22 illustrates an example of a screen changed according to an external object according to various embodiments.

Referring to FIG. 22, a processor 210 may display a different screen according to an external object. Based on a change of an external object, the processor 210 may display a screen regarding the changed external object.

For example, the processor 210 may display a screen 2211 through a cover display 231, based on an external object 2210 located within a designated distance from an electronic device 200. The processor 210 may identify that a distance between the external object 2210 and the electronic device 200 is out of the designated distance. The processor 210 may cease displaying the screen 2211. The processor 210 may cease displaying the screen 2211 and display a basic screen.

The processor 210 may identify the approach of the external object 2220 distinguished from the external object 2210. Based on identifying that the distance between the external object 2220 and the electronic device 200 is within the designated distance, the processor 210 may display a screen 2221 regarding the external object 2220.

As described above, according to an embodiment, a user of the electronic device 200 may easily change a screen displayed through the cover display 231, based on changing the external objects 2210 and 2220 inserted into a case 400 of the electronic device 200. The user of the electronic device 200 may have various external objects. The user of the electronic device 200 may change the screen displayed on the cover display 231 using one of various external objects, based on at least one of a situation, a mood, and an environment.

Figure 23A:
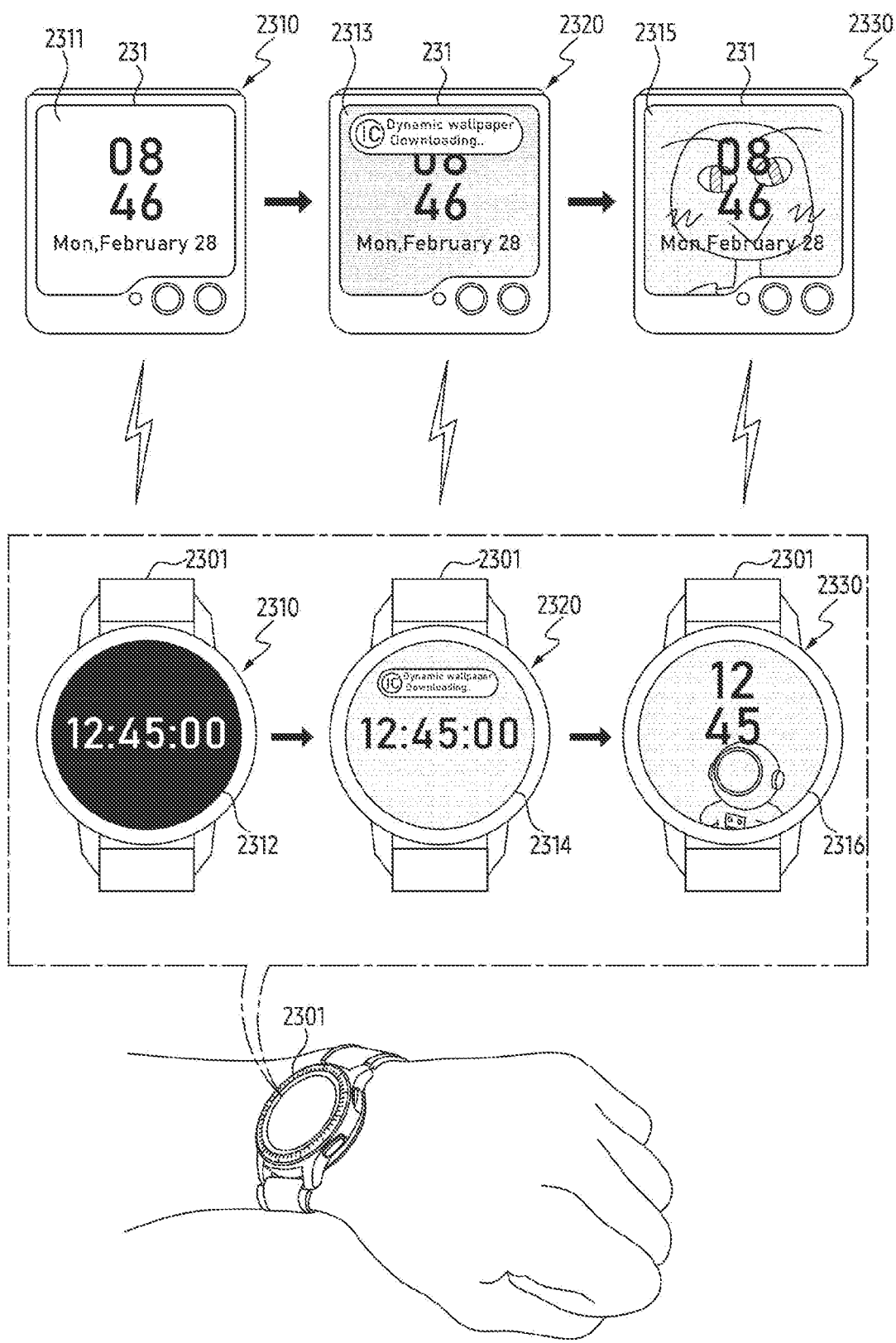
FIGS. 23A, 23B and 23C illustrate an example of an operation of an electronic device and another electronic device connected to the electronic device, according to various embodiments.
Figure 23B:
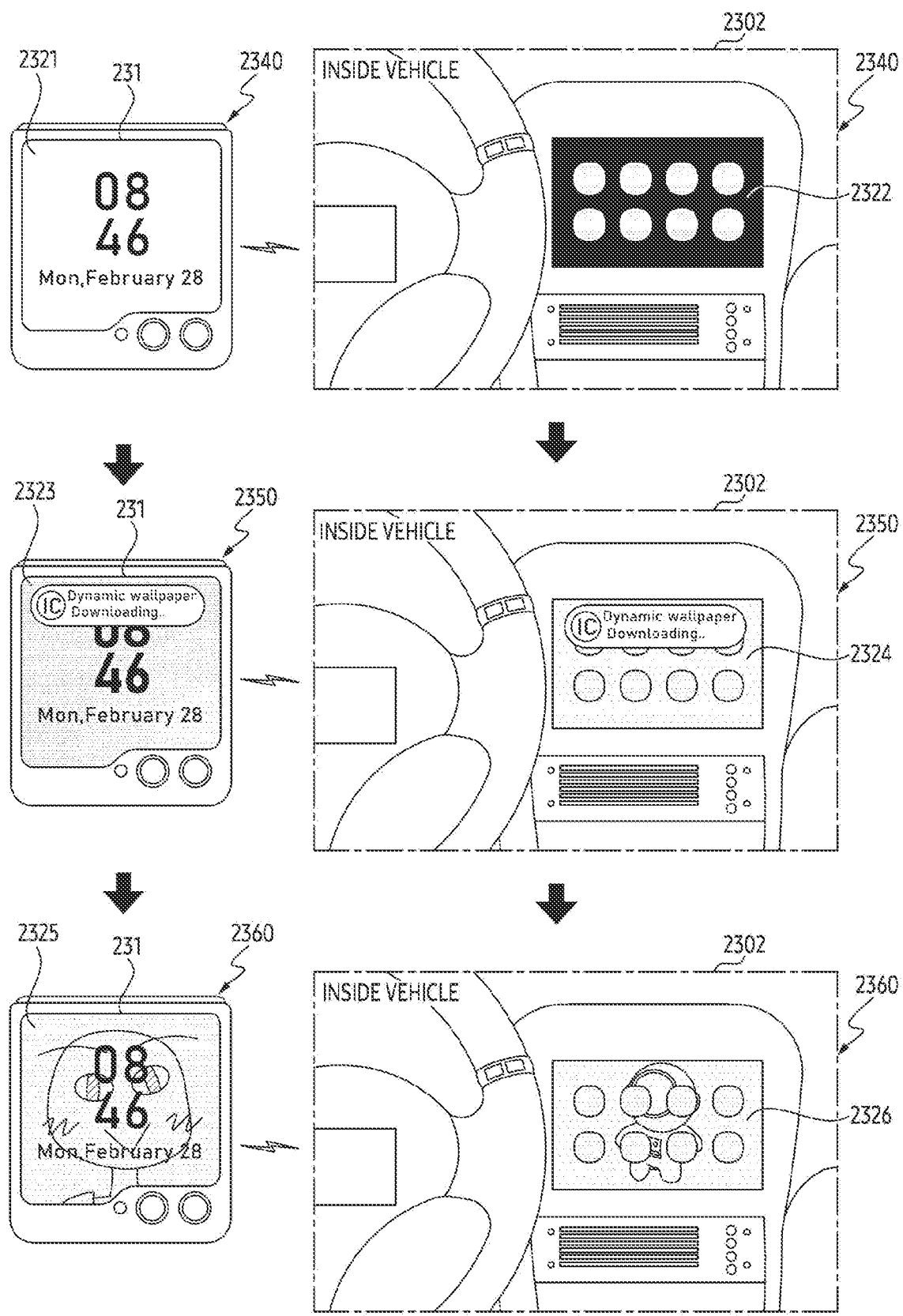
Figure 23C:
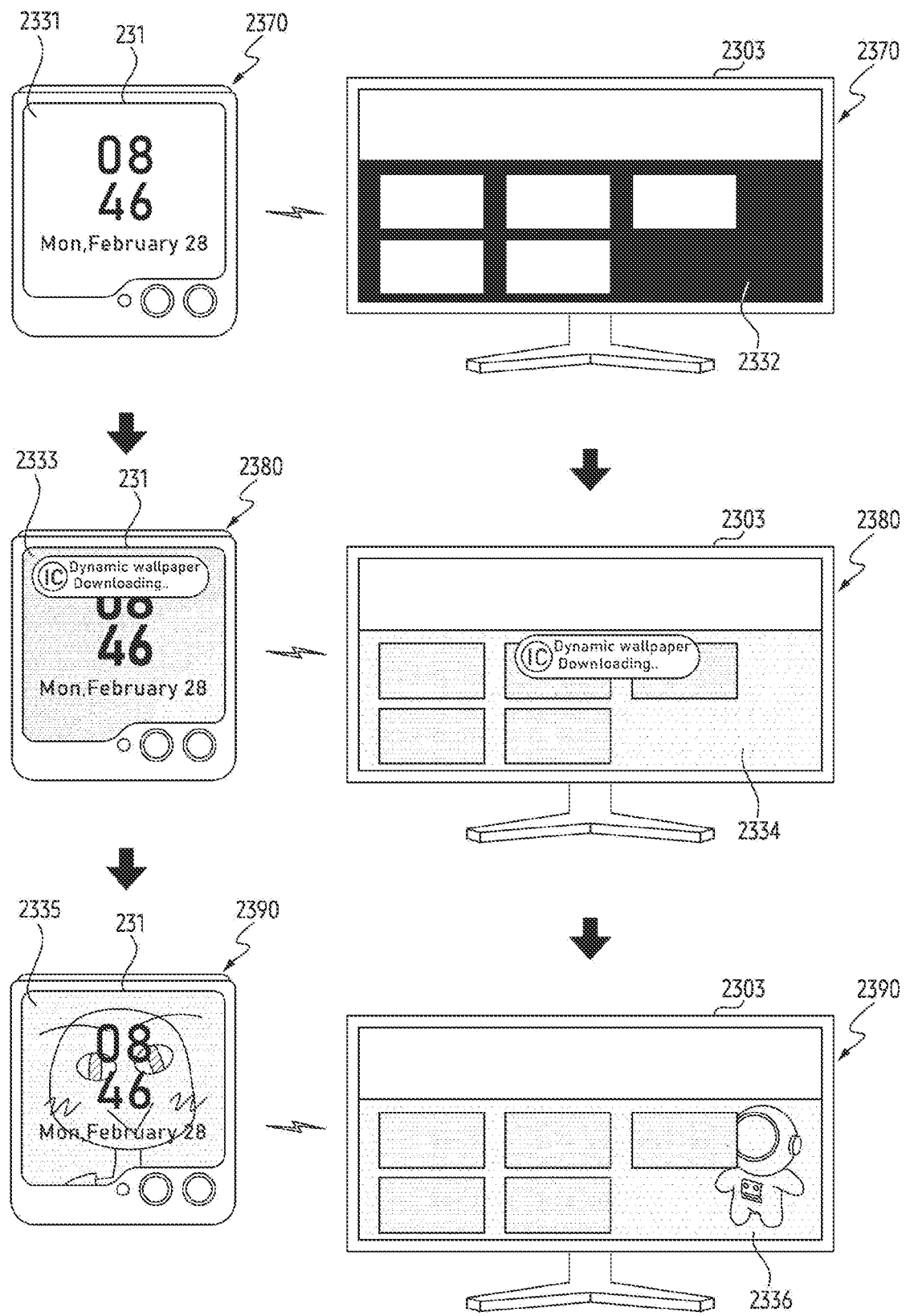

FIGS. 23A, 23B and 23C illustrate an example operation of an electronic device and another electronic device connected to the electronic device, according to various embodiments.

Referring to FIGS. 23A, 23B and 23C, an electronic device 200 may be a state connected to other electronic devices 2301, 2302, and 2303. A processor 210 may change a screen displayed on a cover display 231, based on an external object of an electronic device 200. Based on changing the screen displayed on the cover display 231, the processor 210 may change a screen of displays of other electronic devices 2301, 2302, and 2303. For example, the electronic device 200 may be in a state synchronized with other electronic devices 2301, 2302, and 2303.

Referring to FIG. 23A, an electronic device 200 may be connected to another electronic device 2301. For example, the other electronic device 2301 may be a wearable device. For example, the processor 210 may display a basic screen 2311 on the cover display 231. For example, the other electronic device 2301 may display a screen 2312 corresponding to the basic screen 2311.

In a state 2310, the processor 210 may identify whether a distance between the electronic device 200 and an external object is within a designated distance. The state 2310 may correspond to the state 610 of FIG. 6.

In a state 2320, the processor 210 may obtain first data and second data from the external object. Based on the first data, the processor 210 may display a first screen 2313. Based on displaying the first screen 2313 through the cover display 231, the processor 210 may display a screen 2314 corresponding to the first screen 2313 through a display of the other electronic device 2301. The processor 210 may transmit a signal for controlling the other electronic device 2301 to display the screen 2314 through a display of the other electronic device 2301 to the other electronic device 2301. The other electronic device 2301 may display the screen 2314 corresponding to the first screen 2313 through a display of the other electronic device 2301.

According to an embodiment, the screen 2314 may include an object indicating that information on the screen 2316 is being obtained.

In a state 2330, the processor 210 may obtain information on a second screen 2315 based on the second data. Based on obtaining the information on the second screen 2315, the processor 210 may display the second screen 2315 through the cover display 231. Based on displaying the second screen 2315 through the cover display 231, the processor 210 may display the screen 2316 corresponding to the second screen 2315 through a display of the other electronic device 2301. The processor 210 may transmit a signal for controlling the other electronic device 2301 to display the screen 2316 through a display of the other electronic device 2301 to the other electronic device 2301. The other electronic device 2301 may display the screen 2316 corresponding to the second screen 2315 through a display of the other electronic device 2301.

Referring to FIG. 23B, the electronic device 200 may be connected to another electronic device 2302. For example, the other electronic device 2302 may be a vehicle (or an electronic device including a display in the vehicle). For example, the processor 210 may display a basic screen 2321 on the cover display 231. For example, the other electronic device 2302 may display a screen 2322 corresponding to the basic screen 2321.

In a state 2340, the processor 210 may identify whether the distance between the electronic device 200 and the external object is within the designated distance. The state 2340 may correspond to the state 610 of FIG. 6.

In a state 2350, the processor 210 may obtain the first data and the second data from the external object. Based on the first data, the processor 210 may display a first screen 2323. Based on displaying the first screen 2323 through the cover display 231, the processor 210 may display a screen 2324 corresponding to the first screen 232 through a display of the other electronic device 2302.

According to an embodiment, the screen 2324 may include an object indicating that information on the screen 2326 is being obtained.

In a state 2360, the processor 210 may obtain information on a second screen 2325 based on the second data. Based on obtaining information on the second screen 2325, the processor 210 may display the second screen 2325 through the cover display 231. Based on displaying the second screen 2325 through the cover display 231, the processor 210 may display a screen 2326 corresponding to the second screen 2325 through the display of the other electronic device 2302.

According to an embodiment, the other electronic device 2302 may operate independently from the electronic device 200. The other electronic device 2302 may include a component (e.g., NFC reader) corresponding to the first communication circuit 241. For example, the other electronic device 2302 may display the screen 2326 based on identifying that an external object approaches the component within a designated distance.

For example, the other electronic device 2302 may identify that the electronic device 200 enters a space (e.g., an inner space of a vehicle) regarding the other electronic device 2302, together with the external object. The other electronic device 2302 may display the screen 2326 corresponding to the second screen 2325 through a display of the other electronic device 2302, based on identifying that the electronic device 200, together with the external object, enters a space (e.g., an inner space of a vehicle).

Referring to FIG. 23C, the electronic device 200 may be connected to another electronic device 2303. For example, the other electronic device 2303 may be an electronic device (e.g., a TV, a refrigerator, or an air conditioner) including a display. For example, the processor 210 may display a basic screen 2331 on the cover display 231. For example, the other electronic device 2303 may display a screen 2332 corresponding to the basic screen 2331.

In a state 2370, the processor 210 may identify whether the distance between the electronic device 200 and the external object is within the designated distance. The state 2370 may correspond to the state 610 of FIG. 6.

In a state 2380, the processor 210 may obtain the first data and the second data from the external object. Based on the first data, the processor 210 may display a first screen 2333. Based on displaying the first screen 2333 through the cover display 231, the processor 210 may display a screen 2334 corresponding to the first screen 2333 through a display of the other electronic device 2303.

According to an embodiment, the screen 2334 may include an object indicating that information on a screen 2336 is being obtained.

In a state 2390, the processor 210 may obtain information on a second screen 2335 based on the second data. Based on obtaining information on the second screen 2335, the processor 210 may display the second screen 2335 through the cover display 231. Based on displaying the second screen 2335 through the cover display 231, the processor 210 may display the screen 2336 corresponding to the second screen 2335 through a display of the other electronic device 2303.

According to an embodiment, the other electronic device 2303 may operate independently of the electronic device 200. The other electronic device 2303 may include a component (e.g., NFC reader) corresponding to the first communication circuit 241. For example, the other electronic device 2303 may display the screen 2336, based on identifying that an external object approaches the component within a designated distance.

For example, the other electronic device 2303 may identify that the electronic device 200, together with the external object, enters a space (e.g., inside a house) regarding the other electronic device 2303. The other electronic device 2303 may display the screen 2336 corresponding to the second screen 2335 through a display of the other electronic device 2303, based on identifying that the electronic device 200, together with an external object, enters a space (e.g., inside a house) regarding the other electronic device 2303.

FIGS. 23A, 23B and 23C illustrate an example of displaying the first screens 2313, 2323, and 2333 before the second screens 2315, 2325, and 2335 are displayed, but it is not limited thereto. For example, the processor 210 may output at least one of music and/or image before the second screens 2315, 2325, and 2335 are displayed. For example, the processor 210 may output at least one of music and/or images through the other electronic devices 2301, 2302, and 2303, before the screens 2316, 2326, and 2336 corresponding to the second screens 2315, 2325, and 2335 are displayed on the other electronic devices 2301, 2302, and 2303.

Figure 24:
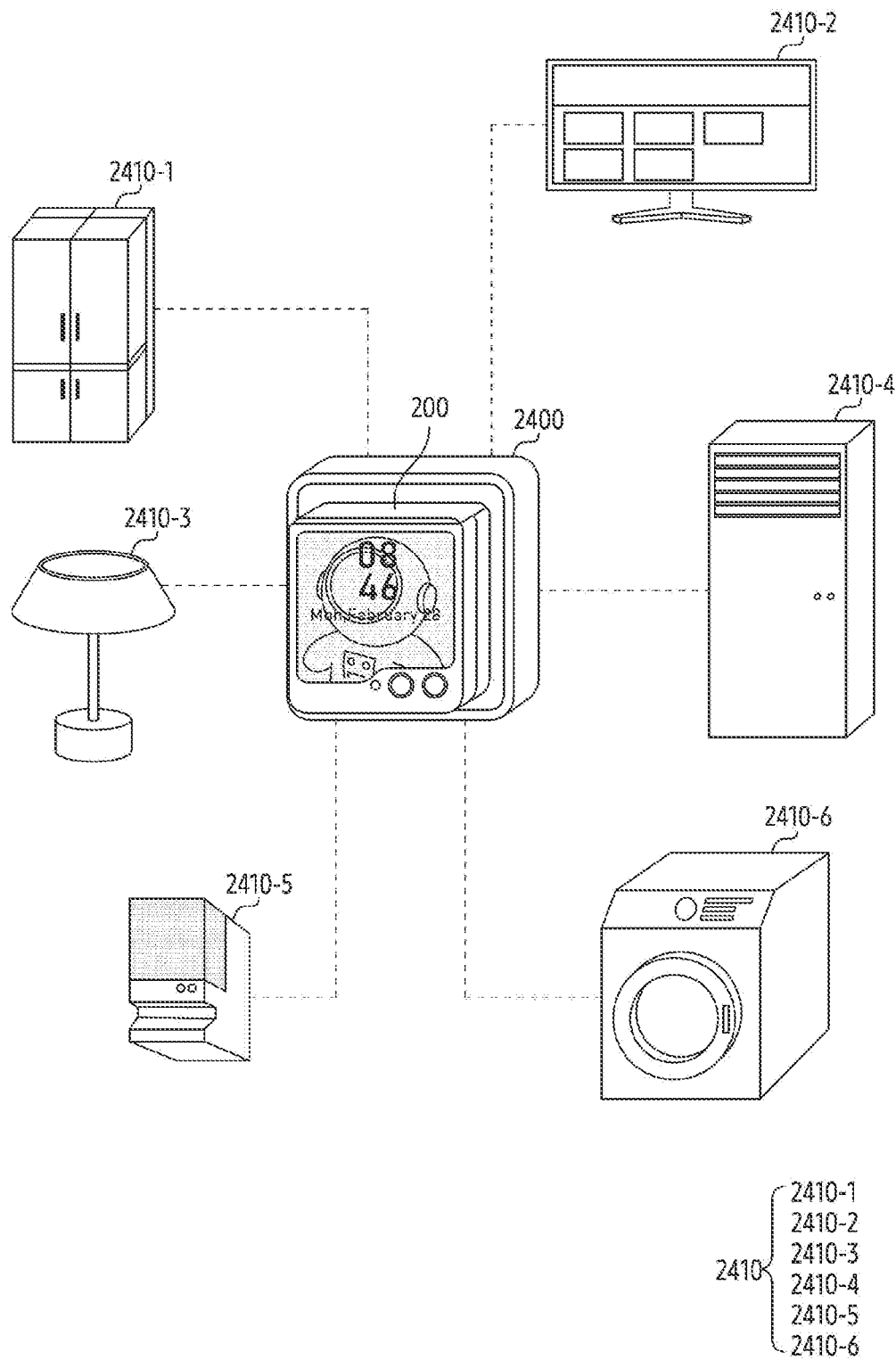
FIG. 24 illustrates an example of an operation of an electronic device and a plurality of other electronic devices connected to the electronic device, according to various embodiments.

FIG. 24 illustrates an example of an operation of an electronic device and a plurality of other electronic devices connected to the electronic device, according to various embodiments.

Referring to FIG. 24, the electronic device 200 may be connected to a hub device 2400. The hub device 2400 may be connected to a plurality of other electronic devices 2410 as well as an electronic device 200. For example, the hub device 2400 may be connected to the electronic device 200 and the plurality of other electronic devices 2410 based on wireless LAN or Zigbee communication.

According to an embodiment, the electronic device 200 may approach the hub device 2400. The electronic device 200 may be disposed on the hub device 2400. For example, the processor 210 may identify that a distance between the electronic device 200 and the hub device 2400 is within a reference distance. For example, it may be a state in which an external object is coupled to a case 400 of the electronic device 200.

The processor 210 may transmit information on the second screen to the hub device 2400, based on that a distance between the electronic device 200 and the hub device 2400 is within the reference distance. The hub device 2400 may receive information on the second screen.

According to an embodiment, the hub device 2400 may control the plurality of other electronic devices based on the information on the second screen. For example, a representative color of the second screen may be yellow. A first screen may have yellow.

For example, the hub device 2400 may identify another electronic device (e.g., another electronic device 2410-2) including a display among the plurality of other electronic devices. The hub device 2400 may control the other electronic device (e.g., the other electronic device 2410-2) to display a screen having a yellow color corresponding to a second screen having a yellow color through a display of the identified other electronic device.

For example, the hub device 2400 may identify another electronic device (e.g., another electronic device 2410-3) including a light source among the plurality of other electronic devices. The hub device 2400 may control the other electronic device (e.g., the other electronic device 2410-3) to emit light having a yellow color through a light source of the identified other electronic device.

For example, the hub device 2400 may identify another electronic device (e.g., another electronic device 2410-5) including a speaker among the plurality of other electronic devices. The hub device 2400 may control the other electronic device (e.g., the other electronic device 2410-5) to output music associated with yellow through a speaker of the identified other electronic device.

Figure 25A:
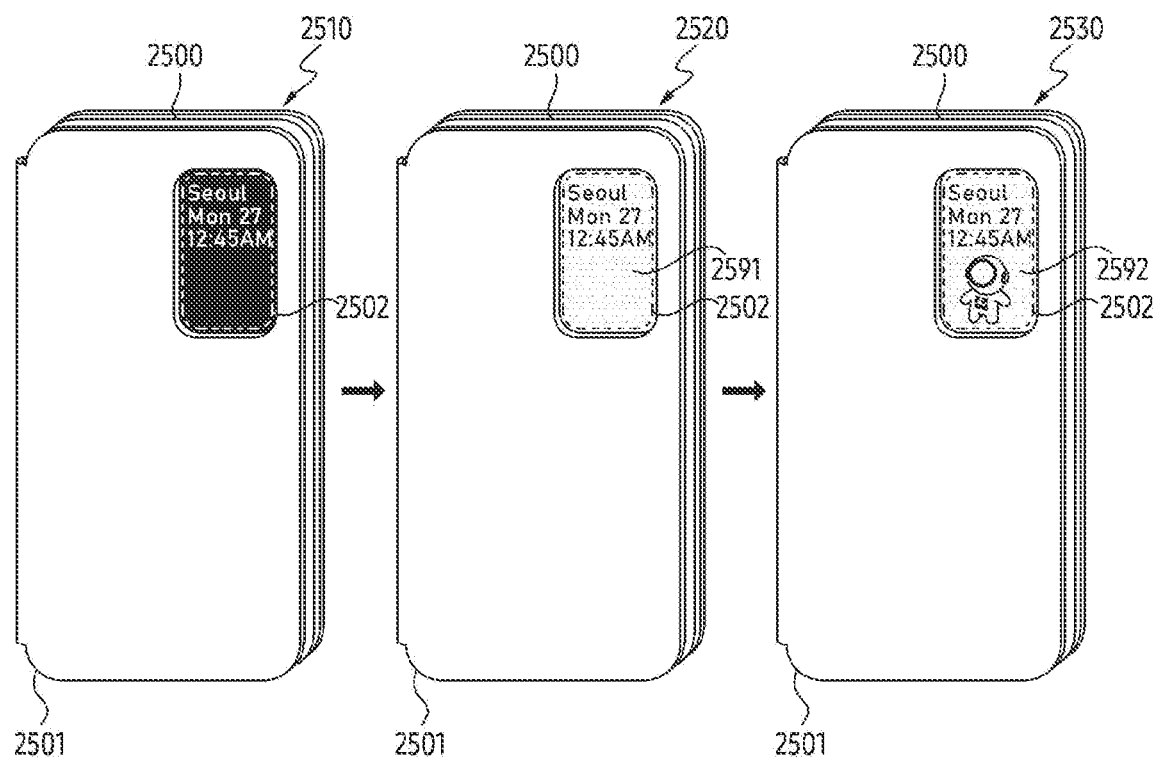
FIGS. 25A and 25B illustrate an example of an operation of an electronic device, according to various embodiments.
Figure 25B:
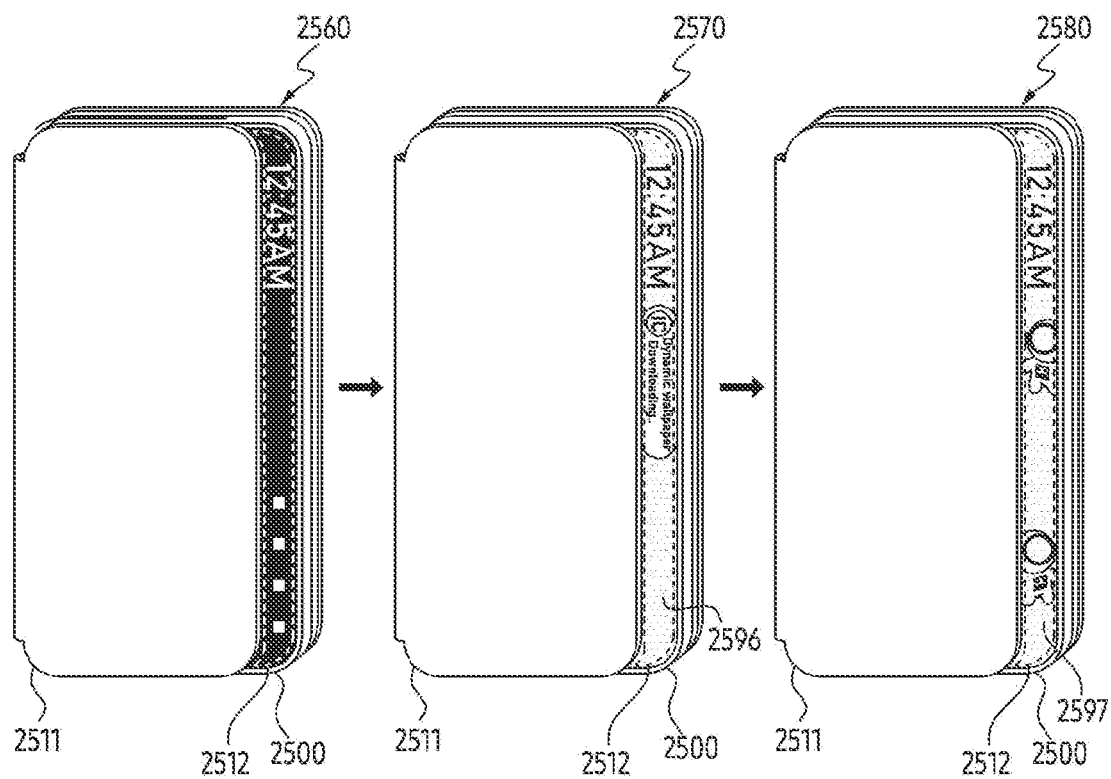

FIGS. 25A and 25B illustrate an example of an operation of an electronic device, according to various embodiments.

Referring to FIG. 25A, an electronic device 2500 may include a display. For example, a case 2501 may be coupled to the electronic device 2500. The case 2501 may include the above-described external object. In a state in which the case 2501 is coupled to the electronic device 2500, only a partial part 2502 of a display of the electronic device 2500 may be exposed to the outside.

In a state 2510, the electronic device 2500 (or a processor of the electronic device 2500) may identify that the case 2501 is coupled. Based on identifying that the case 2501 is coupled, the electronic device 2500 may obtain first data and second data from the case 2501.

In a state 2520, the electronic device 2500 may display a first screen 2591 on the partial part 2502 of the display while information on the second screen 2592 is obtained based on the second data. The electronic device 2500 may display an object 2593 indicating that information on the second screen 2592 is being obtained, superimposed on the first screen 2591.

In a state 2530, after the information on the second screen 2592 is obtained, the electronic device 2500 may display the second screen 2592 on a partial part 2502 of the display, based on the information on the second screen 2592.

Referring to FIG. 25B, the electronic device 2500 may include a display. For example, a case 2511 may be coupled to the electronic device 2500. The case 2511 may include the above-described external object. In a state in which the case 2511 is coupled to the electronic device 2500, only a partial part 2512 of the display of the electronic device 2500 may be exposed to the outside. Unlike FIG. 25A, the partial part 2512 of the display may be set along a periphery of the electronic device 2500.

In a state 2560, the electronic device 2500 (or the processor of the electronic device 2500) may identify that the case 2511 is coupled. The electronic device 2500 may obtain first data and second data from the case 2511 based on identifying that the case 2511 is coupled.

In a state 2570, the electronic device 2500 may display a first screen 2596 on the partial part 2512 of the display while information on the second screen is obtained based on the second data. The electronic device 2500 may display an object 2593 indicating that information on a second screen 2597 is being obtained, superimposed on the first screen 2596.

In a state 2580, after the information on the second screen 2597 is obtained, the electronic device 2500 may display the second screen 2597 on a partial part 2512 of the display based on the information on the second screen 2597.

Figure 26:
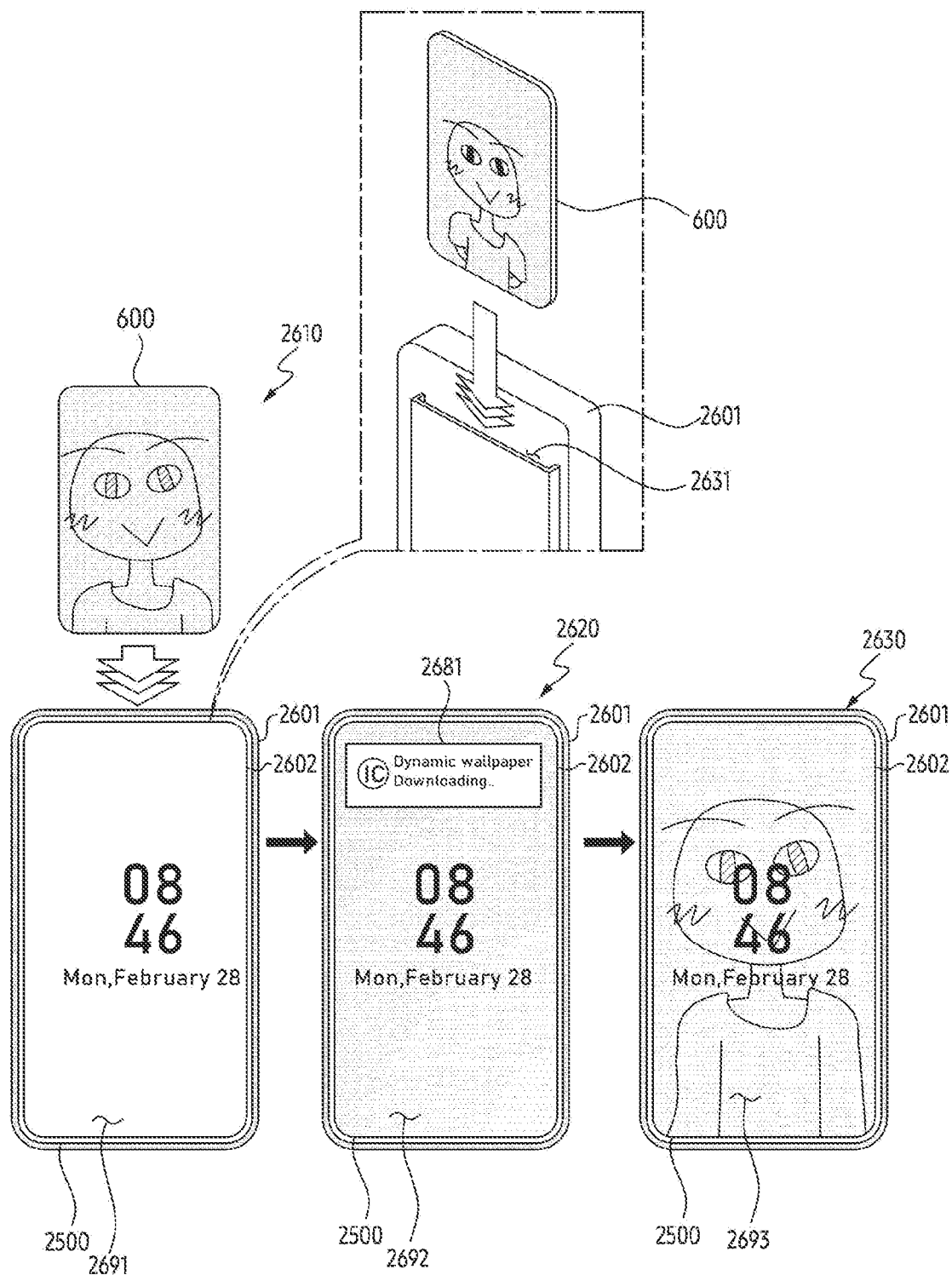
FIG. 26 illustrates an example of an operation of an electronic device for changing a screen, according to various embodiments.

FIG. 26 illustrates an example of an operation of an electronic device for changing a screen, according to various embodiments.

Referring to FIG. 26, an electronic device 2600 may include a display 2602. For example, a case 2601 may be coupled to the electronic device 2600. The case 2601 may include a slot 2631. In a state in which the case 2501 is coupled to the electronic device 2500, the electronic device 2600 (or a processor of the electronic device 2600) may display a screen through a display 2602 of the electronic device 2600.

For example, the electronic device 2600 may correspond to the electronic device 200 illustrated in FIGS. 2 to 6 described above. The processor of the electronic device 2600 may correspond to the processor 260 of FIG. 2 described above.

For example, a form factor of the electronic device 2600 illustrated in FIG. 26 may be different from a form factor of the electronic device 200 illustrated in FIG. 6. For example, the electronic device 2600 may be formed in a bar-type.

In a state 2610, the electronic device 2600 (or the processor of the electronic device 2600) may identify that an external object 600 is inserted into the slot 2631. The electronic device 2600 (or the processor of the electronic device 2600) may identify that the external object 600 is inserted into the slot 2631, based on identifying that a distance between the electronic device 2600 and the external object 600 is within a designated distance. According to an embodiment, the case 2601 may include a component for identifying whether the external object 600 is inserted (or combined). The electronic device 2600 (e.g., the processor of the electronic device 2600) may obtain information from the case 2601. The electronic device 2600 (e.g., the processor of the electronic device 2600) may identify that the external object 600 is inserted into the slot 2631, based on the information obtained from the case 2601.

In a state 2610, when the distance between the electronic device 2600 and the external object 600 is out of the designated distance, the electronic device 2600 (e.g., the processor of the electronic device 2600) may display a basic screen 2691 on the display 2602. For example, the basic screen 2691 may refer, for example, to a screen basically provided by the electronic device 2600. The basic screen 2691 may include a standby screen (or a home screen). The basic screen 2691 may refer, for example, to a screen, which is not changed through the external object 600.

In a state 2620, the electronic device 2600 (e.g., the processor of the electronic device 2600) may identify that the distance between the electronic device 2600 and the external object 600 is within the designated distance. The electronic device 2600 (e.g., the processor of the electronic device 2600) may obtain first data and second data from the external object 600. For example, the electronic device 2600 (e.g., the processor of the electronic device 2600) may obtain the first data and the second data through NFC using the first communication circuit 241.

The electronic device 2600 (e.g., the processor of the electronic device 2600) may display a first screen 2692 through the display 2602 based on the first data. The electronic device 2600 (e.g., the processor of the electronic device 2600) may obtain information on the second screen 2693, while the first screen 2692 is displayed through the display 2602. The electronic device 2600 (e.g., the processor of the electronic device 2600) may display an object 2681 indicating that the information on the second screen 2693 is being obtained, superimposed on the first screen 2692.

In a state 630, the electronic device 2600 (e.g., the processor of the electronic device 2600) may complete obtaining the information on the second screen. The electronic device 2600 (e.g., the processor of the electronic device 2600) may change a screen displayed through the display 2602 from the first screen 2692 to the second screen 2693, based on the information on the second screen. The electronic device 2600 (e.g., the processor of the electronic device 2600) may maintain display of the second screen 2693, based on that the distance between the external object 600 and the electronic device 2600 is maintained within the designated distance.

For example, the second screen 2693 may be related to the first screen 2692. For example, the first screen 2692 may have a representative color for the second screen 2693. The first data may include an ARGB value for the representative color for the second screen 2693.

The electronic device 2600 (e.g., the processor of the electronic device 2600) may obtain first data including information on the representative color of the second screen 2693 from the external object 600. The electronic device 2600 (e.g., the processor of the electronic device 2600) may display the first screen 2692 based on the first data, while the information on the second screen 2693 is obtained. The electronic device 2600 (e.g., the processor of the electronic device 2600) may display the first screen 2692 within a time period for displaying the second screen 2693. The electronic device 2600 (e.g., the processor of the electronic device 2600) may provide an improved user experience by displaying the first screen 2692 within the time period for displaying the second screen 2693.

According to an embodiment, the second screen 2693 may be a screen in which a theme of a screen displayed through the display 2602 is changed. The electronic device 2600 (e.g., the processor of the electronic device 2600) may display a user interface through the second screen 2693. For example, a user interface may include an icon, widget, lock screen, font, font color, home screen, and/or wallpaper.

The electronic device 2600 (e.g., the processor of the electronic device 2600) may display the second screen 2693 including the changed user interface through the external object 600. The electronic device 2600 (e.g., the processor of the electronic device 2600) may display the second screen 2693 including the changed user interface based on data (e.g., first data and second data) stored in the external object 600.

Although not illustrated, the above-described embodiments of FIGS. 1 to 24 may be performed through the electronic device 2600 (e.g., the processor of the electronic device 2600).

According to an embodiment, an electronic device (e.g., the electronic device 200) may comprise a first housing (e.g., the first housing 310) comprising a first surface and a second surface opposite to the first surface, a second housing (e.g., second housing 320) comprising a third surface and a fourth surface opposite to the third surface, a folding housing (e.g., a folding housing 365) connecting the first housing and the second housing pivotably (or rotatably), a cover display (e.g., a cover display 231) disposed on the second surface, a flexible display (e.g., flexible display 232) disposed on the first surface and the third surface, one or more communication circuits (e.g., the communication circuit 240), a memory (e.g., the memory 220), at least one sensor (e.g., the sensor 250), and at least one processor, comprising processing circuitry (e.g., the processor 210), operably coupled to the cover display, the flexible display, the one or more communication circuits, the memory, and the at least one sensor. The at least one processor, individually and/or collectively may be configured to: obtain first data and second data based on an external object located within a designated distance from the electronic device. The at least one processor, individually and/or collectively, may be configured to display a first screen through the cover display, based on the first data. The at least one processor, individually and/or collectively, may be configured to, based on the first screen being displayed through the cover display, obtain information on a second screen based on the second data. The at least one processor, individually and/or collectively, may be configured to change a screen displayed through the cover display from the first screen to the second screen, based on the information on the second screen. The at least one processor, individually and/or collectively, may be configured to maintain display of the second screen based on a distance between the external object and the electronic device being maintained within the designated distance.

According to an embodiment, the at least one processor, individually and/or collectively, may be configured to obtain the first data and the second data form the external object using a first communication circuit configured to perform near field communication among the one or more communication circuits.

According to an embodiment, the at least one processor, individually and/or collectively, may be configured to obtain the information on the second screen from an external electronic device using a second communication circuit configured to communicate with the external electronic device, among the one or more communication circuits.

According to an embodiment, the at least one processor, individually and/or collectively, may be configured to store, based on obtaining the information on the second screen, the information on the second screen in the memory. The at least one processor, individually and/or collectively, may be configured to, in response to identifying that the distance between the external object and the electronic device is out of the designated distance, cease displaying the second screen. The at least one processor, individually and/or collectively, may be configured to remove the information on the second screen stored in the memory, based on lapse of the designated time after ceasing displaying the second screen.

According to an embodiment, the at least one processor, individually and/or collectively, may be configured to, in response to obtaining the first data and the second data, identify whether the information on the second screen is stored in the memory. The at least one processor, individually and/or collectively, may be configured to bypass displaying the first screen through the cover display and display the second screen, based on identifying that the information on the second screen is stored in the memory. The at least one processor, individually and/or collectively, may be configured to display the first screen through the cover display, based on identifying that the information on the second screen is not stored in the memory.

According to an embodiment, the at least one processor, individually and/or collectively, may be configured to, based on the second screen being displayed, identify whether the information on the second screen is changed. The at least one processor may be configured to maintain displaying the second screen, based on the information on the second screen being not changed. The at least one processor may be configured to display a third screen distinct from the second screen, based on that the information on the second screen being changed.

According to an embodiment, the at least one sensor may comprise a gyroscopic sensor. The at least one processor, individually and/or collectively, may be configured to identify a type of the external object to one of a first type and a second type. The at least one processor, individually and/or collectively, may be configured to change the second screen according to a posture of the electronic device identified through the gyroscopic sensor being changed, based on identifying the type of the external object to the first type. The at least one processor, individually and/or collectively, may be configured to maintain displaying the second screen regardless of the posture of the electronic device, based on identifying the type of the external object to the second type.

According to an embodiment, the at least one sensor may comprise a hall sensor. The at least one processor, individually and/or collectively, may be configured to: identify, based on an angle between the first housing and the second housing, a state of the electronic device as one of a first state and a second state. The first state may comprise a state in which the angle between the first housing and the second housing is within a designated angle range. The second state may comprise a state in which the angle between the first housing and the second housing is out of the designated angle range.

According to an embodiment, the at least one processor, individually and/or collectively, may be configured to obtain, based on the external object, third data for indicating whether the second screen is changed according to the state of the electronic device.

According to an embodiment, the at least one processor, individually and/or collectively, may be configured to: identify the state of the electronic device is changed from the first state to the second state while the second screen is displayed. The at least one processor, individually and/or collectively, may be configured to change a display direction of the second screen, based on the third data set as a first value.

According to an embodiment, the at least one processor, individually and/or collectively, may be configured to, based on the third data set as a second value, maintain the display direction of the second screen.

According to an embodiment, a method of operating an electronic device (e.g., the electronic device 200) may comprise: obtaining first data and second data based on an external object located within a designated distance from the electronic device. The method may comprise, based on the first data, displaying a first screen through a cover display (e.g., the cover display 231) disposed on a surface of a first housing of the electronic device. The method may comprise, based on the first screen being displayed through the cover display, obtaining information on the second screen based on the second data. The method may comprise, based on the information on the second screen, changing a screen displayed through the cover display from the first screen to the second screen. The method may comprise maintaining display of the second screen based on a distance between the external object and the electronic device being maintained within the designated distance.

According to an embodiment, the method may comprise obtaining the first data and the second data form the external object using a first communication circuit (e.g., the first communication circuit 241) configured to perform near field communication among one or more communication circuits of the electronic device.

According to an embodiment, the method may comprise obtaining the information on the second screen from an external electronic device using a second communication circuit (e.g., the second communication circuit 242) configured to communicate with the external electronic device, among the one or more communication circuits.

According to an embodiment, the method may comprise storing, based on obtaining the information on the second screen, the information on the second screen in the memory (e.g., the memory 220). The method may comprise, in response to identifying that the distance between the external object and the electronic device is out of the designated distance, ceasing displaying the second screen. The method may comprise, based on lapse of the designated time after ceasing displaying the second screen, removing the information on the second screen stored in the memory.

According to an embodiment, the method may comprise, in response to obtaining the first data and the second data, identifying whether the information on the second screen is stored in the memory. The method may comprise, based on identifying that the information on the second screen is stored in the memory, bypassing displaying the first screen through the cover display and displaying the second screen. The method may comprise, based on identifying that the information on the second screen is not stored in the memory, displaying the first screen through the cover display.

According to an embodiment, the method may comprise, based on the second screen being displayed, identifying whether the information on the second screen is changed. The method may comprise, based on the information on the second screen not being changed, maintaining displaying the second screen. The method may comprise, based on the information on the second screen being changed, displaying a third screen distinct from the second screen.

According to an embodiment, the method may comprise identifying a type of the external object to one of a first type and a second type. The method may comprise, based on identifying the type of the external object to the first type, changing the second screen according to a posture of the electronic device identified through a gyroscopic sensor of the electronic device being changed. The method may comprise, based on identifying the type of the external object to the second type, maintaining displaying the second screen regardless of the posture of the electronic device.

According to an embodiment, the method may comprise obtaining, based on the external object, third data for indicating whether the second screen is changed according to a state of the electronic device.

According to an embodiment, the method may comprise identifying the state of the electronic device being changed from a first state to a second state based on the second screen is displayed. The method may comprise, based on the third data set as a first value, changing a display direction of the second screen. The method may comprise, based on the third data set as a second value, ceasing displaying the second screen.

According to an embodiment, an electronic device (e.g., the electronic device 2600) may comprise a display (e.g., the display 2602), one or more communication circuits (e.g., the communication circuit 240), a memory (e.g., the memory 220), at least one sensor (e.g., sensor 250), and at least one processor, comprising processing circuitry (e.g., the processor 210), operably coupled with the display, the one or more communication circuits, the memory, and the at least one sensor. The at least one processor, individually and/or collectively, may be configured to obtain first data and second data based on an external object located within a designated distance from the electronic device. The at least one processor, individually and/or collectively, may be configured to, display a first screen through the display, based on the first data. The at least one processor, individually and/or collectively, may be configured to, while; based on the first screen being displayed through the display, obtain information on a second screen based on the second data. The at least one processor, individually and/or collectively, may be configured to change a screen displayed through the display from the first screen to the second screen, based on the information on the second screen. The at least one processor, individually and/or collectively, may be configured to maintain display of the second screen based on a distance between the external object and the electronic device being maintained within the designated distance.

According to an embodiment, a method of operating an electronic device (e.g., the electronic device 2600) may comprise obtaining first data and second data based on an external object located within a designated distance from the electronic device. The method may comprise, based on the first data, displaying a first screen through the display (e.g., the display 2602). The at least one processor may be configured to, based on the first screen being displayed through the display, obtaining information on a second screen based on the second data. The method may comprise, based on the information on the second screen, changing a screen displayed through the display from the first screen to the second screen. The method may comprise maintaining display of the second screen based on a distance between the external object and the electronic device being maintained within the designated distance.

As described above, according to an embodiment, when an external object (e.g., an accessory, a card, and a case) is mounted on an electronic device (e.g., the electronic device 200), information on a second screen regarding the external object may be obtained. A user of the electronic device should wait for a time to obtain the information on the second screen. While the information on the second screen is obtained, the electronic device may display a first screen based on first data obtained from the external object. The electronic device may display the first screen, and switch the first screen to the second screen after the information on the second screen is obtained to reduce a user's feeling waiting time.

As described above, according to an embodiment, when the information on the second screen is stored in the memory, the electronic device may display the second screen based on the information on the second screen stored in the memory. Even when the electronic device is not connected to the network, the electronic device may display the second screen based on an external object.

According to the above-described embodiments, the first data may be configured with 4 bytes. Data obtained through an external object may be set to 23 bytes. 8 bytes (or 7 bytes) among the 23 bytes may be set to a reserved field. 4 bytes of the reserved field may be set as data for outputting the first screen. The first data may be set as an ARGB value for a representative color of the second screen. However, the disclosure is not limited thereto.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a first housing comprising a first surface and a second surface opposite to the first surface,
    a second housing comprising a third surface and a fourth surface opposite to the third surface,
    a folding housing pivotably connecting the first housing and the second housing,
    a cover display disposed on the second surface,
    a flexible display disposed on the first surface and the third surface,
    one or more communication circuits,
    at least one sensor,
    memory including one or more storage media, storing instructions, and
    at least one processor including processing circuitry,
    wherein the instructions, when executed by the at least one processor individually or collectively, cause the electronic device to:
    obtain first data and second data based on an external object positioned within a designated distance from the electronic device,
    display, based on the first data, a first screen through the cover display,
    while the first screen is displayed through the cover display, obtain information on a second screen based on the second data,
    in response to the obtaining of the information on the second screen, change a screen displayed through the cover display from the first screen to the second screen, and
    maintain display of the second screen based on a distance between the external object and the electronic device being maintained within the designated distance,
    wherein the first screen corresponds to a simplified screen of the second screen.

2. The electronic device of claim 1, wherein the instructions, when executed by the at least one processor individually or collectively, cause the electronic device to:
    obtain the first data and the second data form the external object using a first communication circuit configured to perform near field communication among the one or more communication circuits.

3. The electronic device of claim 2, wherein the instructions, when executed by the at least one processor individually or collectively, cause the electronic device to obtain the information on the second screen from an external electronic device using a second communication circuit configured to communicate with the external electronic device, among the one or more communication circuits.

4. The electronic device of claim 1, wherein the instructions, when executed by the at least one processor individually or collectively, cause the electronic device to:
    store, based on obtaining the information on the second screen, the information on the second screen in the memory, and
    in response to identifying that the distance between the external object and the electronic device is out of the designated distance, cease displaying the second screen.

5. The electronic device of claim 4, wherein the instructions, when executed by the at least one processor individually or collectively, cause the electronic device to:
    in response to obtaining the first data and the second data, identify whether the information on the second screen is stored in the memory,
    based on identifying that the information on the second screen is stored in the memory, bypass displaying the first screen through the cover display and display the second screen, and
    based on identifying that the information on the second screen is not stored in the memory, display the first screen through the cover display.

6. The electronic device of claim 1, wherein the instructions, when executed by the at least one processor individually or collectively, cause the electronic device to:

based on the second screen being displayed, identify whether the information on the second screen is changed, based on the information on the second screen not being changed, maintain displaying the second screen, and based on the information on the second screen being changed, display a third screen distinct from the second screen.

7. The electronic device of claim 1, wherein the at least one sensor comprises a gyroscopic sensor, and wherein the instructions, when executed by the at least one processor individually or collectively, cause the electronic device to:

identify a type of the external object as one of a first type and a second type, based on identifying the type of the external object as the first type, change the second screen according to a posture of the electronic device identified through the gyroscopic sensor being changed, and based on identifying the type of the external object as the second type, maintain displaying the second screen regardless of the posture of the electronic device.

8. The electronic device of claim 1, wherein the at least one sensor comprises a hall sensor, and wherein the instructions, when executed by the at least one processor individually or collectively, cause the electronic device to identify, based on an angle between the first housing and the second housing, a state of the electronic device to one of a first state and a second state, wherein the first state comprises a state in which the angle between the first housing and the second housing is within a designated angle range, and wherein the second state comprises a state in which the angle between the first housing and the second housing is out of the designated angle range.

9. The electronic device of claim 8, wherein the instructions, when executed by the at least one processor individually or collectively, cause the electronic device to obtain, based on the external object, third data indicating whether the second screen is changed according to the state of the electronic device.

10. The electronic device of claim 9, wherein the instructions, when executed by the at least one processor individually or collectively, cause the electronic device to:

identify whether the state of the electronic device is changed from the first state to the second state based on the second screen being displayed, and based on the third data set as a first value, change a display direction of the second screen.

11. The electronic device of claim 10, wherein the instructions, when executed by the at least one processor individually or collectively, cause the electronic device to, based on the third data set as a second value, maintain the display direction of the second screen.

12. A method performed by an electronic device comprising a first housing comprising a first surface and a second surface opposite to the first surface, a second housing comprising a third surface and a fourth surface opposite to the third surface, a folding housing pivotably connecting the first housing and the second housing, a cover display disposed on the second surface, a flexible display disposed on the first surface and the third surface, one or more communication circuits, and at least one sensor, the method comprising:

obtaining first data and second data based on an external object positioned within a designated distance from the electronic device, displaying, based on the first data, a first screen through the cover display, while the first screen is displayed through the cover display, obtaining information on the second screen based on the second data, in response to obtaining of the information on the second screen, changing a screen displayed through the cover display from the first screen to the second screen, and maintaining display of the second screen based on a distance between the external object and the electronic device being maintained within the designated distance, and wherein the first screen corresponds to a simplified screen of the second screen.

13. The method of claim 12, wherein the method further comprises obtaining the first data and the second data from the external object using a first communication circuit configured to perform near field communication among the one or more communication circuits of the electronic device.

14. The method of claim 13, wherein the method further comprises obtaining the information on the second screen from an external electronic device using a second communication circuit configured to communicate with the external electronic device, among the one or more communication circuits.

15. The method of claim 12, wherein the method further comprises:

storing, based on obtaining the information on the second screen, the information on the second screen in a memory, in response to identifying that the distance between the external object and the electronic device is out of the designated distance, ceasing displaying the second screen, and based on a lapse of the designated time after ceasing displaying the second screen, removing the information on the second screen stored in the memory.

16. The method of claim 15, wherein the method further comprises:

in response to obtaining the first data and the second data, identifying whether the information on the second screen is stored in the memory, based on identifying that the information on the second screen is stored in the memory, bypassing displaying the first screen through the cover display and displaying the second screen, and based on identifying that the information on the second screen is not stored in the memory, displaying the first screen through the cover display.

17. The method of claim 12, wherein the method further comprises:

based on the second screen being displayed, identifying whether the information on the second screen is changed, based on the information on the second screen not being changed, maintaining displaying the second screen, and based on the information on the second screen being changed, displaying a third screen distinct from the second screen.

18. The method of claim 12, wherein the method further comprises:

identifying a type of the external object as one of a first type and a second type, based on identifying the type of the external object as the first type, changing the second screen according to a posture of the electronic device identified through a gyroscopic sensor included in the at least one sensor, being changed, and based on identifying the type of the external object as the second type, maintaining displaying the second screen regardless of the posture of the electronic device.

19. The method of claim 12, wherein the method further comprises obtaining, based on the external object, third data indicating whether the second screen is changed according to a state of the electronic device.

20. The method of claim 19, wherein the method further comprises:

identifying the state of the electronic device being changed from a first state to a second state based on the second screen being displayed, based on the third data set as a first value, changing a display direction of the second screen, and based on the third data set as a second value, maintaining the display direction of the second screen.

* * * * *